US012607243B2

(12) United States Patent
Kotani

(10) Patent No.: US 12,607,243 B2
(45) Date of Patent: Apr. 21, 2026

(54) SHOCK ABSORBER

(71) Applicant: HITACHI ASTEMO, LTD., Ibaraki (JP)

(72) Inventor: Takamasa Kotani, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 496 days.

(21) Appl. No.: 18/017,862

(22) PCT Filed: Jul. 14, 2021

(86) PCT No.: PCT/JP2021/026490
§ 371 (c)(1),
(2) Date: Jan. 25, 2023

(87) PCT Pub. No.: WO2022/024766
PCT Pub. Date: Feb. 3, 2022

(65) Prior Publication Data
US 2023/0279920 A1 Sep. 7, 2023

(30) Foreign Application Priority Data

Jul. 29, 2020 (JP) ................................. 2020-128097

(51) Int. Cl.
*F16F 9/512* (2006.01)
*F16F 9/18* (2006.01)
(Continued)

(52) U.S. Cl.
CPC .............. *F16F 9/341* (2013.01); *F16F 9/185* (2013.01); *F16F 9/348* (2013.01); *F16F 9/512* (2013.01);
(Continued)

(58) Field of Classification Search
CPC ........ F16F 9/5126; F16F 9/512; F16F 9/3488; F16F 9/3484
See application file for complete search history.

(56) References Cited

U.S. PATENT DOCUMENTS

2011/0290603 A1* 12/2011 Yabe ......................... F16F 9/46
188/282.1
2015/0210136 A1 7/2015 Teraoka et al.
(Continued)

FOREIGN PATENT DOCUMENTS

JP 2-41666 B2 9/1990
JP 2012-67880 A 4/2012
(Continued)

OTHER PUBLICATIONS

International Search Report received in corresponding International Application No. PCT/JP2021/026439 dated Sep. 7, 2021.
(Continued)

*Primary Examiner* — Bradley T King
(74) *Attorney, Agent, or Firm* — MATTINGLY & MALUR, PC

(57) ABSTRACT

A shock absorber includes a first passage (92) through which a working fluid flows out from a chamber that is an upstream side to a chamber (23) that is a downstream side due to movement of a piston (21), a first damping force generating mechanism (41) provided in the first passage (92) to generate a damping force, a second passage (182) provided separately from the first passage (92), a second damping force generating mechanism (183) provided in the second passage (182) and opened to generate a damping force when a piston speed is lower than that of the first damping force generating mechanism (41), a third passage (512) provided separately from the second passage (182), a volume variable mechanism (186) provided in the third passage (512), a fourth passage (521) provided separately from the third
(Continued)

passage (512), and a relief mechanism (522) provided in the fourth passage (521) and opened after the second damping force generating mechanism (183) is opened.

4 Claims, 24 Drawing Sheets

(51) Int. Cl.
| | |
|---|---|
| *F16F 9/34* | (2006.01) |
| *F16F 9/348* | (2006.01) |
| *B60G 13/08* | (2006.01) |
| *B60G 17/08* | (2006.01) |

(52) U.S. Cl.
CPC .............. *B60G 13/08* (2013.01); *B60G 17/08* (2013.01); *B60G 2202/24* (2013.01); *B60G 2204/62* (2013.01); *B60G 2206/41* (2013.01); *B60G 2500/11* (2013.01); *B60G 2600/21* (2013.01); *B60G 2800/162* (2013.01); *F16F 2222/12* (2013.01); *F16F 2228/066* (2013.01); *F16F 2232/08* (2013.01)

(56) References Cited

U.S. PATENT DOCUMENTS

| | | | | |
|---|---|---|---|---|
| 2017/0080767 A1* | 3/2017 | Yamashita | .............. | F16F 9/504 |
| 2018/0128341 A1* | 5/2018 | Mizuno | .................... | F16F 9/19 |
| 2018/0259029 A1 | 9/2018 | Yamashita | | |
| 2019/0368569 A1* | 12/2019 | Yamashita | .............. | F16F 9/348 |
| 2022/0412428 A1* | 12/2022 | Yamashita | .............. | F16F 9/512 |
| 2023/0101911 A1* | 3/2023 | Kim | ....................... | F16F 9/3484 |
| | | | | 188/280 |
| 2023/0272835 A1* | 8/2023 | Kotani | .................. | F16F 9/3485 |
| | | | | 188/269 |
| 2023/0287954 A1* | 9/2023 | Yamashita | ............ | F16F 9/3484 |
| 2024/0376954 A1* | 11/2024 | Kotani | .................... | F16F 9/512 |

FOREIGN PATENT DOCUMENTS

| | | | |
|---|---|---|---|
| JP | 2014-70643 A | 4/2014 |
| JP | 2019-163769 A | 9/2019 |
| WO | 2017/047623 A1 | 3/2017 |

OTHER PUBLICATIONS

Written Opinion received in corresponding International Application No. PCT/JP2021/026439 dated Sep. 7, 2021.

International Search Report received in corresponding International Application No. PCT/JP2021/026490 dated Sep. 28, 2021.

Written Opinion received in corresponding International Application No. PCT/JP2021/026490 dated Sep. 28, 2021.

International Search Report received in corresponding International Application No. PCT/JP2021/026396 dated Sep. 21, 2021.

Written Opinion received in corresponding International Application No. PCT/JP2021/026396 dated Sep. 21, 2021.

* cited by examiner

SHOCK ABSORBER

TECHNICAL FIELD

The present invention relates to a shock absorber.

Priority is claimed on Japanese Patent Application No. 2020-128097, filed Jul. 29, 2020, the content of which is incorporated herein by reference.

BACKGROUND ART

There are shock absorbers each having two valves that open in the same stroke (for example, see Patent Document 1).

CITATION LIST

Patent Document

[Patent Document 1]
Japanese Unexamined Patent Application, First Publication No. H02-41666

SUMMARY OF INVENTION

Technical Problem

Incidentally, there is a demand to achieve improvement of durability in the shock absorber.

The present invention provides a shock absorber capable of achieving improvement of durability.

Solution to Problem

According to a first aspect of the present invention, a shock absorber includes a cylinder in which a working fluid is sealed, a piston slidably provided in the cylinder and configured to divide an inside of the cylinder into two chambers, a piston rod connected to the piston and extending toward an outside of the cylinder, a first passage through which the working fluid flows out from the chamber that is on an upstream side to the chamber that is on a downstream side due to a movement of the piston, a first damping force generating mechanism provided in the first passage and configured to generate a damping force, a second passage provided separately from the first passage, a second damping force generating mechanism provided in the second passage and opened to generate a damping force when a piston speed is lower than that of the first damping force generating mechanism, a third passage provided separately from the second passage, a volume variable mechanism provided in the third passage, a fourth passage provided separately from the third passage, and a relief mechanism provided in the fourth passage and opened after the second damping force generating mechanism is opened.

Advantageous Effects of Invention

According to the above-mentioned shock absorber, it is possible to achieve improvement of durability.

BRIEF DESCRIPTION OF DRAWINGS

FIG. 4 is a plan view showing a plate spring of the shock absorber according to the first embodiment of the present invention.

FIG. 5 is a plan view showing a flexible disk of the shock absorber according to the first embodiment of the present invention.

FIG. 21 is a plan view showing a flexible disk of the shock absorber according to the ninth embodiment of the present invention.

DESCRIPTION OF EMBODIMENTS

First Embodiment

A first embodiment will be described with reference to FIG. 1 to FIG. 9. Further, hereinbelow, for the convenience of description, upper sides in FIG. 1 to FIG. 3, FIG. 6, FIG. 7, FIG. 10, FIG. 12 to FIG. 18, and FIG. 20 will be described as "upper" and lower sides in FIG. 1 to FIG. 3, FIG. 6, FIG. 7, FIG. 10, FIG. 12 to FIG. 18, and FIG. 20 will be described as "lower."

<Configuration>

Figure 1:
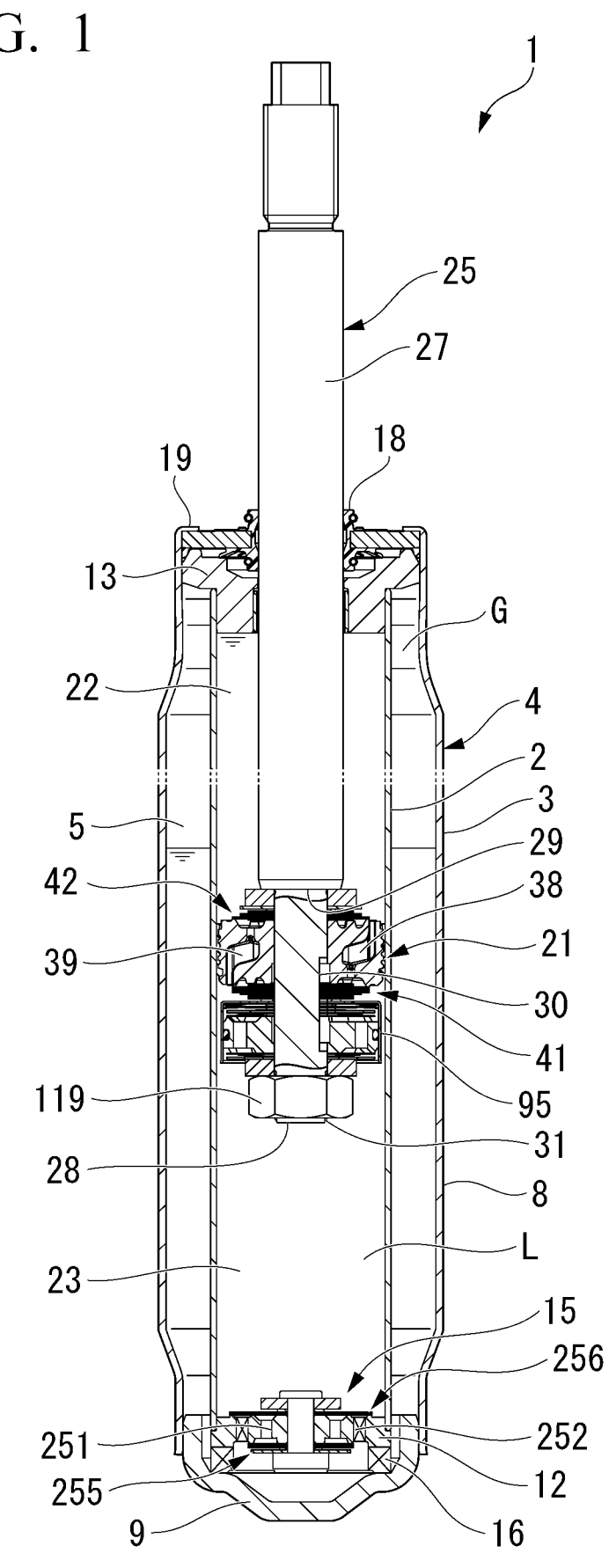
FIG. 1 is a cross-sectional view showing a shock absorber according to a first embodiment of the present invention.

A shock absorber 1 of a first embodiment is a shock absorber used in a suspension apparatus of a railway vehicle, a two-wheeled automobile, a four-wheeled automobile, or the like. Specifically, it is the shock absorber used in the suspension apparatus of a four-wheeled automobile. As shown in FIG. 1, the shock absorber 1 is a double cylinder type shock absorber including a cylinder 4 having a cylindrical inner tube 2, and a bottomed cylindrical outer tube 3 having a diameter larger than that of the inner tube 2 and provided outside the inner tube 2 in a radial direction. A space between the outer tube 3 and the inner tube 2 is a reservoir chamber 5.

The outer tube 3 has a stepped cylindrical barrel member 8, both end sides in the axial direction of which have a diameter smaller than that of an axial intermediate section, and a bottom member 9 configured to close one end portion of the barrel member 8 in the axial direction. A side of the barrel member 8 opposite to the bottom member 9 is an opening portion.

The shock absorber 1 has an annular valve body 12 provided on one end portion of the inner tube 2 in the axial direction, and an annular rod guide 13 provided on the other end portion of the inner tube 2 and the outer tube 3 in the axial direction. The valve body 12 constitutes a base valve 15. The base valve 15 has an outer circumferential portion formed in a stepped shape. The rod guide 13 also has an outer circumferential portion formed in a stepped shape. A large diameter portion of the rod guide 13 is fitted into the barrel member 8.

The one end portion of the inner tube 2 in the axial direction is fitted into a small diameter portion of an outer circumferential portion of the valve body 12. The inner tube 2 is engaged with the bottom member 9 of the outer tube 3 via the valve body 12. The inner tube 2 has the other end portion in the axial direction fitted onto the small diameter portion of the outer circumferential portion of the rod guide 13. The inner tube 2 is engaged with the barrel member 8 of the outer tube 3 via the rod guide 13. In this state, the inner tube 2 is positioned with respect to the outer tube 3 in the radial direction. A space between the valve body 12 and the bottom member 9 communicates with the space between the inner tube 2 and the outer tube 3 via a passage groove 16 formed in the valve body 12, and the reservoir chamber 5 is similarly constituted between the inner tube 2 and the outer tube 3.

The shock absorber 1 has an annular seal member 18 at a side of the rod guide 13 opposite to the bottom member 9. The seal member 18 is also fitted into the inner circumferential portion of the barrel member 8 like the rod guide 13. A locking portion 19 is formed at an end portion of the barrel member 8 opposite to the bottom member 9 by caulking the barrel member 8 through curl processing or the like and plastically deforming the barrel member 8 inward in the radial direction. The seal member 18 is sandwiched by the locking portion 19 and the rod guide 13. The seal member 18 is configured to close an opening portion of the outer tube 3. The seal member 18 is specifically an oil seal.

The shock absorber 1 has a piston 21 provided in the cylinder 4. The piston 21 is slidably provided in the inner tube 2 of the cylinder 4. The piston 21 divides the inside of the inner tube 2 into two chambers of an upper chamber 22 and a lower chamber 23. The upper chamber 22 is provided between the piston 21 and the rod guide 13 in the inner tube 2. The lower chamber 23 is provided between the piston 21 and the valve body 12 in the inner tube 2. The lower chamber 23 is defined as the reservoir chamber 5 by the valve body 12. An oil liquid L as a working fluid is sealed in the upper chamber 22 and the lower chamber 23 in the cylinder 4. A gas G as a working fluid is sealed in the reservoir chamber 5 together with the oil liquid L.

The shock absorber 1 includes a piston rod 25. The piston rod 25 has one end side portion in the axial direction disposed inside the cylinder 4 and connected and fixed to the piston 21, and the other end side portion extending to the outside of the cylinder 4. The piston rod 25 is formed of a metal. The piston rod 25 passes through the upper chamber 22 and does not pass through the lower chamber 23. Accordingly, the upper chamber 22 is a rod-side chamber through which the piston rod 25 passes, and the lower chamber 23 is a bottom-side chamber of the cylinder 4 on the side of the bottom member 9.

The piston 21 and the piston rod 25 move integrally with each other. In an extension stroke of the shock absorber 1 in which the piston rod 25 increases a protrusion amount from the cylinder 4, the piston 21 moves toward the upper chamber 22. In a compression stroke of the shock absorber 1 in which the piston rod 25 reduces a protrusion amount from the cylinder 4, the piston 21 moves toward the lower chamber 23.

Both the rod guide 13 and the seal member 18 are of annular shape. The piston rod 25 is slidably inserted into each of the rod guide 13 and the seal member 18 and extends outward from the inside of the cylinder 4. One end side portion of the piston rod 25 in the axial direction is fixed to the piston 21 in the cylinder 4. The other end side portion of the piston rod 25 in the axial direction protrudes toward the outside of the cylinder 4 via the rod guide 13 and the seal member 18.

The rod guide 13 axially movably supports the piston rod 25 with respect to the cylinder 4 while restricting movement in the radial direction, and guides movement of the piston rod 25. The outer circumferential portion of the seal member 18 is closely attached to the cylinder 4. The inner circumferential portion of the seal member 18 comes into sliding contact with the outer circumferential portion of the piston rod 25 moving in the axial direction. Accordingly, the seal member 18 prevents a leakage of the oil liquid L or the gas G in the cylinder 4 to the outside.

The piston rod 25 has a main shaft portion 27, and an attachment shaft portion 28 having a diameter smaller than that of the main shaft portion 27. The main shaft portion 27 is slidably fitted in the rod guide 13 and the seal member 18. The attachment shaft portion 28 is disposed in the cylinder 4 and connected to the piston 21 or the like. An end portion of the main shaft portion 27 on the side of the attachment shaft portion 28 is a shaft step portion 29 widening in an axis-orthogonal direction.

A passage notch portion 30 extending in the axial direction is formed in an outer circumferential portion of the attachment shaft portion 28 at an intermediate position in the axial direction, and a male screw 31 is formed at a tip position in the axial direction opposite to the main shaft portion 27. The passage notch portion 30 is formed by, for example, cutting out the outer circumferential portion of for example, the attachment shaft portion 28 on a surface parallel to a center axis of the attachment shaft portion 28 in a planar shape. The passage notch portion 30 can be formed at two places, which are different by 180 degrees in the circumferential direction of the attachment shaft portion 28, in a so-called width across flat shape.

The shock absorber 1 is supported by a vehicle body, for example, by disposing a protrusion portion of the piston rod 25 from the cylinder 4 on the upper portion, and connected to a side of a wheel by disposing the bottom member 9 of the cylinder 4 on a lower portion.

On the contrary, the side of the cylinder 4 may be supported by the vehicle body, and the piston rod 25 may be connected to the side of the wheel.

Figure 2:
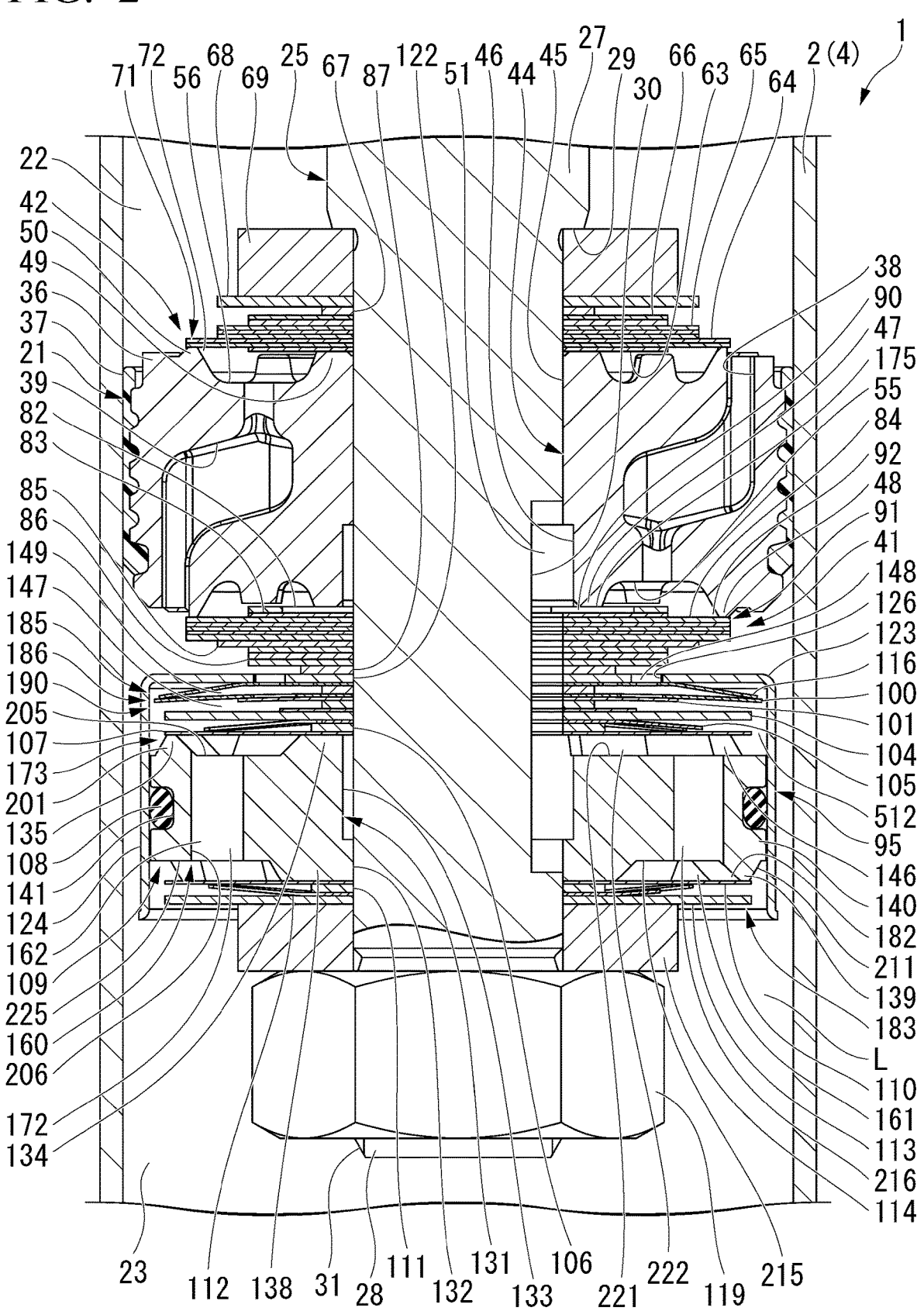
FIG. 2 is a partial cross-sectional view showing a vicinity of a piston of the shock absorber according to the first embodiment of the present invention.

As shown in FIG. 2, the piston 21 is constituted by a metal piston main body 36 in contact with and connected to the piston rod 25, and an annular synthetic resin sliding member 37 integrally mounted on the outer circumferential surface of the piston main body 36 and sliding in the inner tube 2 of the cylinder 4.

The piston main body 36 has a plurality of (in FIG. 2, shown only in one place due to a cross section) passage holes 38 configured to allow communication between the upper chamber 22 and the lower chamber 23, and a plurality of (in FIG. 2, shown only in one place due to a cross section) passage holes 39 configured to allow communication between the upper chamber 22 and the lower chamber 23.

The plurality of passage holes 38 are formed with a uniform pitch with one passage hole 39 sandwiched therebetween in the circumferential direction of the piston main body 36, and constitute a half of the total number of the passage holes 38 and 39. The plurality of passage holes 38 have a crank shape with inflection points at two places. The plurality of passage holes 38 on the side of the lower chamber 23 of the piston 21 in the axial direction open further inward in the radial direction of the piston 21 than those on the side of the upper chamber 22. An annular ring groove 55 configured to allow communication between the plurality of passage holes 38 is formed in the piston main body 36 on the side of the lower chamber 23 in the axial direction.

A first damping force generating mechanism 41 is provided on the side of the lower chamber 23 of the ring groove 55. The first damping force generating mechanism 41 opens and closes the passages in the ring groove 55 and in the plurality of passage holes 38 to generate a damping force. Since the first damping force generating mechanism 41 is disposed on the side of the lower chamber 23, the passages in the plurality of passage holes 38 and in the ring groove 55 are passages on an extension side through which the oil liquid L flows out from the upper chamber 22 that is an upstream side toward the lower chamber 23 that is a downstream side during movement of the piston 21 toward the upper chamber 22, i.e., in the extension stroke. The first damping force generating mechanism 41 provided with respect to the passages in the plurality of passage holes 38 and in the ring groove 55 is the damping force generating mechanism on the extension side configured to suppress flowing of the oil liquid L from the passages in the plurality of passage holes 38 and in the ring groove 55 on the extension side to the lower chamber 23 and generate a damping force.

The passage holes 39 that constitute the remaining half of the total of the passage holes 38 and 39 are formed at equal pitches with the passage hole 38 sandwiched therebetween in the circumferential direction of the piston main body 36. The plurality of passage holes 39 form a crank shape having two inflection points. The plurality of passage holes 39 are opened on the side of the upper chamber 22 of the piston 21 in the axial direction further inside the piston 21 in the radial direction than the side of the lower chamber 23. An annular ring groove 56 configured to allow communication between the plurality of passage holes 39 is formed in the piston main body 36 on the side of the upper chamber 22 in the axial direction.

A first damping force generating mechanism 42 configured to open and close the passages in the plurality of passage holes 39 and in the ring groove 56 to generate a damping force is provided on the side of the upper chamber 22 of the ring groove 56. Since the first damping force generating mechanism 42 is disposed on the upper chamber 22, the passages in the plurality of passage holes 39 and in the ring groove 56 are passages on the contraction side through which the oil liquid L flows out from the lower chamber 23 that is an upstream side toward the upper chamber 22 that is a downstream side during movement of the piston 21 toward the lower chamber 23, i.e., in the compression stroke. The first damping force generating mechanism 42 provided with respect to the passages in the plurality of passage holes 39 and in the ring groove 56 is a damping force generating mechanism on the contraction side configured to suppress flowing of the oil liquid L from the passages in the plurality of passage holes 39 and in the ring groove 56 on the contraction side to the upper chamber 22 to generate a damping force.

The piston main body 36 is formed in a substantially circular plate shape. An insertion hole 44 into which the attachment shaft portion 28 of the piston rod 25 is inserted is formed at a center of the piston main body 36 in the radial direction to pass therethrough in the axial direction. The insertion hole 44 has a small diameter hole portion 45 on one side in the axial direction into which the attachment shaft portion 28 of the piston rod 25 is fitted, and a large diameter hole portion 46 on the other side in the axial direction having a diameter greater than that of the small diameter hole portion 45. The small diameter hole portion 45 is provided on the side of the upper chamber 22 in the axial direction, and the large diameter hole portion 46 is provided on the side of the lower chamber 23 in the axial direction. The piston 21 is positioned with respect to the piston rod 25 in the radial direction by fitting the attachment shaft portion 28 into the small diameter hole portion 45.

An annular inner seat portion 47 is formed on an end portion of the piston main body 36 on the side of the lower chamber 23 in the axial direction further inside the piston main body 36 in the radial direction than the opening of the ring groove 55 on the side of the lower chamber 23. An annular valve seat portion 48 that constitutes a part of the first damping force generating mechanism 41 is formed on an end portion of the piston main body 36 on the side of the lower chamber 23 in the axial direction further outside the piston main body 36 in the radial direction than the opening of the ring groove 55 on the side of the lower chamber 23.

An annular inner seat portion 49 is formed on an end portion of the piston main body 36 on the side of the upper chamber 22 in the axial direction further inside the piston main body 36 in the radial direction than the opening of the ring groove 56 on the side of the upper chamber 22. An annular valve seat portion 50 that constitutes a part of the first damping force generating mechanism 42 is formed on an end portion of the piston main body 36 on the side of the upper chamber 22 in the axial direction further outside the piston main body 36 in the radial direction than the opening of the ring groove 56 on the side of the upper chamber 22.

The insertion hole 44 of the piston main body 36 has the large diameter hole portion 46 that is provided closer to the inner seat portion 47 in the axial direction than the small diameter hole portion 45 is. The passage in the large diameter hole portion 46 of the piston main body 36 is in constant communication with a piston rod passage portion 51 in the passage notch portion 30 of the piston rod 25 by overlapping the positions in the axial direction.

In the piston main body 36, an outer side of the valve seat portion 48 in the radial direction is formed in a stepped shape having an axial height lower than that of the valve seat portion 48. An opening of the passage hole 39 on the contraction side on the side of the lower chamber 23 is disposed in a portion of the stepped shape. In addition, similarly, in the piston main body 36, an outer side of the valve seat portion 50 in the radial direction is formed in a stepped shape having an axial height lower than that of the valve seat portion 50. An opening of the passage hole 38 on the extension side on the side of the upper chamber 22 is disposed in a portion of the stepped shape.

The first damping force generating mechanism 42 on the contraction side includes the valve seat portion 50 of the piston 21. The first damping force generating mechanism 42 has a sheet of disk 63, a plurality of sheets of (specifically, two sheets of) disks 64 with the same inner diameter and the same outer diameter, a plurality of sheets of (specifically, three sheets of) disks 65 with the same inner diameter and the same outer diameter, a plurality of sheets of (specifically, two sheets of) disks 66 with the same inner diameter and the same outer diameter, a sheet of disk 67, a sheet of disk 68, and a sheet of annular member 69, in sequence from the side of the piston 21 in the axial direction. All the disk 63 to 68 and the annular member 69 are formed of a metal and formed in a porous circular flat plate shape with a fixed thickness. All the disks 63 to 68 and the annular member 69 are positioned with respect to the piston rod 25 in the radial direction by fitting the attachment shaft portion 28 thereinto. The disks 63 to 68 are plain disks (flat disks that do not protrude in the axial direction).

The disk 63 has an outer diameter smaller than the inner diameter of the valve seat portion 50 having a diameter greater than the outer diameter of the inner seat portion 49 of the piston 21. The disk 63 normally abuts the inner seat portion 49. The plurality of sheets of disks 64 have the outer diameter equal to the outer diameter of the valve seat portion 50 of the piston 21. The plurality of sheets of disks 64 can seat on the valve seat portion 50. The plurality of sheets of disks 65 have an outer diameter smaller than the outer diameter of the disks 64. The plurality of sheets of disks 66 have an outer diameter smaller than the outer diameter of the disks 65. The disk 67 has an outer diameter equal to the outer diameter of the inner seat portion 49 of the piston 21 having a diameter smaller than the outer diameter of the disks 66. The disk 68 has an outer diameter equal to the outer diameter of the disks 65. The annular member 69 has an outer diameter greater than the outer diameter of the shaft step portion 29 of the piston rod 25 having a diameter smaller than the outer diameter of the disk 68. The annular member 69 thicker than and having higher rigidity than the disk 63 to 68 abuts the shaft step portion 29.

The plurality of sheets of disks 64, the plurality of sheets of disks 65 and the plurality of sheets of disks 66 constitute a main valve 71 on the contraction side that can separate from and seat on the valve seat portion 50. The main valve 71 brings the passages in the plurality of passage holes 39 and in the ring groove 56 in communication with the upper chamber 22 and suppresses flowing the oil liquid L between the valve seat portion 50 and the main valve 71 to generate a damping force by being separated from the valve seat portion 50. The annular member 69 restricts deformation of a prescribed level or more of the main valve 71 in the opening direction by abutting the main valve 71 together with the disk 68.

The passages in the plurality of passage holes 39 and in the ring groove 56 and the passages between the main valve 71 and the valve seat portion 50 that appears upon opening of the valve are formed in the piston 21, and constitutes a first passage 72 on the contraction side through which the oil liquid L flows out from the lower chamber 23 that is an upstream side in the cylinder 4 to the upper chamber 22 that is a downstream side by movement of the piston 21 toward the lower chamber 23. The first damping force generating mechanism 42 on the contraction side that generates a damping force includes the main valve 71 and the valve seat portion 50. Accordingly, the first damping force generating mechanism 42 is provided in the first passage 72. The first passage 72 is formed in the piston 21 including the valve seat portion 50. When the piston rod 25 and the piston 21 move to the contraction side, the oil liquid L passes through the first passage 72.

In the first damping force generating mechanism 42 on the contraction side, a fixed orifice configured to allow communication between the upper chamber 22 and the lower chamber 23 is not formed in both of the valve seat portion 50 and the main valve 71 abutting the valve seat portion 50 even when they abut each other. That is, the first damping force generating mechanism 42 on the contraction side does not allow communication between the upper chamber 22 and the lower chamber 23 when the valve seat portion 50 and the main valve 71 are abutting over the entire circumference. In other words, the first passage 72 does not have a fixed orifice that normally allows communication between the upper chamber 22 and the lower chamber 23, and is not a passage that normally allows communication between the upper chamber 22 and the lower chamber 23.

The first damping force generating mechanism 41 on the extension side includes the valve seat portion 48 of the piston 21. The first damping force generating mechanism 41 has a sheet of disk 82, a sheet of disk 83, a plurality of sheets of (specifically, four sheets of) disks 84 with the same inner diameter and the same outer diameter, a sheet of disk 85, a plurality of sheets of (specifically, three sheets of) disks 86 with the same inner diameter and the same outer diameter, and a sheet of disk 87, in sequence from the side of the piston 21 in the axial direction. All the disks 82 to 87 are formed of a metal and are plain disks having a porous circular flat plate shape with a fixed thickness. All the disks 82 to 87 are positioned with respect to the piston rod 25 in the radial direction by fitting the attachment shaft portion 28 thereinto.

Figure 3:
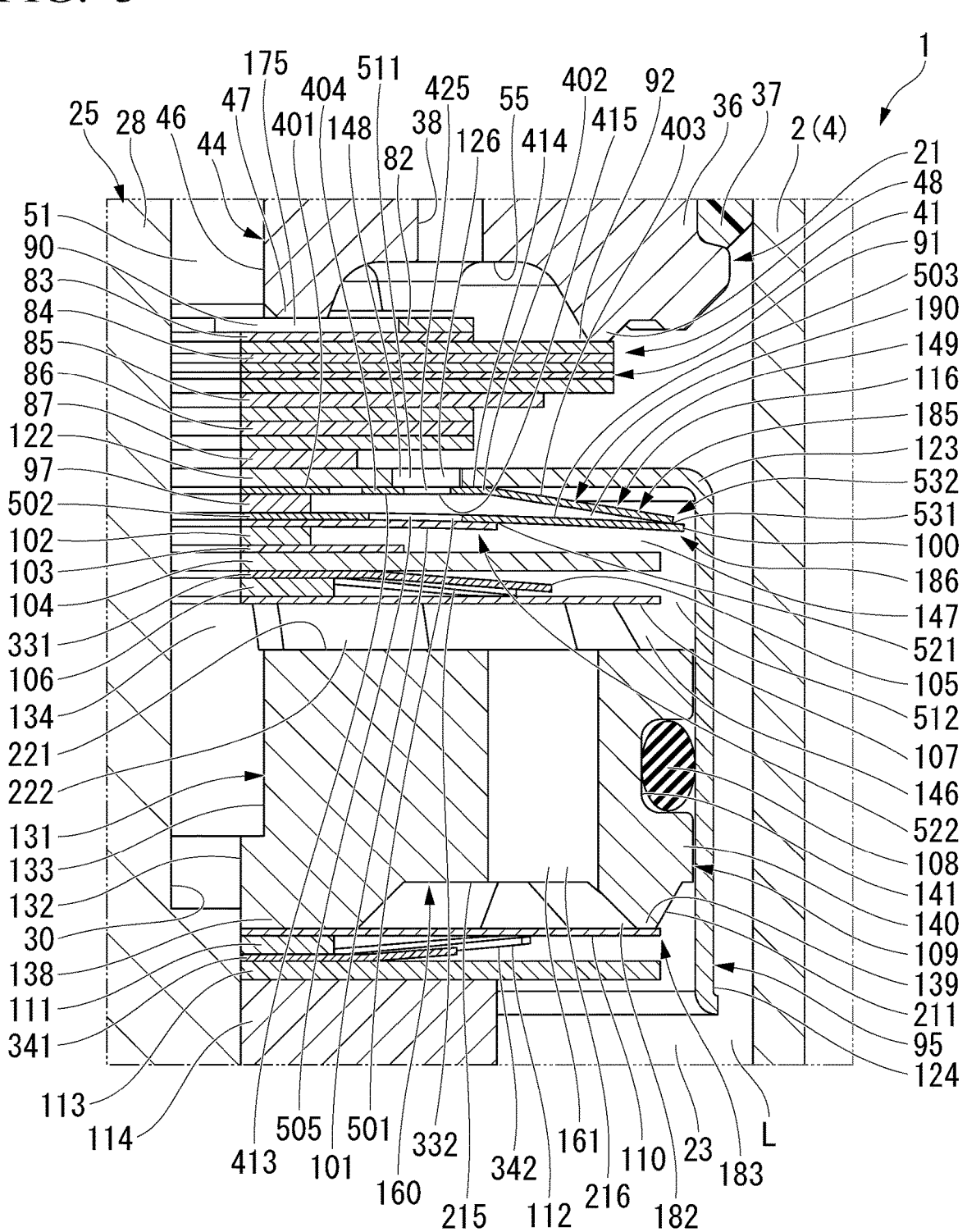
FIG. 3 is a partial cross-sectional view showing a major part of the shock absorber according to the first embodiment of the present invention.

The disk 82 has an outer diameter smaller than the inner diameter of the valve seat portion 48 having a diameter greater than the outer diameter of the inner seat portion 47 of the piston 21. The disk 82 normally abuts the inner seat portion 47. As shown in FIG. 3, a notch portion 90 configured to normally bring the passages in the ring groove 55 and in the plurality of passage holes 38 in communication with the passage in the large diameter hole portion 46 of the piston 21 and the piston rod passage portion 51 in the passage notch portion 30 of the piston rod 25 is formed in the disk 82 from a middle position of an outer side of the inner seat portion 47 in the radial direction to an inner circumferential edge portion. The notch portion 90 is formed upon pressing of the disk 82. The notch portion 90 is adjacent to and faces the large diameter hole portion 46 of the piston 21. The disk 83 has the same outer diameter as that of the disk 82, and a notch portion like the disk 82 is not formed. The plurality of sheets of disks 84 have the same outer diameter as that of the valve seat portion 48 of the piston 21. The plurality of sheets of disks 84 can seat on the valve seat portion 48. The disk 85 has an outer diameter smaller than that of the disks 84. The plurality of sheets of disks 86 have an outer diameter smaller than that of the disk 85. The disk 87 has an outer diameter slightly greater than that of the inner seat portion 47 of the piston 21 having a diameter smaller than the outer diameter of the disks 86.

The plurality of sheets of disks 84, the sheet of disk 85, and the plurality of sheets of disks 86 constitute a main valve 91 on the extension side that can be separated from or seat on the valve seat portion 48. The main valve 91 brings the passages in the ring groove 55 and in the plurality of passage holes 38 in communication with the lower chamber 23 and suppresses flowing of the oil liquid L between the valve seat portion 48 and the main valve 91 to generate a damping force by being separated from the valve seat portion 48.

As shown in FIG. 2, the passages in the plurality of passage holes 38 and in the ring groove 55 and the passage between the main valve 91 and the valve seat portion 48 that appears upon opening of the valve are formed in the piston 21, and constitutes a first passage 92 on the extension side through which the oil liquid L flows out from the upper chamber 22 that is an upstream side in the cylinder 4 to the lower chamber 23 that is a downstream side by movement of the piston 21 toward the upper chamber 22. The first damping force generating mechanism 41 on the extension side that generates a damping force includes the main valve 91 and the valve seat portion 48. Accordingly, the first damping force generating mechanism 41 is provided in the first passage 92. The first passage 92 is formed in the piston 21 including the valve seat portion 48. When piston rod 25 and the piston 21 move toward the extension side, the oil liquid L passes through the first passage 92.

In the first damping force generating mechanism 41 on the extension side, a fixed orifice configured to allow communication between the upper chamber 22 and the lower chamber 23 is not form in both of the valve seat portion 48 and the main valve 91 abutting the valve seat portion 48 even in a state in which they abut each other. That is, the first damping force generating mechanism 41 on the extension side does not allow communication between the upper chamber 22 and the lower chamber 23 when the valve seat portion 48 and the main valve 91 are abutting each other over the entire circumference. In other words, the first passage 92 does not have a fixed orifice configured to normally allow communication between the upper chamber 22 and the lower chamber 23, and is not a passage configured to normally allow communication between the upper chamber 22 and the lower chamber 23.

As shown in FIG. 3, a cap member 95, a sheet of plate spring 116 (biasing member), a sheet of disk 97, a sheet of flexible disk 100, a sheet of valve seat disk 101, a sheet of disk 102, a sheet of disk 103, a sheet of disk 104, a sheet of spring member 105, a sheet of disk 106, a sheet of sub valve 107, a valve seat member 109 having an O-ring 108 provided on an outer circumferential side, a sheet of a sub valve 110, a sheet of disk 111, a sheet of spring member 112, a sheet of disk 113, and a sheet of annular member 114 are provided by fitting the attachment shaft portion 28 of the piston rod 25 thereinto on a side of the first damping force generating mechanism 41 on the extension side opposite to the piston 21 in sequence from the side of the first damping force generating mechanism 41. When the attachment shaft portion 28 is fitted thereinto, the cap member 95, the plate spring 116, the disk 97, the flexible disk 100, the valve seat disk 101, the disk 102 to 104, the spring member 105, the disk 106, the sub valve 107, the valve seat member 109, the sub valve 110, the disk 111, the spring member 112, the disk 113 and the annular member 114 are located with respect to the piston rod 25 in the radial direction.

As shown in FIG. 2, the attachment shaft portion 28 of the piston rod 25 is formed with the male screw 31 at a portion that protrudes from the annular member 114. A nut 119 is screwed onto the male screw 31. The nut 119 abuts the annular member 114.

The annular member 69, the disk 63 to 68, the piston 21, the disk 82 to 87, the cap member 95, the plate spring 116 shown in FIG. 3, the disk 97, the flexible disk 100, the valve seat disk 101, the disk 102 to 104, the spring member 105, the disk 106, the sub valve 107, the valve seat member 109, the sub valve 110, the disk 111, the spring member 112, the disk 113, and the annular member 114 are clamped by the shaft step portion 29 of the piston rod 25 and the nut 119 in the axial direction on at least the radial inner circumferential side as shown in FIG. 2 and fixed to the piston rod 25. In this state, as shown in FIG. 3, the plate spring 116, the disk 97, the flexible disk 100, the valve seat disk 101, the disk 102 to 104, the spring member 105, the disk 106, the sub valve 107, the valve seat member 109, the sub valve 110, the disk 111, the spring member 112, and the disk 113 are disposed in the cap member 95.

All the cap member 95, the disks 97, 102 to 104, 106, 111 and 113, the flexible disk 100, the valve seat disk 101, the spring members 105 and 112, the sub valves 107 and 110, the valve seat member 109, the annular member 114 and the plate spring 116 are formed of a metal. All the disks 97, 102 to 104, 106, 111 and 113, the flexible disk 100, the valve seat disk 101, the sub valves 107 and 110 and the annular member 114 are plain disks formed in a porous circular flat plate shape with a fixed thickness. The cap member 95, the valve seat member 109 and the plate spring 116 are circular annular shapes. The spring members 105 and 112 are annular shapes.

The cap member 95 is a bottomed cylindrical integral molding part. The cap member 95 is formed by, for example, plastic processing or cutting of a metal plate. The cap member 95 has a bottom section 122 having a porous circular plate shape with a fixed thickness, an intermediate curved portion 123 expanding and extending from the outer circumferential edge portion of the bottom section 122 toward one side of the bottom section 122 in the axial direction, and a tubular portion 124 extending from an edge portion of the intermediate curved portion 123 opposite to the bottom section 122 in a direction opposite to the bottom section 122.

The bottom section 122 is a porous circular flat plate shape with a fixed width in the radial direction over the entire circumference. The attachment shaft portion 28 of the piston rod 25 is fitted into an inner circumferential portion of the bottom section 122. When the attachment shaft portion 28 is fitted into the inner circumferential portion of the bottom section 122, the cap member 95 is positioned and disposed coaxially with respect to the piston rod 25 in the radial direction. A plurality of passage holes 126 passing through the bottom section 122 in the axial direction of the bottom section 122 are formed in the bottom section 122 between the inner circumferential portion and the outer circumferential portion. The plurality of passage holes 126 are disposed at equidistant positions from a center of bottom section 122 at equal intervals in the circumferential direction of the bottom section 122. The cap member 95 abuts the disk 87 as the bottom section 122 is oriented and disposed to be located closer to the piston 21 than the tubular portion 124. The cap member 95 is fitted into the attachment shaft portion 28 in the inner circumferential portion of the bottom section 122. An outer diameter of the disk 87 has a diameter smaller than two times a shortest distance that connects a center of the cap member 95 in the radial direction and the passage holes 126.

The intermediate curved portion 123 has an annular shape coaxial with the bottom section 122. The intermediate curved portion 123 has a curved shape in which a cross section on a surface including the center axis protrudes outward in the radial direction and toward the bottom section 122 in the axial direction. The tubular portion 124 is also coaxial with the bottom section 122 and the intermediate curved portion 123.

The cap member 95 is thicker than a sheet of thickness of the disks 84 to 86, and has higher rigidity than the disks 84 to 86 in combination of the bottomed cylindrical shape. Accordingly, the cap member 95 abuts the main valve 91 to restrict deformation of a prescribed level or more in the opening direction of the main valve 91 constituted by the plurality of sheets of disks 84 to 86.

Figure 4:
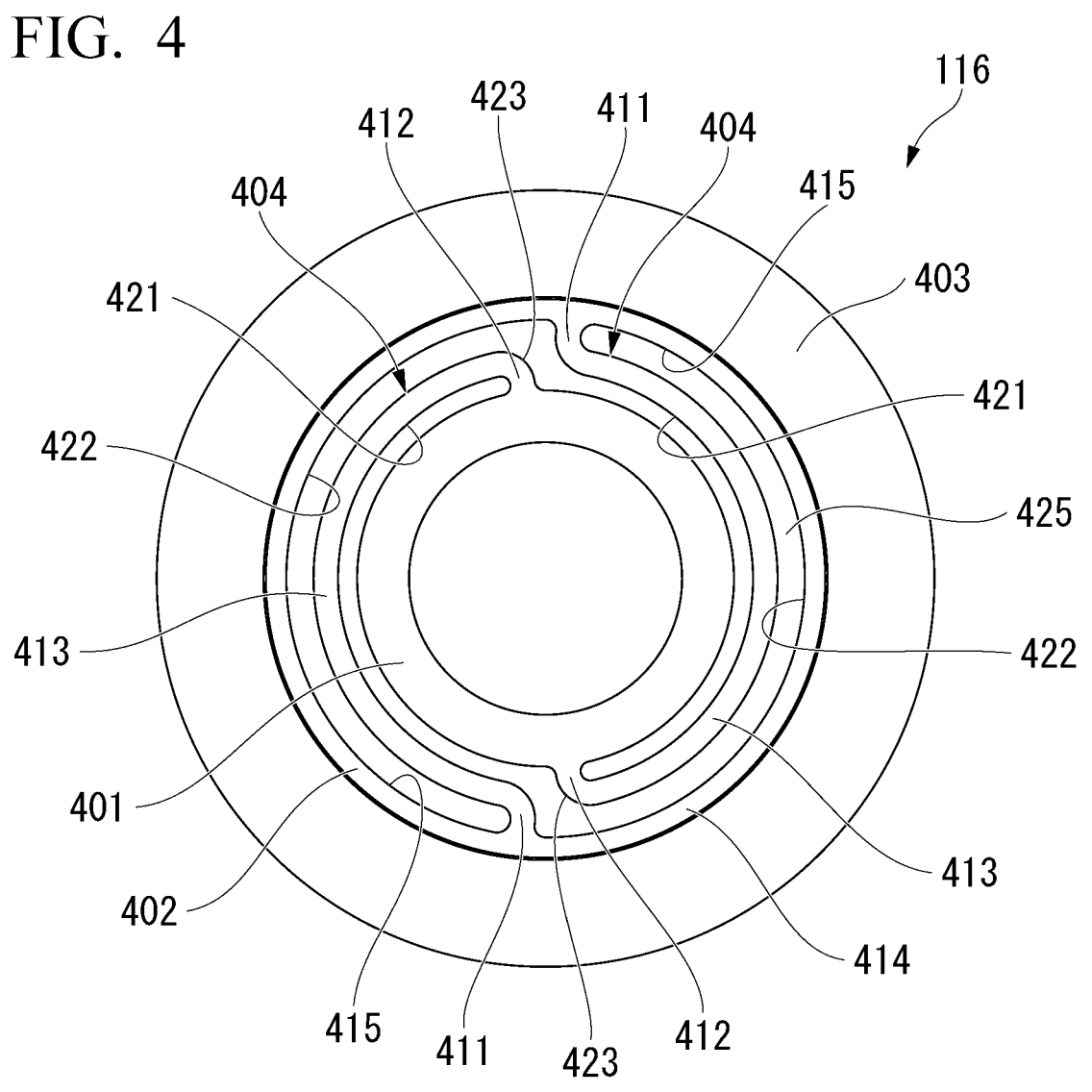

The plate spring 116 is a perforated circular metal plate and is flexible. The plate spring 116 is formed by stamping and folding a sheet of plate member through pressing. As shown in FIG. 4, the plate spring 116 has an inner annular portion 401, an intermediate annular portion 402, an outer conical portion 403, and a plurality of, specifically, two support portions 404 configured to connect the inner annular portion 401 and the intermediate annular portion 402. The inner annular portion 401 has a porous circular flat plate shape. The intermediate annular portion 402 is formed in a porous circular flat plate shape with an inner diameter greater than the outer diameter of the inner annular portion 401. The two support portions 404 are provided between the inner annular portion 401 and the intermediate annular portion 402. The inner annular portion 401, the intermediate annular portion 402 and the two support portions 404 have flat plate shapes disposed on the same plane. The outer conical portion 403 has a conical tubular shape that spreads outward from the outer circumferential edge portion of the intermediate annular portion 402 in the radial direction and toward one side in the axial direction. An outer diameter side of the plate spring 116 is the outer conical portion 403. An inner diameter side of the plate spring 116 is an inner planar portion 414 having the inner annular portion 401, the intermediate annular portion 402 and the two support portions 404. The inner planar portion 414 is more planar than the outer conical portion 403.

As shown in FIG. 3, the plate spring 116 has an outer diameter of the outer conical portion 403, i.e., an outer diameter of the plate spring 116, which is slightly smaller than the inner diameter of the tubular portion 124 of the cap member 95. The inner annular portion 401, the intermediate annular portion 402 and the two support portions 404 abut the bottom section 122 of the cap member 95. The outer conical portion 403 extends on the same side as the tubular portion 124 in the axial direction. The plate spring 116 is positioned with respect to the piston rod 25 in the radial direction by fitting the attachment shaft portion 28 into the inner circumferential side of the inner annular portion 401 in this state. The plate spring 116 is formed such that the inner circumferential end portion abuts the piston rod 25. The tubular portion 124 of the cap member 95 is disposed outside the plate spring 116 in the radial direction.

As shown in FIG. 4, all the inner annular portion 401, the intermediate annular portion 402 and the outer conical portion 403 have a fixed width in the radial direction over the entire circumference. The width of the outer conical portion 403 in the radial direction is greater than the width of the inner annular portion 401 in the radial direction. The width of the inner annular portion 401 in the radial direction is greater than the width of the intermediate annular portion 402 in the radial direction. The inner annular portion 401, the intermediate annular portion 402 and the outer conical portion 403 are disposed coaxially with each other. The two support portions 404 connect the inner annular portion 401, the intermediate annular portion 402 and the outer conical portion 403 in a coaxial state. The two support portions 404 connects an outer circumferential edge portion of the inner annular portion 401 and an inner circumferential edge portion of the intermediate annular portion 402.

The two support portions 404 have outer connecting portions 411 of two places disposed on the same straight line passing through centers of the inner annular portion 401, the intermediate annular portion 402 and the outer conical portion 403, in other words, a center of the plate spring 116. The outer connecting portions 411 are connected to the intermediate annular portion 402. The outer connecting portions 411 of the two places are disposed with different phases of 180 degrees in the circumferential direction of the intermediate annular portion 402. Both the outer connecting portions 411 of the two places protrude inward from the inner circumferential edge portion of the intermediate annular portion 402 in the radial direction of the intermediate annular portion 402.

The two support portions 404 have inner connecting portions 412 of two places disposed on the same straight line passing through the center of the plate spring 116. The inner connecting portions 412 are connected to the inner annular portion 401. The inner connecting portions 412 of the two places are disposed with different phases of 180 degrees in the circumferential direction of the inner annular portion 401. Both the inner connecting portions 412 of the two places protrude outward from the outer circumferential edge portion of the inner annular portion 401 in the radial direction of the inner annular portion 401. In both the outer connecting portions 411 of the two places, a distance of the plate spring 116 to the first inner connecting portion 412 in the circumferential direction is smaller than the distance to the second inner connecting portion 412. In other words, in both the inner connecting portions 412 of the two places, a distance of the plate spring 116 to the first outer connecting portion 411 in the circumferential direction is smaller than the distance to the second outer connecting portion 411.

A distance in the circumferential direction between the outer connecting portions 411 and the inner connecting portions 412 on the first side of the plate spring 116 is equal to the distance in the circumferential direction between the outer connecting portions 411 and the inner connecting portions 412 on the second side of the plate spring 116.

Connecting arm portions 413 of two places are provided on the two support portions 404 to connect the outer connecting portions 411 and the inner connecting portions 412. That is, the first connecting arm portion 413 configured to connect the outer connecting portions 411 and the inner connecting portions 412 on the first side in the circumferential direction of the plate spring 116 is provided on the plate spring 116. The outer connecting portions 411, the inner connecting portions 412 and the connecting arm portions 413 constitute the first support portion 404. The second connecting arm portion 413 configured to connect outer connecting portions 411 and the inner connecting portions 412 on the second side of the plate spring 116 in the circumferential direction is provided. The outer connecting portions 411, the inner connecting portions 412 and the connecting arm portions 413 constitute the second support portion 404.

The first and second connecting arm portions 413 extend in an arc shape along an outer circumferential surface of the inner annular portion 401 and an inner circumferential surface of the intermediate annular portion 402. The first and second connecting arm portions 413 are disposed on the same circle concentrically with the inner annular portion 401, the intermediate annular portion 402 and the outer conical portion 403. Each of the first and second connecting arm portions 413 extends within an angular range slightly smaller than 180° in the circumferential direction of the plate spring 116. In the first and second connecting arm portions 413, a radial distance from the inner circumferential surface of the intermediate annular portion 402 is greater than a radial distance from the outer circumferential surface of the inner annular portion 401.

The plate spring 116 has the above-mentioned shape so that stepped arc-shaped hole portions 415 of two places surrounded by the inner annular portion 401, the intermediate annular portion 402 and the support portions 404 of the two places. The hole portions 415 of the two places passes through the plate spring 116 in the thickness direction (axial direction). The hole portions 415 of the two places are provided between the inner annular portion 401 and the intermediate annular portion 402. Accordingly, the plate spring 116 has the stepped arc-shaped hole portions 415 of the two places from the inner circumferential end portion to the outer circumferential end portion. The stepped arc-shaped hole portions 415 of the two places are provided in the inner planar portion 414.

The hole portions 415 of the two places have the same shape. The hole portions 415 of the two places have an arc-shaped small diameter hole portion 421 formed between the inner annular portion 401 and the connecting arm portions 413, an arc-shaped large diameter hole portion 422 formed between the intermediate annular portion 402 and the connecting arm portions 413, and a connecting hole portion 423 configured to connect the small diameter hole portion 421 and the large diameter hole portion 422. Both the small diameter hole portion 421 and the large diameter hole portion 422 have arc shapes coaxial with the inner annular portion 401 and the intermediate annular portion 402. The large diameter hole portion 422 has an arc shape with a diameter greater than that of the small diameter hole portion 421. The hole portions 415 are disposed such that the large diameter hole portion 422 and the small diameter hole portion 421 are adjacent to each other in the circumferential direction. A side where the large diameter hole portion 422 and the small diameter hole portion 421 approach each other is in communication with the connecting hole portion 423 in the radial direction of the plate spring 116.

As shown in FIG. 3, an inner diameter of the intermediate annular portion 402 of the plate spring 116 is smaller than two times the longest distance that connects the center of the cap member 95 in the radial direction and the passage holes 126, and greater than two times the shortest distance that connects the center of the cap member 95 in the radial direction and the passage holes 126. Accordingly, in the plate spring 116, a communication passage 425 in the hole portions 415 is in constant communication with a communication passage 148 in the passage holes 126 of the bottom section 122. The plate spring 116 is in constant communication with the communication passage 148 in the passage holes 126 in a portion in the large diameter hole portion 422 shown in FIG. 4 of the communication passage 425 of the hole portions 415. As shown in FIG. 3, an outer diameter of the intermediate annular portion 402 of the plate spring 116, i.e., an inner diameter of the outer conical portion 403 is greater than two times the longest distance that connects the center of the cap member 95 in the radial direction and the passage holes 126. The plate spring 116 has the intermediate annular portion 402 that abuts on the outer position in the radial direction of the bottom section 122 of the cap member 95 from all the passage holes 126 of the bottom section 122 over the entire circumference.

The disk 97 has a fixed width in the radial direction over the entire circumference. An outer diameter of the disk 97 is smaller than that of the inner annular portion 401 of the plate spring 116. The disk 97 has a thickness greater than that of the inner annular portion 401 of the plate spring 116, i.e., a plate thickness of the plate spring 116.

The inner annular portion 401 of the plate spring 116 is clamped by the bottom section 122 of the cap member 95 shown in FIG. 3 and the disk 97 in the axial direction. Accordingly, the plate spring 116 is fixed to the piston rod 25. The support portions 404 of the two places and the intermediate annular portion 402 shown in FIG. 4 abut the bottom section 122 of the cap member 95 shown in FIG. 3 and do not abut the disk 97. Accordingly, the support portions 404 of the two places and the intermediate annular portion 402 are not clamped in the axial direction.

The flexible disk 100 is flexible. The inner circumferential end portion of the flexible disk 100 abuts the piston rod 25. An outer diameter of the flexible disk 100 is greater than the outer diameter of the plate spring 116, and slightly smaller than the inner diameter of the tubular portion 124 of the cap member 95. The flexible disk 100 has the same thickness as the plate thickness of the plate spring 116.

Figure 5:
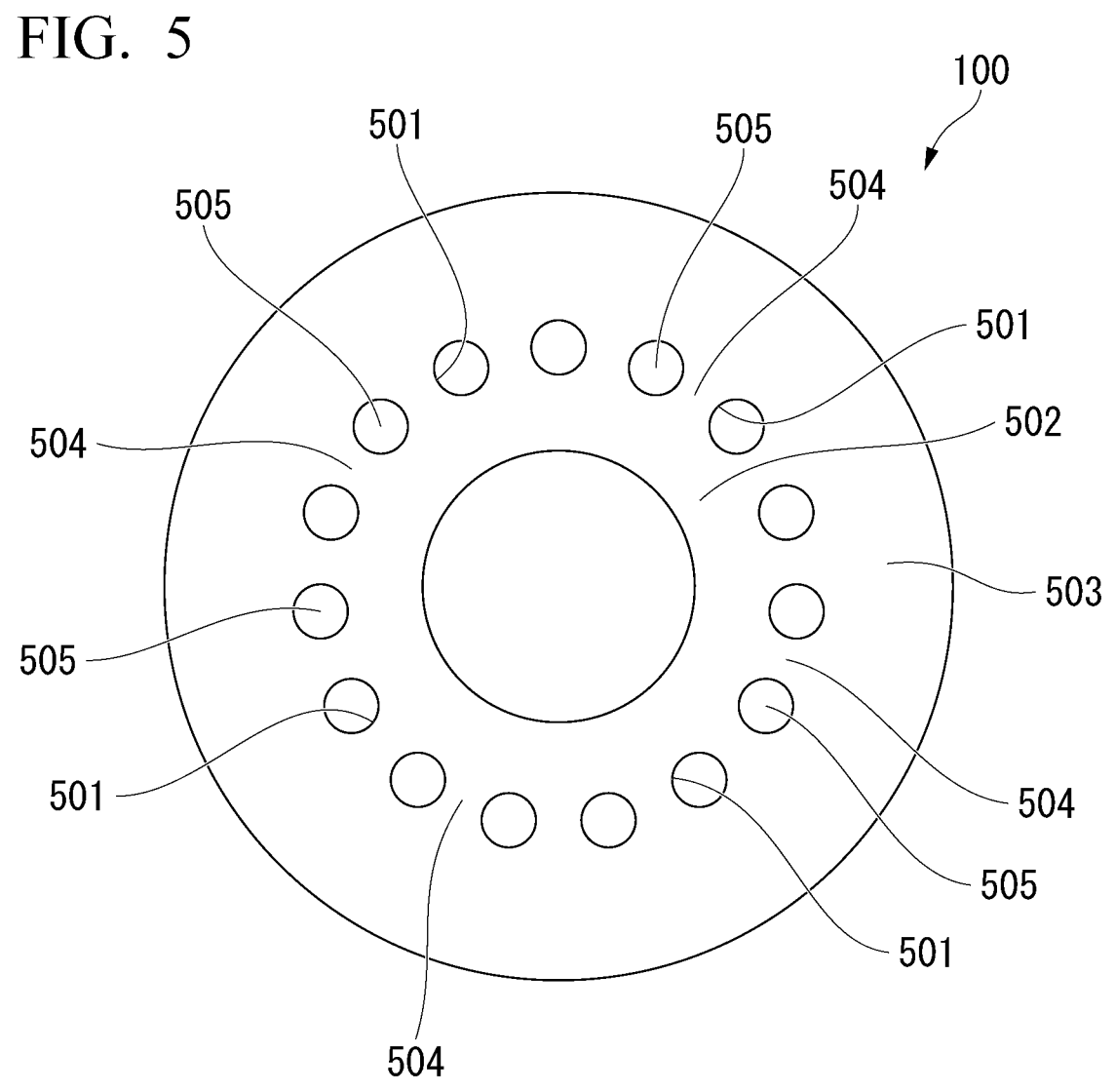

The flexible disk 100 is formed by stamping from a sheet of plate member through pressing. The flexible disk 100 forms a flat plate in a natural state before being assembled to the piston rod 25. As shown in FIG. 5, the flexible disk 100 has a fixed width in the radial direction over the entire circumference. A plurality of communication holes 501 are formed at an intermediate position of the flexible disk 100 in the radial direction on, specifically, 15 places. All the communication holes 501 are round holes with the same diameter and passes through the flexible disk 100 in the thickness direction (axial direction). All the communication holes 501 are formed at equidistant positions from the center of the flexible disk 100. All the communication holes 501 are formed at equal intervals in the circumferential direction of the flexible disk 100.

The flexible disk 100 has an inner annular portion 502 from the inner circumferential edge portion to the communication hole 501, an outer conical portion 503 from the outer circumferential edge portion to the communication hole 501, and a connecting portion 504 extending in the radial direction of the flexible disk 100 and configured to connect the inner annular portion 502 and the outer conical portion 503, by forming the plurality of communication holes 501. The inner annular portion 502 has a fixed width in the radial direction over the entire circumference. The outer conical portion 503 also has a fixed width in the radial direction over the entire circumference. The outer conical portion 503 has a width in the radial direction greater than that of the inner annular portion 502.

The connecting portions 504 are located between the communication hole 501 and the communication hole 501 neighboring in the circumferential direction of the flexible disk 100. Accordingly, the connecting portions 504 are formed at the intermediate position of the flexible disk 100 in the radial direction on, a plurality of, specifically, the same number of 15 places as the communication holes 501. All the connecting portions 504 have the same shape and are formed at equidistant positions from the center of the flexible disk 100. All the connecting portions 504 are formed at equal intervals in the circumferential direction of the flexible disk 100. As shown in FIG. 3, an outer diameter of the inner annular portion 502 of the flexible disk 100 is greater than the outer diameter of the disk 97. Accordingly, the communication hole 501 of the flexible disk 100 is not closed by the disk 97.

The plate spring 116 has a circular edge portion opposite to the intermediate annular portion 402 of the outer conical portion 403. The circular edge portion abuts an outer circumferential edge portion side of the outer conical portion 503 of the flexible disk 100 over the entire circumference.

The valve seat disk 101 has a fixed width in the radial direction over the entire circumference. The valve seat disk 101 has a flat plate shape in a natural state before being assembled to the piston rod 25. The valve seat disk 101 is slightly thinner than the flexible disk 100. An outer diameter of the valve seat disk 101 is greater than the inner diameter of the outer conical portion 503 of the flexible disk 100 and smaller than the outer diameter of the outer conical portion 503. The valve seat disk 101 closes all the communication holes 501 when the valve set disk 101 abuts the outer conical portion 503 of the flexible disk 100 in a surface contact manner over the entire circumference.

The disk 102 has the same shape as the disk 97 and compatibility. The disk 102 clamps the inner circumferential sides of the flexible disk 100 and the valve seat disk 101 with the disk 97 in the axial direction.

The disk 103 has a fixed width in the radial direction over the entire circumference. An outer diameter of the disk 103 is greater than the outer diameter of the disk 102 and smaller than the outer diameter of the valve seat disk 101. The disk 103 has the same thickness as that of the flexible disk 100.

The disk 104 has a fixed width in the radial direction over the entire circumference. The outer diameter of the disk 104 is greater than the outer diameter of the valve seat disk 101 and smaller than the outer diameter of the flexible disk 100. The disk 104 has the same thickness as that of the disks 97 and 102. The disk 104 has a higher thickness and higher rigidity than the flexible disk 100 and the valve seat disk 101.

The spring member 105 has a base plate section 331 having a porous circular flat plate shape and fitted to the attachment shaft portion 28, and a plurality of spring plate portions 332 extending outward in the radial direction of the base plate section 331 from positions at equal intervals in the circumferential direction of the base plate section 331. The spring plate portions 332 are inclined with respect to the base plate section 331 to be separated from the base plate section 331 in the axial direction of the base plate section 331 as they go toward the extension tip side. The spring member 105 abuts the disk 104 in the base plate section 331. The spring member 105 is attached to the attachment shaft portion 28 such that the spring plate portions 332 extend from the base plate section 331 toward the sub valve 107 in the axial direction of the base plate section 331.

An outer diameter of the disk 106 is smaller than the outer diameter of the base plate section 331 of the spring member 105 and greater than the outer diameter of the disk 102. The base plate section 331 of the spring member 105 abuts the disk 106. The plurality of spring plate portions 332 of the spring member 105 abut the sub valve 107.

As shown in FIG. 2, the valve seat member 109 has a porous circular plate shape. A through-hole 131 extending in the axial direction, passing in the thickness direction and into which the attachment shaft portion 28 is inserted, is formed in the valve seat member 109 at a center in the radial direction. The through-hole 131 has a small diameter hole portion 132 on one side in the axial direction into which the attachment shaft portion 28 of the piston rod 25 is fitted, and a large diameter hole portion 133 on the other side in the axial direction having a larger diameter than the small diameter hole portion 132.

The valve seat member 109 has an inner seat portion 134 formed on an end portion on the side of the large diameter hole portion 133 in the axial direction in an annular shape to surround the large diameter hole portion 133. The valve seat member 109 has a valve seat portion 135 spreading outward from the inner seat portion 134 in the radial direction. The valve seat member 109 has an inner seat portion 138 formed on an end portion on the side of the small diameter hole portion 132 of an opposite side in the axial direction in an annular shape to surround the small diameter hole portion 132. The valve seat member 109 has a valve seat portion 139 spreading outward from the inner seat portion 138 in the radial direction. The valve seat member 109 has a main body portion 140 having a porous circular plate shape formed between the inner seat portion 134 and the valve seat portion 135, and the inner seat portion 138 and the valve seat portion 139 in the axial direction.

The inner seat portion 134 protrudes from an inner circumferential edge portion of the main body portion 140 on the side of the large diameter hole portion 133 in the axial direction toward one side of the main body portion 140 in the axial direction. The valve seat portion 135 also protrudes from the main body portion 140 in the axial direction of the main body portion 140 outside the inner seat portion 134 in the radial direction toward the same side as the inner seat portion 134. In the inner seat portion 134 and the valve seat portion 135, a tip surface on a protrusion side, i.e., a tip surface opposite to the main body portion 140 is a flat surface. The inner seat portion 134 and the valve seat portion 135 spread in the axis-orthogonal direction of the valve seat member 109 and are disposed on the same plane.

The inner seat portion 138 protrudes from an inner circumferential edge portion of the main body portion 140 on the side of the small diameter hole portion 132 in the axial direction toward a side opposite to the inner seat portion 134 in the axial direction of the main body portion 140. The valve seat portion 139 also protrudes from the main body portion 140 in the axial direction of the main body portion 140 outside the inner seat portion 138 in the radial direction toward the same side as the inner seat portion 138. In the inner seat portion 138 and the valve seat portion 139, a tip surface on the protrusion side, i.e., a tip surface opposite to the main body portion 140 is a flat surface. The inner seat portion 138 and the valve seat portion 139 spread in the axis-orthogonal direction of the valve seat member 109 and are disposed on the same plane. The inner seat portions 134 and 138 have the same outer diameter.

The valve seat portion 135 is a heteromorphic seat having a flower petal shape. The valve seat portion 135 has a plurality of (in FIG. 2, shown in only one place due to the cross section) valve seat configuration portions 201. The valve seat configuration portions 201 have the same shape and are disposed at equal intervals in the circumferential direction of the valve seat member 109. The inner seat portion 134 has an annular shape about the center axis of the valve seat member 109.

A passage concave portion 205 surrounded by a part of the inner seat portion 134 and recessed from the tip surface of the protrusion side thereof in the axial direction of the valve seat member 109 is formed inside each of the valve seat configuration portions 201. The bottom surface of the passage concave portion 205 is formed by the main body portion 140. The passage concave portion 205 is formed inside all the valve seat configuration portions 201.

A passage hole 206 passing through the valve seat member 109 in the axial direction by passing through the main body portion 140 in the axial direction is formed at the central position of the passage concave portion 205 in the circumferential direction of the valve seat member 109.

The passage hole 206 is a linear hole parallel to a center axis of the valve seat member 109. The passage hole 206 is formed in the bottom surface of the entire passage concave portion 205.

The valve seat portion 139 is also a heteromorphic seat having a flower petal shape. The valve seat portion 139 has a plurality of (in FIG. 2, shown in only one place due to the cross section) valve seat configuration portions 211. The valve seat configuration portions 211 have the same shape and are disposed at equal intervals in the circumferential direction of the valve seat member 109. The valve seat configuration portions 211 have the same shape as the valve seat configuration portions 201. The inner seat portion 138 has an annular shape about a center axis of the valve seat member 109.

A passage concave portion 215 surrounded by a part of the inner seat portion 138 and recessed from the tip surface of the protrusion side thereof in the axial direction of the valve seat member 109 is formed inside each of the valve seat configuration portions 211. The bottom surface of the passage concave portion 215 is formed by the main body portion 140. The passage concave portion 215 is formed inside all the valve seat configuration portions 211.

A passage hole 216 passing through the valve seat member 109 in the axial direction by passing through the main body portion 140 in the axial direction is formed at a central position of the passage concave portion 215 in the circumferential direction of the valve seat member 109.

The passage hole 216 is a linear hole parallel to the center axis of the valve seat member 109. The passage hole 216 is formed in the bottom surface of the entire passage concave portion 215.

A disposition pitch of the plurality of valve seat configuration portions 201 in the circumferential direction of the valve seat member 109 is the same as a disposition pitch of the plurality of valve seat configuration portions 211 in the circumferential direction of the valve seat member 109. The valve seat configuration portions 201 and the valve seat configuration portions 211 are offset from each other by half a pitch. The passage hole 206 is disposed between the valve seat configuration portion 211 and the valve seat configuration portion 211 neighboring in the circumferential direction of the valve seat member 109. Accordingly, the passage hole 206 is disposed outside a range of the valve seat portion 139. The passage hole 216 is disposed between the valve seat configuration portion 201 and the valve seat configuration portion 201 neighboring in the circumferential direction of the valve seat member 109. Accordingly, the passage hole 216 is disposed outside the range of the valve seat portion 135.

The valve seat member 109 is formed with a passage groove 221 crossing the inner seat portion 134 in the radial direction on the side of the large diameter hole portion 133 in the axial direction. The passage groove 221 is recessed from the tip surface of the inner seat portion 134 opposite to the main body portion 140 in the axial direction of the valve seat member 109. The passage groove 221 includes a space between the valve seat configuration portion 201 and the valve seat configuration portion 201 neighboring in the circumferential direction of the valve seat member 109. The passage hole 216 is open to the bottom surface of the passage groove 221. The passage groove 221 allows communication between the passage hole 216 and the large diameter hole portion 133.

The passage hole 216 and the passage concave portion 215 in which the passage hole 216 opens form first passage portions 161 provided in the valve seat member 109. The plurality of first passage portions 161 are provided on the valve seat member 109 at equal intervals in the circumferential direction of the valve seat member 109. The passage groove 221 is formed with radial passages 222 extending toward the first passage portions 161 in the radial direction. The plurality of radial passages 222 are provided in the valve seat member 109 at equal intervals in the circumferential direction of the valve seat member 109.

The valve seat member 109 has passage grooves 225 formed between the valve seat configuration portions 211 and the valve seat configuration portions 211 neighboring in the circumferential direction of the valve seat member 109. The passage hole 206 opens to the bottom surfaces of the passage grooves 225. Accordingly, the passage grooves 225 are in communication with the passage hole 206.

The passage hole 206 and the passage concave portion 205 in which the passage hole 206 opens form second passage portions 162 provided in the valve seat member 109. The plurality of second passage portions 162 are provided in the valve seat member 109 at equal intervals in the circumferential direction of the valve seat member 109.

The plurality of first passage portions 161 and the plurality of second passage portions 162 are provided in the valve seat member 109 to constitute a valve seat member passage portion 160 through which the oil liquid L flows.

An annular seal groove 141 recessed inward in the radial direction at an axial intermediate position of the outer circumferential portion of the main body portion 140 is formed in the valve seat member 109. The O-ring 108 is disposed in the seal groove 141. The valve seat member 109 is fitted into the tubular portion 124 of the cap member 95 in the outer circumferential portion in a state in which the inner seat portion 138 and the valve seat portion 139 face a side opposite to the bottom section 122. In this state, the O-ring 108 seals a gap between the tubular portion 124 of the cap member 95 and the valve seat member 109.

The cap member 95, the O-ring 108 and the valve seat member 109 form a cap chamber 146 inside the cap member 95. The cap chamber 146 is provided between the bottom section 122 of the cap member 95 and the valve seat member 109. As shown in FIG. 3, the disks 97, 102 to 104, and 106, the flexible disk 100, the valve seat disk 101, the spring member 105, the sub valve 107 and the plate spring 116 are provided in the cap chamber 146.

A lower chamber communication chamber 149 surrounded by the flexible disk 100, the valve seat disk 101, the plate spring 116, the disk 97, and the bottom section 122 of the cap member 95 is formed in the cap chamber 146. The lower chamber communication chamber 149 is in constant communication with the communication passage 425 in the plurality of hole portions 415 of the plate spring 116 and the communication passage 148 in the plurality of passage holes 126 of the bottom section 122 of the cap member 95.

An upper chamber communication chamber 147 surrounded by the cap member 95, the plate spring 116, the flexible disk 100, the valve seat disk 101, the disks 102 to 104 and 106, the spring member 105 and the sub valve 107 is formed in the cap chamber 146. Communication between the lower chamber communication chamber 149 and the upper chamber communication chamber 147 is blocked by the plate spring 116, the flexible disk 100 and the valve seat disk 101.

As shown in FIG. 2, the annular valve seat member 109 and the bottomed cylindrical cap member 95 are disposed in the lower chamber 23. Here, in the valve seat member 109, the valve seat portion 135 is disposed on the side of the cap chamber 146, and the valve seat portion 139 is disposed on the side of the lower chamber 23. As shown in FIG. 3, the communication passage 148 of the bottom section 122 of the cap member 95 is in constant communication with the lower chamber 23.

The upper chamber communication chamber 147 is in constant communication with the upper chamber 22 shown in FIG. 2 via the passage between the tubular portion 124 of the cap member 95 and the sub valve 107, the radial passages 222 in the passage groove 221 of the valve seat member 109, the passage in the large diameter hole portion 133 of the valve seat member 109, the piston rod passage portion 51 in the passage notch portion 30 of the piston rod 25, the passage in the large diameter hole portion 46 of the piston 21, the passage in the notch portion 90 of the disk 82, and the passages in the ring groove 55 of the piston 21 and in the plurality of passage holes 38.

When the flexible disk 100 is bent in the axial direction, a capacity of the lower chamber communication chamber 149 and the upper chamber communication chamber 147 is varied. That is, when the flexible disk 100 is bent, the lower chamber communication chamber 149 and the upper chamber communication chamber 147 are provided with a function of an accumulator. The lower chamber communication chamber 149 reduces the capacity to absorb an increase in capacity of the upper chamber communication chamber 147 and discharges the oil liquid L to the lower chamber 23, or increases the capacity to absorb a decrease in capacity of the upper chamber communication chamber 147 to cause the oil liquid L to flow from the lower chamber 23. On the other hand, the upper chamber communication chamber 147 reduces the capacity to absorb an increase in capacity of the lower chamber communication chamber 149 and discharges the oil liquid L toward the upper chamber 22, or increases the capacity to absorb a decrease in capacity of the lower chamber communication chamber 149 to cause the oil liquid L to flow from the upper chamber 22.

As described above, inhibition of deformation of the flexible disk 100 by the oil liquid L in the upper chamber communication chamber 147 and the lower chamber communication chamber 149 is suppressed.

The plurality of passage grooves 225 of the valve seat member 109 is provided to face the lower chamber 23. The plurality of second passage portions 162 are in constant communication with the lower chamber 23 via the passages in the plurality of passage grooves 225. As shown in FIG. 3, the communication passage 425 formed in the plate spring 116 and the communication passage 148 formed in the bottom section 122 of the cap member 95 are in constant communication with the lower chamber 23, which is one of the upper chamber 22 and the lower chamber 23.

The radial passages 222 in the passage groove 221 that opens in the first passage portions 161 of the valve seat member 109 are in constant communication with the upper chamber communication chamber 147. The radial passages 222 bring the passages in the upper chamber communication chamber 147 and in the large diameter hole portion 133 of the valve seat member 109 in constant communication with the piston rod passage portion 51 in the passage notch portion 30 of the piston rod 25.

As shown in FIG. 2, the sub valve 107 has a disk shape. The sub valve 107 has the same outer diameter as that of the valve seat portion 135 of the valve seat member 109. The sub valve 107 always abuts the inner seat portion 134 and can be separated from or seat on the valve seat portion 135. The sub valve 107 is seated entirely on the valve seat portion 135 to close all the second passage portions 162. The sub valve 107 is seated entirely on the valve seat configuration portions 201 of any of the valve seat portion 135 to close the second passage portions 162 inside the valve seat configuration portions 201. The spring member 105 causes the sub valve 107 to abut the valve seat portion 135 of the valve seat member 109. The sub valve 107 is seated on the valve seat portion 135 by a biasing force of the spring member 105 to close the second passage portions 162.

The sub valve 107 that can be separated from or seat on the valve seat portion 135 is provided in the cap chamber 146. The sub valve 107 is separated from the valve seat portion 135 in the cap chamber 146 to allow communication between the plurality of second passage portions 162 and the upper chamber communication chamber 147, and as a result, brings the lower chamber 23 in communication the upper chamber 22. Here, the sub valve 107 suppresses a flow of the oil liquid L between the sub valve 107 and the valve seat portion 135 to generate damping force. The sub valve 107 is an inflow valve that opens when the oil liquid L flows into the upper chamber communication chamber 147 from the lower chamber 23 via the plurality of second passage portions 162. The sub valve 107 is a check valve configured to restrict discharge of the oil liquid L from the upper chamber communication chamber 147 to the lower chamber 23 via the second passage portions 162. Here, the passage hole 216 that constitutes the first passage portion 161 opens outside the range of the valve seat portion 135 in the valve seat member 109. For this reason, the passage hole 216 is in constant communication with the upper chamber communication chamber 147 independently of the sub valve 107 seated on the valve seat portion 135.

The passages in the plurality of passage grooves 225, the plurality of second passage portions 162, the passage between the sub valve 107 and the valve seat portion 135 that appears upon opening of the valve, the upper chamber communication chamber 147, the radial passages 222 in the passage groove 221 of the valve seat member 109, the passage in the large diameter hole portion 133 of the valve seat member 109, the piston rod passage portion 51 in the passage notch portion 30 of the piston rod 25, the passage in the large diameter hole portion 46 of the piston 21, the passage in the notch portion 90 of the disk 82, and the passages in the ring groove 55 of the piston 21 and in the plurality of passage holes 38 constitute a second passage 172. The oil liquid L flows from the lower chamber 23 that is an upstream side in the cylinder 4 to the upper chamber 22 that is a downstream side through the second passage 172 due to movement of the piston 21 toward the lower chamber 23. The second passage 172 is a passage on the contraction side through which the oil liquid L flows from the lower chamber 23 that is an upstream side toward the upper chamber 22 that is a downstream side during movement of the piston 21 toward the lower chamber 23, i.e., in the compression stroke. The second passage 172 on the contraction side is also provided separately from the first passage 72 on the contraction side.

The communication passages 148 and 425 and the lower chamber communication chamber 149 constitutes a third passage 511 on the contraction side. The third passage 511 is in constant communication with the lower chamber 23. The third passage 511 of the contraction side is also provided separately from the second passage 172 on the contraction side. The third passage 511 is disposed parallel to the second passage 172.

The disk 104 has a thickness and rigidity greater than the sub valve 107. The disk 104 abuts the sub valve 107 upon deformation of the sub valve 107, and suppresses further deformation of the sub valve 107. The disk 104 abuts the flexible disk 100 upon deformation of the flexible disk 100, and suppresses further deformation of the flexible disk 100. The sub valve 107, the valve seat member 109 including the valve seat portion 135, the cap member 95, the communication passage 148 formed in the cap member 95, the plate spring 116, the disks 97, 102 to 104, and 106 shown in FIG. 3, the flexible disk 100, the valve seat disk 101, and the spring member 105 constitutes a second damping force generating mechanism 173 on the contraction side. The second damping force generating mechanism 173 is provided in the second passage 172 on the contraction side shown in FIG. 2. The second damping force generating mechanism 173 opens and closes the second passage 172, and suppresses flowing of the oil liquid L from the second passage 172 to the upper chamber 22 to generate a damping force.

The second damping force generating mechanism 173 is provided on the piston rod 25. The valve seat portion 135 of the second damping force generating mechanism 173 is provided on the valve seat member 109. The second damping force generating mechanism 173 is also provided separately from the first damping force generating mechanism 42 configured to generate a damping force in the compression stroke. The sub valve 107 that constitutes the second damping force generating mechanism 173 on the contraction side is a sub valve on the contraction side. The cap member 95 covers one end surface side of the second damping force generating mechanism 173 and an outer circumferential surface side of the valve seat member 109. The cap member 95 may cover at least a part of the one end surface side of the second damping force generating mechanism 173 and the outer circumferential surface of the valve seat member 109.

As shown in FIG. 3, the communication passage 148 configured to allow communication between the inside and the outside of the cap member 95 is formed in the bottom section 122 of the one end side of the cap member 95 in the axial direction. The plate spring 116 is provided such that the one end surface side in the axial direction abuts the outer circumferential side of the communication passage 148 of the cap member 95. The flexible disk 100, which is bendable, is provided to abut the other end surface side of the plate spring 116 in the axial direction.

As shown in FIG. 2, in the second passage 172, when the second damping force generating mechanism 173 is in an open state, the passage in the notch portion 90 of the disk 82 is narrowest in the portion to which the flow channel cross-sectional area is fixed, and the flow channel cross-sectional area is narrower than the upstream side and the downstream side to become an orifice 175 in the second passage 172. The orifice 175 is disposed downstream from the sub valve 107 in the flow of the oil liquid L when the sub valve 107 is opened and the oil liquid L flows through the second passage 172. The orifice 175 may be disposed upstream from the sub valve 107 in the flow of the oil liquid L when the sub valve 107 is opened and the oil liquid L flows through the second passage 172. The orifice 175 is formed by cutting out the disk 82 abutting the piston 21 in the first damping force generating mechanism 41.

In the second damping force generating mechanism 173 on the contraction side, even in all the valve seat portion 135 and the sub valve 107 abutting them, the fixed orifice configured to allow communication between the upper chamber 22 and the lower chamber 23 is not formed even in a state in which they abut each other. That is, in the second damping force generating mechanism 173 on the contraction side, the upper chamber 22 and the lower chamber 23 are not in communication with each other when the valve seat portion 135 and the sub valve 107 abut each other over the entire circumference. In other words, the second passage 172 does not have the fixed orifice configured to bring the upper chamber 22 and the lower chamber 23 in constant communication with each other, and is not a passage configured to bring the upper chamber 22 and the lower chamber 23 in constant communication with each other.

The second passage 172 on the contraction side configured to allow communication between the upper chamber 22 and the lower chamber 23 is also parallel to the first passage 72 that is the passage on the contraction side configured to allow communication between the upper chamber 22 and the lower chamber 23. The first damping force generating mechanism 42 is provided in the first passage 72. The second damping force generating mechanism 173 is provided in the second passage 172. Accordingly, the first damping force generating mechanism 42 and the second damping force generating mechanism 173 on the contraction side are disposed parallel to each other.

As shown in FIG. 3, the sub valve 110 has a disk shape. The sub valve 110 has the same outer diameter as that of the valve seat portion 139 of the valve seat member 109. The sub valve 110 constantly abuts the inner seat portion 138, and can be separated and seated on the valve seat portion 139. The sub valve 110 is seated entirely on the valve seat portion 139 and closes all the first passage portions 161. The sub valve 110 is seated entirely on the valve seat configuration portions 211 of any of the valve seat portions 139 and closes the first passage portions 161 inside the valve seat configuration portions 211. The sub valve 110 can have the same shape as the sub valve 107 and have compatibility.

The disk 111 has the same shape as the disk 106 and has compatibility. An outer diameter of the disk 111 is smaller than the outer diameter of the sub valve 110 and smaller than the outer diameter of the inner seat portion 138.

The spring member 112 has a base plate section 341 having a porous circular flat plate shape and fitted onto the attachment shaft portion 28, and a plurality of spring plate portions 342 extending outward in the radial direction of the base plate section 341 from positions of equal intervals in the circumferential direction of the base plate section 341. An outer diameter of the base plate section 341 is greater than that of the disk 111. The spring plate portions 342 is inclined with respect to the base plate section 341 to be separated from the base plate section 341 toward the extension tip side in the axial direction of the base plate section 341. The spring member 112 is attached to the attachment shaft portion 28 such that the spring plate portions 342 extends from the base plate section 341 toward the sub valve 110 in the axial direction of the base plate section 341. The base plate section 341 of the spring member 112 abuts the disk 111. The plurality of spring plate portions 342 of the spring member 112 abut the sub valve 110. The spring member 112 causes the sub valve 110 to abut the valve seat portion 139 of the valve seat member 109. The sub valve 110 is seated on the valve seat portion 139 by a biasing force of the spring member 112 to close the first passage portions 161.

The sub valve 110 is provided in the lower chamber 23. The sub valve 110 brings the upper chamber 22 and the upper chamber communication chamber 147 in communication with the lower chamber 23 by being separated from the valve seat portion 139. Here, the sub valve 110 suppresses flowing of the oil liquid L between the sub valve 110 and the valve seat portion 139 to generate a damping force. The sub valve 110 is a discharge valve that opens when the oil liquid L is discharged from the inside of the upper chamber 22 and the upper chamber communication chamber 147 to the lower chamber 23 via the plurality of first passage portions 161 of the valve seat member 109. The sub valve 110 is a check valve configured to restrict flowing of the oil liquid L from the lower chamber 23 into the upper chamber 22 and the upper chamber communication chamber 147 via the first passage portions 161. As shown in FIG. 2, the passage hole 206 that constitutes the second passage portions 162 opens outside the range of the valve seat portion 139 in the valve seat member 109. For this reason, the passage hole 206 is in constant communication with the lower chamber 23 independently of the sub valve 110 that seats on the valve seat portion 139.

The passages in the plurality of passage holes 38 and in the ring groove 55 of the piston 21, the passage in the notch portion 90 of the disk 82, the piston rod passage portion 51 in the passage notch portion 30 of the piston rod 25, the passage in the large diameter hole portion 46 of the piston 21, the passage in the large diameter hole portion 133 of the valve seat member 109, the radial passages 222 in the passage groove 221 of the valve seat member 109, the plurality of first passage portions 161 of the valve seat member 109, and the passage between the sub valve 110 and the valve seat portion 139, which appears upon opening of the valve, constitute a second passage 182. The oil liquid L flows from the upper chamber 22 that is an upstream side in the cylinder 4 to the lower chamber 23 that is a downstream side through the second passage 182 due to movement of the piston 21 toward the upper chamber 22. The second passage 182 is a passage on the extension side through which the oil liquid L flows out from the upper chamber 22 that is an upstream side toward the lower chamber 23 that is a downstream side during movement of the piston 21 toward the upper chamber 22, i.e., in the extension stroke.

The second passage 182 on the extension side configured to allow communication between the upper chamber 22 and the lower chamber 23 is parallel to the first passage 92 that is the passage on the extension side configured to allow communication between the upper chamber 22 and the lower chamber 23, except the passages in the ring groove 55 and in the plurality of passage holes 38 on the side of the upper chamber 22. The first passage 92 and the second passage 182 have separate parallel portions.

The upper chamber communication chamber 147 constitutes a third passage 512 on the extension side together with the passage between the tubular portion 124 of the cap member 95 and the sub valve 107. The third passage 512 on the extension side is also branched off from the second passage 182 on the extension side and provided separately from the second passage 182.

The disk 113 has the same outer diameter as that of the sub valve 110. The disk 113 has a greater thickness and higher rigidity than the sub valve 110. The disk 113 abuts the sub valve 110 upon deformation of the sub valve 110 and suppresses further deformation of the sub valve 110. The annular member 114 has an outer diameter smaller than that of the disk 113. The annular member 114 is a common part having the same shape as the annular member 69.

The sub valve 110, the valve seat member 109 including the valve seat portion 139, the disks 111 and 113, and the spring member 112 constitute a second damping force generating mechanism 183 on the extension side. The second damping force generating mechanism 183 is provided in the second passage 182 on the extension side. The second damping force generating mechanism 183 opens and closes the second passage 182, and suppresses flowing of the oil liquid L from the second passage 182 to the lower chamber 23 to generate a damping force. In other words, the second damping force generating mechanism 183 is provided on the piston rod 25. The valve seat portion 139 of the second damping force generating mechanism 183 is provided on the valve seat member 109. The second damping force generating mechanism 183 is disposed separately from the first damping force generating mechanism 41 configured to generate a damping force in the extension stroke. The sub valve 110 that constitutes the second damping force generating mechanism 183 on the extension side is a sub valve on the extension side.

As shown in FIG. 3, the flexible disk 100, the valve seat disk 101, the plate spring 116, the disk 97, the bottom section 122 of the cap member 95, and the lower chamber communication chamber 149 constitutes a lower chamber volume variable mechanism 185 configured to change a volume of the lower chamber communication chamber 149. The lower chamber volume variable mechanism 185 is provided in the third passage 511 on the contraction side including the lower chamber communication chamber 149. The lower chamber communication chamber 149 is provided on the flow channel between the lower chamber 23 and the communication passages 148 and 425 of the flexible disk 100 and the sub valve 110.

The lower chamber volume variable mechanism 185 changes a volume of the lower chamber communication chamber 149 to increase as the flexible disk 100 and the valve seat disk 101 are integrally deformed and moved to be separated from the bottom section 122. Here, when a state in which the flexible disk 100 abuts the plate spring 116 over the entire circumference is maintained, a space between the flexible disk 100 and the outer conical portion 403 of the plate spring 116 is closed. That is, when the flexible disk 100 is deformed to be separated from the bottom section 122, if the state in which the flexible disk 100 abuts the plate spring 116 over the entire circumference is maintained, a cut-off state between the lower chamber communication chamber 149 and the upper chamber communication chamber 147 is maintained.

The lower chamber volume variable mechanism 185 changes the volume of the lower chamber communication chamber 149 to reduce as the flexible disk 100 and the valve seat disk 101 are integrally deformed and moved to approach the bottom section 122. Here, the state in which the flexible disk 100 entirely abuts the plate spring 116 is maintained and the space between the flexible disk and the outer conical portion 403 of the plate spring 116 is closed.

As shown in FIG. 2, the third passage 512 on the extension side including the upper chamber communication chamber 147 in communication with the upper chamber 22 is branched off from the second passage 182 on the extension side and provided separately from the second passage 182. As shown in FIG. 3, the flexible disk 100, the valve seat disk 101, the plate spring 116, the disks 102 to 104, the spring member 105, the disk 106, the sub valve 107, the cap member 95, and the upper chamber communication chamber 147 constitute an upper chamber volume variable mechanism 186 configured to change the volume of the upper chamber communication chamber 147. The upper chamber volume variable mechanism 186 is provided in the third passage 512 on the extension side including the upper chamber communication chamber 147. The upper chamber communication chamber 147 is provided between the flexible disk 100 and the sub valve 107 on the flow channel.

The upper chamber volume variable mechanism 186 changes the volume of the upper chamber communication chamber 147 to increase as the flexible disk 100 and the valve seat disk 101 are integrally deformed and moved to be separated from the disk 104. Here, when the state in which the valve seat disk 101 entirely abuts the flexible disk 100 is maintained, a communication passage 505 in the communication hole 501 of the flexible disk 100 is closed. That is, a cut-off state between the lower chamber communication chamber 149 and the upper chamber communication chamber 147 is maintained.

The upper chamber volume variable mechanism 186 changes the volume of the upper chamber communication chamber 147 to reduce as the flexible disk 100 and the valve seat disk 101 are deformed and moved to approach the disk 104. Here, the state in which the valve seat disk 101 entirely abuts the flexible disk 100 is maintained and the communication passage 505 in the communication hole 501 of the flexible disk 100 is closed.

The flexible disk 100, the valve seat disk 101 and the plate spring 116 are shared with the lower chamber volume variable mechanism 185 and the upper chamber volume variable mechanism 186. The lower chamber volume variable mechanism 185 including the lower chamber communication chamber 149 and the upper chamber volume variable mechanism 186 including the upper chamber communication chamber 147 constitute an accumulator 190 configured to store an oil liquid as a working fluid. The accumulator 190 is provided on the piston rod 25. The accumulator 190 is disposed in the shock absorber 1 separately from the second damping force generating mechanism 183 on the extension side. The flexible disk 100 of the accumulator 190 is deformed before the second damping force generating mechanism 183 is opened in the extension stroke, and is deformed before the second damping force generating mechanism 173 is opened in the compression stroke.

In the second passage 182, when the second damping force generating mechanism 183 is in the open state, the passage in the notch portion 90 of the disk 82 is the orifice 175 even in the second passage 182 in which a flow channel cross-sectional area is narrowest in a fixed portion and the flow channel cross-sectional area is narrower than that of the upstream side and the downstream side thereof. The orifice

175 is common to the second passages 172 and 182. The orifice 175 is disposed upstream from the sub valve 110 in the flow of the oil liquid L when the sub valve 110 is opened and the oil liquid L flows through the second passage 182. The orifice 175 may be disposed downstream from the sub valve 110 in the flow of the oil liquid L when the sub valve 110 is opened and the oil liquid L flows through the second passage 182. The sub valve 110 and the sub valve 107 are opened and closed independently.

The second damping force generating mechanism 183 on the extension side is not formed with the fixed orifice configured to allow communication between the upper chamber 22 and the lower chamber 23 in both the valve seat portion 139 and the sub valve 110 abutting it even in a state in which they abut each other. That is, the second damping force generating mechanism 183 on the extension side does not allow communication between the upper chamber 22 and the lower chamber 23 when the valve seat portion 139 and the sub valve 110 abut each other over the entire circumference. In other words, second passage 182 is not formed with the fixed orifice configured to allow constant communication between the upper chamber 22 and the lower chamber 23, and is not a passage configured to allow constant communication between the upper chamber 22 and the lower chamber 23. The annular member 114 and the disk 113 abut the sub valve 110 to restrict deformation of a prescribed level or more in the opening direction of the sub valve 110.

In the shock absorber 1, as for the flow for passing the oil liquid L in the axial direction at least within the range of the piston 21, the upper chamber 22 and the lower chamber 23 are able to be in communication with each other only via the first damping force generating mechanisms 41 and 42 and the second damping force generating mechanisms 173 and 183. The shock absorber 1 is not provided with the fixed orifice configured to allow constant communication between the upper chamber 22 and the lower chamber 23 on the passage of the oil liquid L.

As described above, the second passage 182 and the first passage 92 are parallel except for the passages in the ring groove 55 and in the plurality of passage holes 38. The parallel portion has the first damping force generating mechanism 41 provided in the first passage 92. The second damping force generating mechanism 183 is provided in the second passage 182. Accordingly, the first damping force generating mechanism 41 and the second damping force generating mechanism 183 on the extension side are disposed in parallel.

The second damping force generating mechanisms 173 and 183 include the valve seat member 109, the sub valve 110 provided on one side of the valve seat member passage portion 160 that is a part of the second passages 172 and 182 provided on the valve seat member 109, the sub valve 107 provided on the other side of the valve seat member passage portion 160, and the bottomed cylindrical cap member 95 provided between the piston 21 and the valve seat member 109 in the second passages 172 and 182. The valve seat member 109 is provided in the cap member 95. The sub valve 110 is provided in the valve seat member 109 on the side of the lower chamber 23. The sub valve 107 is provided in the cap chamber 146 between the bottom section 122 of the cap member 95 and the valve seat member 109.

Figure 6:
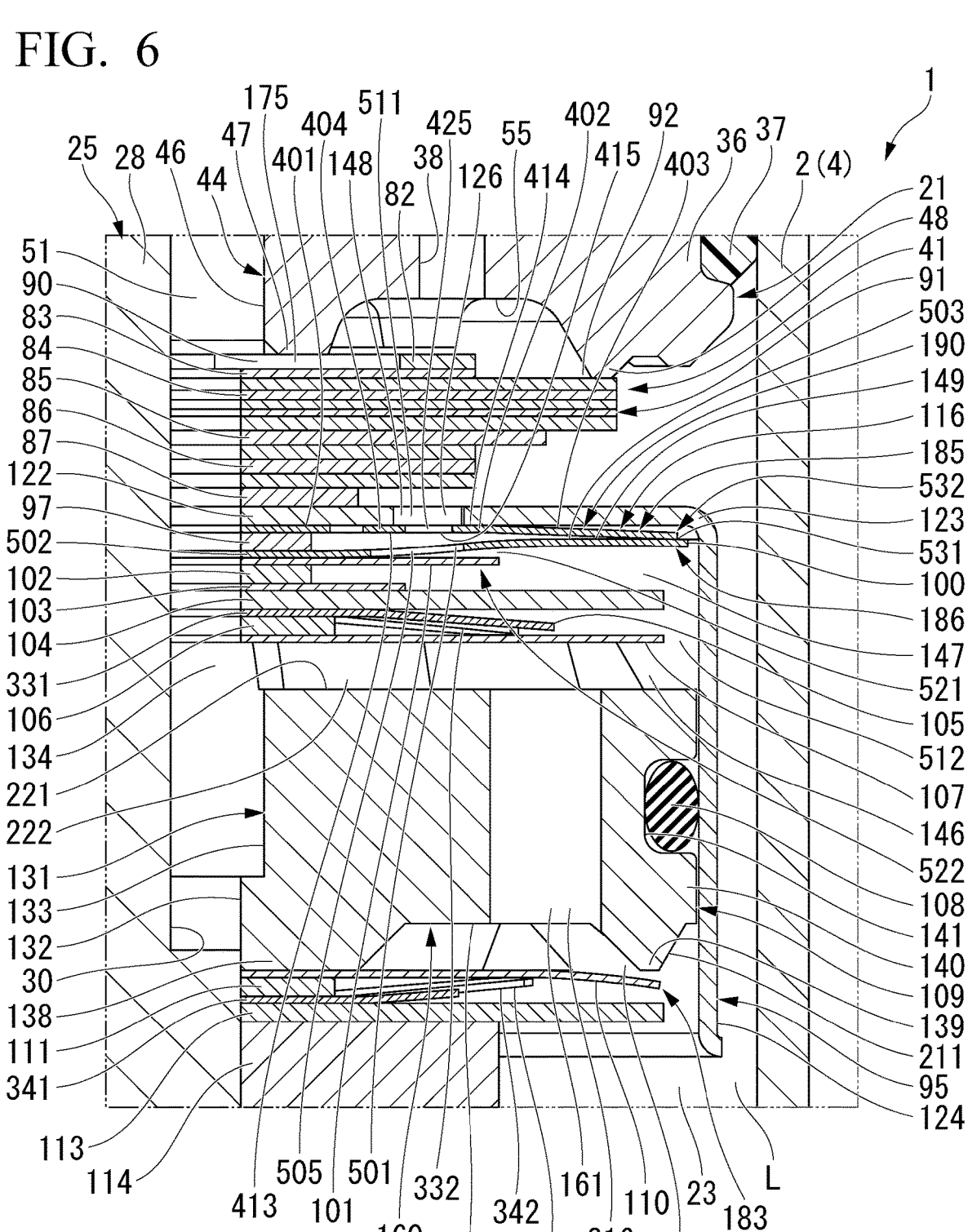
FIG. 6 is a partial cross-sectional view showing an operating state of a relief mechanism of an extension stroke of the shock absorber according to the first embodiment of the present invention.

The upper chamber volume variable mechanism 186 changes the volume of the upper chamber communication chamber 147 to increase as the flexible disk 100 is deformed and moved to be separated from the disk 104. In a state in which the second damping force generating mechanism 183 is opened, when a pressure difference between the upper chamber communication chamber 147 and the lower chamber communication chamber 149 exceeds a predetermined value, as shown in FIG. 6, the flexible disk 100 has an outer circumferential side deformed on the side of the bottom section 122 while elastically deforming the outer conical portion 403 of the plate spring 116 on the side of the bottom section 122. Then, the flexible disk 100 is separated from the valve seat disk 101 in the axial direction, and allows communication between the upper chamber communication chamber 147 and the lower chamber communication chamber 149 via the communication passage 505 in the communication hole 501. The communication passage 505 in the communication hole 501 and the passage between the flexible disk 100 and the valve seat disk 101 become a fourth passage 521 on the extension side configured to allow communication between the upper chamber communication chamber 147 and the lower chamber communication chamber 149 on the extension stroke. The fourth passage 521 is provided separately from the third passage 512 including the upper chamber communication chamber 147. The fourth passage 521 is provided to communicate with the third passage 512 in series upon opening.

The flexible disk 100 and the valve seat disk 101 constitute a relief mechanism 522 on the extension side through which the oil liquid L flows from the upper chamber communication chamber 147 to the lower chamber communication chamber 149, in other words, from the upper chamber 22 to the lower chamber 23 via the fourth passage 521. The relief mechanism 522 is provided in the fourth passage 521 on the extension side. The relief mechanism 522 is set to open the valve after the second damping force generating mechanism 183 on the extension side is opened.

The upper chamber volume variable mechanism 186 has the flexible disk 100 that is bendable, and the plate spring 116. The flexible disk 100 is deformed before the second damping force generating mechanism 183 is opened. The communication hole 501 configured to allow communication between the upstream side and the downstream side is formed in the flexible disk 100 from the inner circumferential end portion to the outer circumferential end portion. The plate spring 116 abuts the end surface of the flexible disk 100 and biases the flexible disk 100. The relief mechanism 522 is disposed to open and close the communication hole 501 of the flexible disk 100 by a deflection amount of the flexible disk 100.

Figure 7:
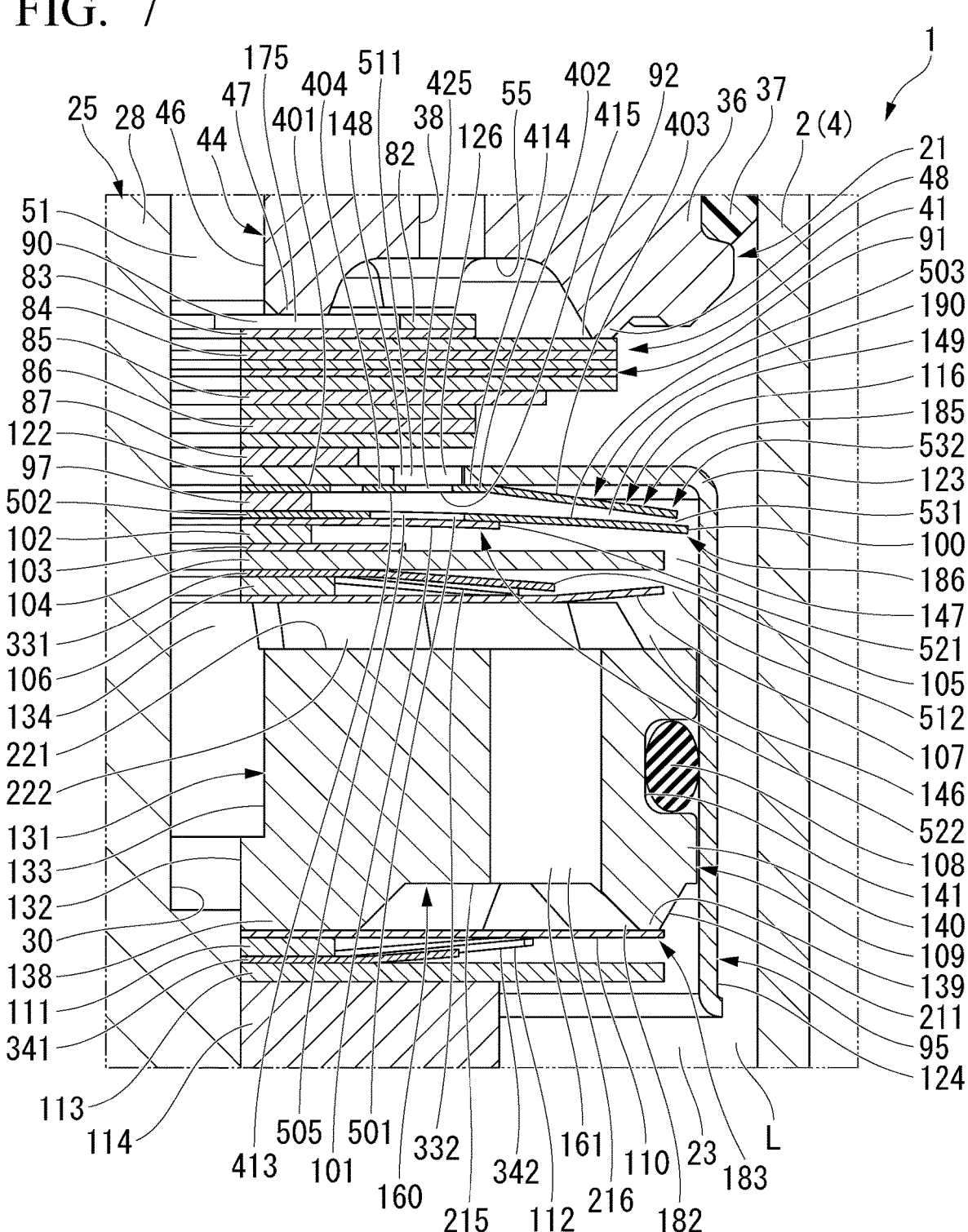
FIG. 7 is a partial cross-sectional view showing an operating state of a relief mechanism in a compression stroke of the shock absorber according to the first embodiment of the present invention.

The lower chamber volume variable mechanism 185 changes the volume of the lower chamber communication chamber 149 to increase as the flexible disk 100 is deformed and moved to approach the disk 104. In a state in which the second damping force generating mechanism 173 is opened, when the pressure difference between the upper chamber communication chamber 147 and the lower chamber communication chamber 149 exceeds a predetermined value, as shown in FIG. 7, a deformation amount of the flexible disk 100 on the outer circumferential side is increased. Then, the flexible disk 100 is separated from the plate spring 116 in the axial direction and allows communication between the lower chamber communication chamber 149 and the upper chamber communication chamber 147 via a space between the flexible disk 100 and the plate spring 116. In other words, a portion of the plate spring 116 abutting the end surface of the flexible disk 100 is at least partially separated from the end surface of the flexible disk 100 by the deflection amount of the flexible disk 100. The passage between the flexible disk 100 and the plate spring 116 is a fourth passage 531 on the contraction side configured to allow communication between the lower chamber communication chamber 149 and the upper chamber communication chamber 147 in the compression stroke. The fourth passage 531 is provided separately from the third passage 511 including the lower chamber communication chamber 149. The fourth passage 531 is provided to communicate with the third passage 511 in series upon opening.

The flexible disk 100 and the plate spring 116 constitute a relief mechanism 532 on the contraction side through which the oil liquid L flows from the lower chamber communication chamber 149 to the upper chamber communication chamber 147, in other words, from the lower chamber 23 to the upper chamber 22 via the fourth passage 531. The relief mechanism 532 is provided in the fourth passage 531 on the contraction side. The relief mechanism 532 is set to open the valve after the second damping force generating mechanism 173 on the contraction side is opened.

In a state in which the main valve 71 is assembled to the piston rod 25, the inner circumferential side of the main valve 71 is clamped between the disk 63 and the disk 67, and the outer circumferential side abuts the valve seat portion 50 of the piston 21 over the entire circumference. In this state, the inner circumferential side of the main valve 91 is clamped between the disk 83 and the disk 87, and the outer circumferential side abuts the valve seat portion 48 of the piston 21 over the entire circumference.

In this state, the sub valve 107 abuts the valve seat portion 135 of the valve seat member 109 over the entire circumference while the inner circumferential side is clamped between the inner seat portion 134 of the valve seat member 109 and the disk 106. In this state, the sub valve 110 abuts the valve seat portion 139 of the valve seat member 109 over the entire circumference while the inner circumferential side is clamped between the inner seat portion 138 of the valve seat member 109 and the disk 111.

In this state, as shown in FIG. 3, the inner circumferential side of the flexible disk 100 is clamped between the disks 97 and 102 together with the valve seat disk 101, and the outer circumferential side abuts the outer conical portion 403 of the plate spring 116 over the entire circumference. Here, the flexible disk 100 is elastically deformed in a tapered shape such that a portion outside the disk 97 in the radial direction is separated from the bottom section 122 in the axial direction as it goes outward in the radial direction. Here, the plate spring 116 abuts the flexible disk 100 over the entire circumference while the outer conical portion 403 is elastically deformed. In this state, the valve seat disk 101 is also elastically deformed in a tapered shape such that a portion outside the disk 102 in the radial direction is separated from the bottom section 122 in the axial direction as it goes outward in the radial direction according to the shape of the flexible disk 100.

As shown in FIG. 1, the valve body 12 has a liquid passage 251 and the liquid passage 252 passing in the axial direction. The liquid passages 251 and 252 are able to allow communication between the lower chamber 23 and the reservoir chamber 5. The base valve 15 has a damping force generating mechanism 255 on the contraction side configured to open and close the liquid passage 251 on the side of the bottom member 9 in the axial direction of the valve body 12. The base valve 15 has a damping force generating mechanism 256 on the extension side configured to open and close the liquid passage 252 on a side of the valve body 12 opposite to the bottom member 9 in the axial direction.

In the base valve 15, when the piston rod 25 moves toward the contraction side and the piston 21 moves in a direction in which the lower chamber 23 is narrowed such that the pressure of the lower chamber 23 is higher than the pressure of the reservoir chamber 5 by a predetermined value, the damping force generating mechanism 255 opens the liquid passage 251 to cause the oil liquid L in the lower chamber 23 to flow into the reservoir chamber 5, thereby generating a damping force at this time. In other words, when the piston rod 25 moves toward the contraction side to move the piston 21, the oil liquid L in the liquid passage 251 flows out to the reservoir chamber 5. The damping force generating mechanism 255 is a damping force generating mechanism on the contraction side. The damping force generating mechanism 255 does not disturb the flow of the oil liquid L in the liquid passage 252.

In the base valve 15, when the piston rod 25 moves toward the extension side and the piston 21 moves toward the upper chamber 22 and the pressure of the lower chamber 23 is lower than the pressure of the reservoir chamber 5, the damping force generating mechanism 256 opens the liquid passage 252 and the oil liquid L in the reservoir chamber 5 flows into the lower chamber 23, thereby generating a damping force at this time. In other words, when the piston rod 25 moves toward the extension side to move the piston 21, the oil liquid L in the liquid passage 252 flows out to the lower chamber 23. The damping force generating mechanism 256 is a damping force generating mechanism on the extension side. The damping force generating mechanism 256 does not disturb the flow of the oil liquid L in the liquid passage 251. The damping force generating mechanism 256 may be a suction valve configured to flow the oil liquid L without generating a damping force substantially in the lower chamber 23 from the reservoir chamber 5.

Figure 8:
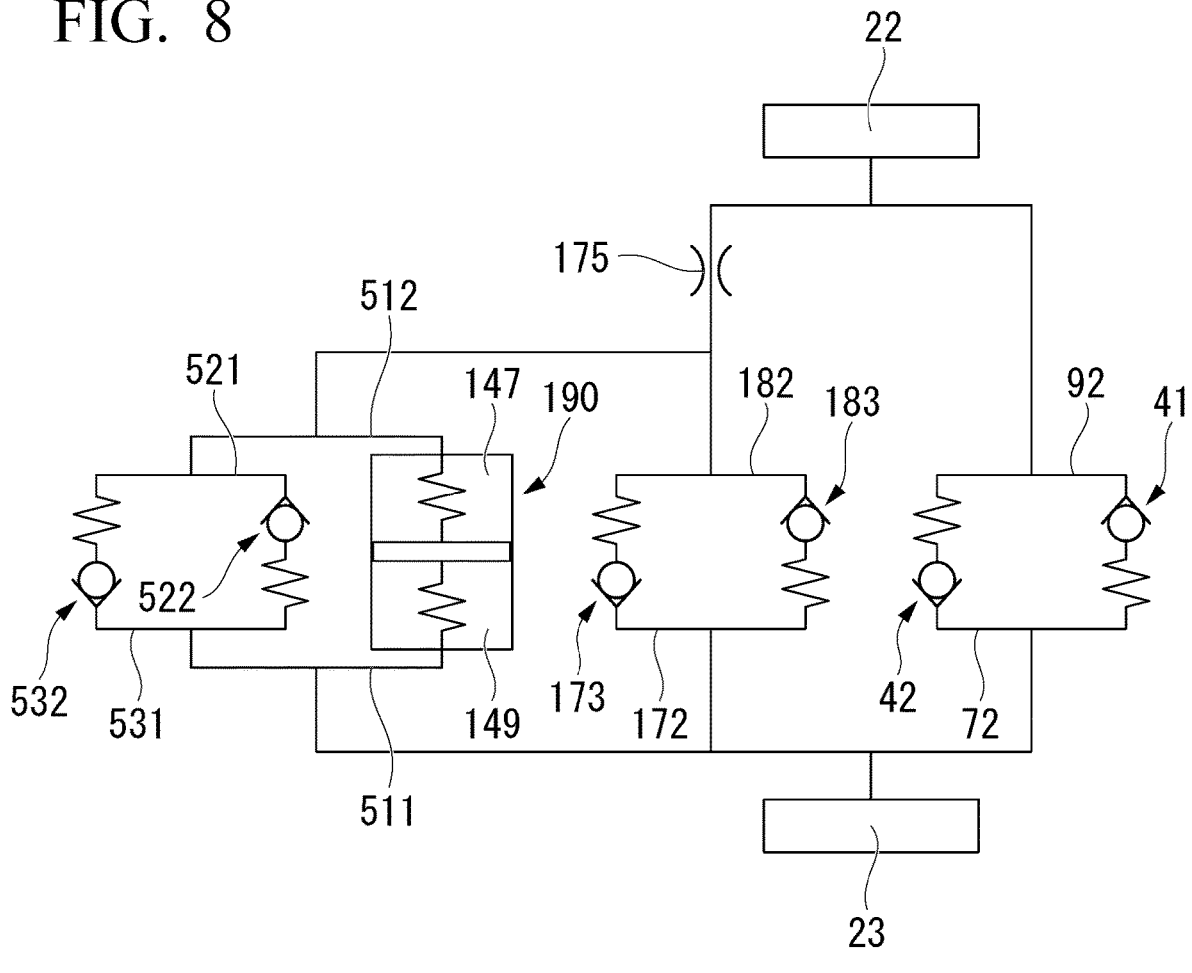
FIG. 8 is a hydraulic circuit diagram of the shock absorber according to the first embodiment of the present invention.

FIG. 8 shows a hydraulic circuit diagram by parts provided on the piston rod 25 such as the piston 21 or the like of the shock absorber 1 of the above-mentioned first embodiment. The first damping force generating mechanisms 41 and 42, and the second damping force generating mechanisms 173 and 183 are provided in parallel between the upper chamber 22 and the lower chamber 23. The orifice 175 is provided in the second damping force generating mechanisms 173 and 183 on the side of the upper chamber 22. The accumulator 190 is provided parallel to the second damping force generating mechanisms 173 and 183 on the side of the lower chamber 23 other than the orifice 175. The relief mechanisms 522 and 532 are provided parallel to the second damping force generating mechanisms 173 and 183 and the accumulator 190 on the side of the lower chamber 23 other than the orifice 175.

<Operation>

As shown in FIG. 2, the main valve 91 of the first damping force generating mechanism 41 has higher rigidity and higher opening valve pressure than the sub valve 110 of the second damping force generating mechanism 183. Accordingly, in the extension stroke, in an ultra micro low speed region in which a piston speed is less than a predetermined value, the second damping force generating mechanism 183 is opened in a state in which the first damping force generating mechanism 41 is closed. In addition, in a normal speed region in which the piston speed is equal to or greater than the predetermined value, the first damping force generating mechanism 41 and the second damping force generating mechanism 183 are both opened. The sub valve 110 is an ultra micro low speed valve that is opened in a region in which the piston speed is an ultra micro low speed to generate a damping force.

That is, in the extension stroke, the pressure of the upper chamber 22 is increased and the pressure of the lower chamber 23 is decreased when the piston 21 moves toward the upper chamber 22. Then, although all the first damping force generating mechanisms 41 and 42 and the second damping force generating mechanisms 173 and 183 do not have a fixed orifice that allows constant communication between the upper chamber 22 and the lower chamber 23, the oil liquid L in the upper chamber 22 flows into the upper chamber communication chamber 147 via the passages in the plurality of passage holes 38 of the piston 21 and in the ring groove 55, the orifice 175, the passage in the large diameter hole portion 46 of the piston 21, the piston rod passage portion 51 in the passage notch portion 30 of the piston rod 25, the passage in the large diameter hole portion 133 of the valve seat member 109, the radial passages 222 in the passage groove 221 of the valve seat member 109, and the third passage 512. Accordingly, the upper chamber communication chamber 147 is boosted. For this reason, in the upper chamber volume variable mechanism 186, before the second damping force generating mechanism 183 is opened, a portion of the flexible disk 100 radially inner than the abutting position of the plate spring 116 to the outer conical portion 403 bends toward the bottom section 122 to increase the capacity of the upper chamber communication chamber 147. Accordingly, the upper chamber volume variable mechanism 186 suppresses an increase in pressure of the upper chamber communication chamber 147. Here, the valve seat disk 101 is deformed to follow the flexible disk 100 and the closed state of the fourth passage 521 is maintained. In addition, here, since the flexible disk 100 is bent and moved toward the bottom section 122, the lower chamber volume variable mechanism 185 reduces the volume of the lower chamber communication chamber 149.

Here, in the extension stroke upon inputting of a low frequency (upon large amplitude excitation) of the shock absorber 1, since an inflow amount of the oil liquid L from the upper chamber 22 to the upper chamber communication chamber 147 is increased, the flexible disk 100 is largely deformed. When a deformation amount of the flexible disk 100 is increased, the reaction force is increased and the deformation amount is limited due to the support rigidity of the clamped inner circumferential side. Accordingly, the upper chamber communication chamber 147 is boosted. As a result, the second passage 182 is boosted to a state in which the second damping force generating mechanism 183 is opened.

Here, since none of the first damping force generating mechanisms 41 and 42 and the second damping force generating mechanisms 173 and 183 has a fixed orifice configured to allow constant communication between the upper chamber 22 and the lower chamber 23, in the extension stroke in which the piston speed is less than the first predetermined value at which the second damping force generating mechanism 183 is opened, the damping force suddenly rises. In addition, in the region in which the piston speed is higher than a first predetermined value and in an ultra micro low speed region in which the piston speed is lower than a second predetermined value that is higher than the first predetermined value, the second damping force generating mechanism 183 is opened in a state in which the first damping force generating mechanism 41 is closed.

That is, the sub valve 110 is separated from the valve seat portion 139 and allows communication between the upper chamber 22 and the lower chamber 23 in the second passage 182 on the extension side. Accordingly, the oil liquid L in the upper chamber 22 flows into the lower chamber 23 via the passages in the plurality of passage holes 38 of the piston 21 and in the ring groove 55, the orifice 175, the passage in the large diameter hole portion 46 of the piston 21, the piston rod passage portion 51 in the passage notch portion 30 of the piston rod 25, the passage in the large diameter hole portion 133 of the valve seat member 109, the radial passages 222 in the passage groove 221 of the valve seat member 109, the first passage portions 161 in the valve seat member 109, and the passage between the sub valve 110 and the valve seat portion 139. Accordingly, even in the ultra micro low speed region in which the piston speed is lower than the second predetermined value, a damping force of valve characteristics (characteristics in which the damping force is substantially proportional to the piston speed) is obtained.

In the extension stroke, the relief mechanism 522 that is opened after the second damping force generating mechanism 183 is opened is provided. For this reason, in the normal speed region in which the piston speed is equal to or greater than the second predetermined value, when the pressure of the upper chamber communication chamber 147 is increased, in a state in which the second damping force generating mechanism 183 is open, as shown in FIG. 6, the relief mechanism 522 opens the fourth passage 521, and the oil liquid L of the upper chamber communication chamber 147 flows into the lower chamber 23. After that, in a state in which the second damping force generating mechanism 183 and the relief mechanism 522 are opened, the first damping force generating mechanism 41 is opened. That is, the sub valve 110 is separated from the valve seat portion 139 as described above, the oil liquid L flows into the lower chamber 23 from the upper chamber 22 through the second passage 182 on the extension side, and after that, in a state in which the second damping force generating mechanism 183 is opened, the relief mechanism 522 opens the fourth passage 521 and the oil liquid L flows into the lower chamber 23 from the upper chamber 22 through the fourth passage 521. Here, since the flow of the oil liquid L is throttled in the orifice 175 provided downstream from the main valve 91 in the second passage 182, the pressure applied to the main valve 91 is increased to increase a pressure difference, the main valve 91 is separated from the valve seat portion 48, and the oil liquid L flows into the lower chamber 23 from the upper chamber 22 through the first passage 92 on the extension side. Accordingly, the oil liquid L in the upper chamber 22 flows into the lower chamber 23 via the passages in the plurality of passage holes 38 and in the ring groove 55 and the passage between the main valve 91 and the valve seat portion 48.

Accordingly, even in the normal speed region in which piston speed is equal to or greater than the second predetermined value, a damping force of valve characteristics is obtained (the damping force is substantially proportional to the piston speed). An increasing rate of the damping force on the extension side with respect to the increase in piston speed in the normal speed region is lower than an increasing rate of the damping force on the extension side with respect to the increase in piston speed in the ultra micro low speed region. In other words, an inclination of the increasing rate of the damping force on the extension side with respect to the increase in piston speed in the normal speed region can be laid down more than in the ultra micro low speed region.

Here, in the extension stroke, in the normal speed region in which the piston speed is equal to or greater than the second predetermined value, while the pressure difference between the upper chamber 22 and the lower chamber 23 is greater than the low speed region that is equal to or greater than the first predetermined value and less than the second predetermined value, since the first passage 92 does not have throttling by the orifice, the oil liquid L can flow through the first passage 92 at a large flow rate by opening the main valve 91. Then, deformation of the sub valve 110 can be suppressed by throttling the second passage 182 at the orifice 175 and opening the fourth passage 521 using the relief mechanism 522 to cause the oil liquid L in the upper chamber communication chamber 147 to flow into the lower chamber 23.

Here, pressures in opposite directions are applied to the sub valve 107 in the closed state from the lower chamber 23 and the upper chamber communication chamber 147. Even when the pressure difference between the upper chamber 22 and the lower chamber 23 is increased, since the orifice 175 is formed upstream from the sub valve 107 in the second passage 182, the pressure rise of the upper chamber communication chamber 147 becomes gentle with respect to the pressure rise of the upper chamber 22. Further, the relief mechanism 522 opens the fourth passage 521, and the oil liquid L in the upper chamber communication chamber 147 flows into the lower chamber 23. Accordingly, an increase in pressure difference between the upper chamber communication chamber 147 and the lower chamber 23 is suppressed. Accordingly, the increase in pressure difference between the upper chamber communication chamber 147 and the lower chamber 23 received by the sub valve 107 in the closed state can be suppressed, and a large back pressure from the side of the upper chamber communication chamber 147 toward the lower chamber 23 can be suppressed from being applied to the sub valve 107.

In the shock absorber 1, a flow channel through which the oil liquid L flows from the upper chamber 22 to the lower chamber 23 in the extension stroke is provided parallel to the first passage 92 and the second passage 182, and the main valve 91 and the sub valve 110 are provided in parallel. The orifice 175 is connected to the sub valve 110 in series.

As described above, in the extension stroke, in the normal speed region in which the piston speed is equal to or greater than the second predetermined value, the oil liquid L can flow through the first passage 92 at a large flow rate by opening the main valve 91. Accordingly, a flow rate flowing through the passage between the sub valve 110 and the valve seat portion 139 is reduced. Accordingly, for example, an increasing rate of the damping force with respect to the increase in piston speed at the piston speed that is within a normal speed region (the second predetermined value or more) can be lowered. In other words, an inclination of the increasing rate of the damping force on the extension side with respect to the increase in piston speed in the normal speed region (the second predetermined value or more) can be laid down more than the ultra micro low speed region (less than the second predetermined value). Accordingly, a degree of design freedom can be increased.

In the extension stroke at the time of high frequency input (upon small amplitude excitation) when a frequency higher than that at the time of the low frequency input is input to the shock absorber 1, an inflow amount of the oil liquid L from the upper chamber 22 to the upper chamber communication chamber 147 is small.

For this reason, deformation of the flexible disk 100 is reduced, the upper chamber volume variable mechanism 186 can absorb a volume of the inflow of the oil liquid L into the upper chamber communication chamber 147 at the deflection amount of the flexible disk 100, and thus, boosting of the upper chamber communication chamber 147 can be reduced. For this reason, when the ultra micro low speed damping force rises, as if there is no flexible disk 100, the upper chamber communication chamber 147 is in constant communication with the lower chamber 23 through the communication passage 425 of the plate spring 116 and the communication passage 148 of the cap member 95, i.e., the same state as in the structure in which the second damping force generating mechanism 183 is not provided can be made.

Accordingly, in the extension stroke upon the high frequency input, the rising of the ultra micro low speed damping force becomes gentle at the time of the low frequency input. Alternatively, the rising of the ultra micro low speed damping force becomes gentle with respect to the damping force characteristics in the related art. In other words, in the extension stroke, when the frequency of the piston 21 exceeds a predetermined frequency, a flow rate of the oil liquid L to the sub valve 110 of the second damping force generating mechanism 183 is restricted by the upper chamber volume variable mechanism 186 including the flexible disk 100. Further, a variation in damping force (an inclination of the damping force with respect to the piston speed) to the opening of the second damping force generating mechanism 183 can be adjusted by a difference in rigidity (plate thickness or the like) of the flexible disk 100.

The main valve 71 of the first damping force generating mechanism 42 has higher rigidity and higher opening valve pressure than the sub valve 107 of the second damping force generating mechanism 173. Accordingly, in the compression stroke, in the ultra micro low speed region in which the piston speed is lower than the predetermined value, the second damping force generating mechanism 173 is opened in a state in which the first damping force generating mechanism 42 is closed. In the normal speed region in which the piston speed is equal to or greater than the predetermined value, both the first damping force generating mechanism 42 and the second damping force generating mechanism 173 are opened. The sub valve 107 is an ultra micro low speed valve that is opened in a region in which the piston speed is an ultra micro low speed and generates a damping force.

That is, in the compression stroke, the pressure of the lower chamber 23 is increased and the pressure of the upper chamber 22 is decreased by moving the piston 21 toward the lower chamber 23. Then, in both the first damping force generating mechanisms 41 and 42 and the second damping force generating mechanisms 173 and 183, the oil liquid L in the lower chamber 23 flows into the lower chamber communication chamber 149 via the communication passage 148 of the cap member 95 and the communication passage 425 of the plate spring 116. Accordingly, the lower chamber communication chamber 149 is boosted. For this reason, in the lower chamber volume variable mechanism 185, before the second damping force generating mechanism 173 is opened, the flexible disk 100 is bent toward the disk 104 to increase the capacity of the lower chamber communication chamber 149. Accordingly, the lower chamber volume variable mechanism 185 suppresses an increase in pressure of the lower chamber communication chamber 149. Here, the valve seat disk 101 is deformed to follow the flexible disk 100 and the closed state of the fourth passage 521 is maintained. In addition, here, since the flexible disk 100 is bent and moved toward the disk 104, the upper chamber volume variable mechanism 186 reduces the volume of the upper chamber communication chamber 147.

In the compression stroke at the time of low frequency input (upon large amplitude excitation) of the shock absorber 1, an inflow amount of the oil liquid L from the lower chamber 23 to the lower chamber communication chamber 149 is increased. For this reason, the flexible disk 100 is largely deformed. When a deformation amount of the flexible disk 100 is increased, a reaction force by the support rigidity of the clamped inner circumferential side is increased to restrict the deformation amount. Accordingly, the lower chamber communication chamber 149 is boosted. As a result, the second passage 172 is boosted to a state in which the second damping force generating mechanism 173 is opened.

Here, in both the first damping force generating mechanisms 41 and 42 and the second damping force generating mechanisms 173 and 183, there is no fixed orifice configured to allow constant communication between the lower chamber 23 and the upper chamber 22. For this reason, in the compression stroke in which the piston speed is less than a third predetermined value at which the second damping force generating mechanism 173 is opened, the damping force suddenly rises. In addition, in the ultra micro low speed region in which the piston speed is in a region higher than the third predetermined value and lower than a fourth predetermined value higher than the third predetermined value, the second damping force generating mechanism 173 is opened in a state in which the first damping force generating mechanism 42 is closed.

That is, the sub valve 107 is separated from the valve seat portion 135, and allows communication between the lower chamber 23 and the upper chamber 22 through the second passage 172 on the contraction side. Accordingly, the oil liquid L of the lower chamber 23 flows into the upper chamber 22 via the second passage portions 162 in the valve seat member 109, the passage between the sub valve 107 and the valve seat portion 135, the upper chamber communication chamber 147, the radial passages 222 in the passage groove 221 of the valve seat member 109, the passage in the large diameter hole portion 133 of the valve seat member 109, the piston rod passage portion 51 in the passage notch portion 30 of the piston rod 25, the passage in the large diameter hole portion 46 of the piston 21, the orifice 175, and the passages in the plurality of passage holes 38 of the piston 21 and the ring groove 55. Accordingly, even in the ultra micro low speed region in which the piston speed is lower than the fourth predetermined value, a damping force of valve characteristics (characteristics in which the damping force is substantially proportional to the piston speed).

In addition, in the compression stroke, the relief mechanism 532 that is opened after the second damping force generating mechanism 173 is opened is provided. For this reason, in the normal speed region in which the piston speed is equal to or greater than the fourth predetermined value, when the pressure of the lower chamber communication chamber 149 is increased, in a state in which the second damping force generating mechanism 173 is open, as shown in FIG. 7, the relief mechanism 532 opens the fourth passage 531, and the oil liquid L in the lower chamber 23 and the lower chamber communication chamber 149 flows into the upper chamber 22 via the upper chamber communication chamber 147. After that, the first damping force generating mechanism 42 is opened in a state in which the second damping force generating mechanism 173 and the relief mechanism 532 are opened. That is, the sub valve 107 is separated from the valve seat portion 135 as described above, the oil liquid L flows into the upper chamber 22 from the lower chamber 23 through the second passage 172 on the contraction side. After that, in a state in which the second damping force generating mechanism 173 is opened, the relief mechanism 532 opens the fourth passage 531, and the oil liquid L flows into the upper chamber 22 from the lower chamber 23 through the fourth passage 531. Here, since the flow of the oil liquid L is throttled by the orifice 175 provided downstream from the sub valve 107 and the relief mechanism 532 in the second passage 172, the pressure applied to the main valve 71 is increased to increase the pressure difference, the main valve 71 is separated from the valve seat portion 50, and the oil liquid L flows into the upper chamber 22 from the lower chamber 23 through the first passage 72 on the contraction side. Accordingly, the oil liquid L of the lower chamber 23 flows into the upper chamber 22 via the passages in the plurality of passage holes 39 and in the ring groove 56 and the passage between the main valve 71 and the valve seat portion 50.

Accordingly, even in the normal speed region in which the piston speed is equal to or greater than the fourth predetermined value, a damping force of valve characteristics is obtained (the damping force is substantially proportional to the piston speed). The increasing rate of the damping force on the contraction side with respect to the increase in piston speed in the normal speed region is lower than the increasing rate of the damping force on the contraction side with respect to the increase in piston speed in the ultra micro low speed region. In other words, an inclination of the increasing rate of the damping force on the extension side with respect to the increase in piston speed in the normal speed region can be laid down more than in the ultra micro low speed region.

Here, in the compression stroke, in the normal speed region in which the piston speed is equal to or greater than the fourth predetermined value, while the pressure difference between the lower chamber 23 and the upper chamber 22 is greater than the low speed region of the third predetermined value or more and less than the fourth predetermined value, since the first passage 72 has no throttling due to the orifice, the oil liquid L can flow through the first passage 72 at a large flow rate by opening the main valve 71. Then, the second passage 172 is throttled by the orifice 175, the relief mechanism 532 opens the fourth passage 531, the oil liquid L in the lower chamber 23 and the lower chamber communication chamber 149 flows into the upper chamber communication chamber 147, and thus, deformation of the sub valve 107 can be suppressed.

Here, pressures in opposite directions are applied to the sub valve 110 in the closed state from the side of the lower chamber 23 and the upper chamber communication chamber 147. Even when the pressure difference between the lower chamber 23 and the upper chamber 22 is increased, the orifice 175 is formed downstream from the sub valve 110 in the second passage 172, the relief mechanism 532 opens the fourth passage 531, the oil liquid L in the lower chamber 23 and the lower chamber communication chamber 149 flows into the upper chamber communication chamber 147, and thus, the pressure difference between the lower chamber 23 and the upper chamber communication chamber 147 is suppressed from being increased. Accordingly, the pressure difference between the lower chamber 23 and the upper chamber communication chamber 147 received by the sub valve 110 in the closed state can be suppressed from being increased, and a large back pressure from the side of the lower chamber 23 toward the upper chamber communication chamber 147 can be suppressed from being applied to the sub valve 110.

The flow channel through which the oil liquid L flows from the lower chamber 23 to the upper chamber 22 in the compression stroke is provided parallel to the first passage 72 and the second passage 172 in the shock absorber 1. The main valve 71 and the sub valve 107 are provided in the shock absorber 1 in parallel. The orifice 175 is connected to the sub valve 107 in series.

As described above, in the compression stroke, in the normal speed region in which the piston speed is equal to or greater than the fourth predetermined value, the oil liquid L can flow through the first passage 72 at a large flow rate by opening the main valve 71. Accordingly, a flow rate flowing through the passage between the sub valve 107 and the valve seat portion 135 is reduced. Accordingly, for example, the increasing rate of the damping force with respect to the increase in piston speed at which the piston speed is within the normal speed region (the fourth predetermined value or more) can be decreased. In other words, an inclination of the increasing rate of the damping force on the contraction side with respect to the increase in piston speed in the normal speed region (the fourth predetermined value or more) can be laid down more than in the ultra micro low speed region (less than the fourth predetermined value). Accordingly, a degree of design freedom can be increased.

In the compression stroke at the time of high frequency input (upon small amplitude excitation) in which a higher frequency than upon the low frequency input is input to the shock absorber 1, an inflow amount of the oil liquid L from the lower chamber 23 to the lower chamber communication chamber 149 is reduced.

For this reason, deformation of the flexible disk 100 is reduced. Accordingly, deformation of the flexible disk 100 is reduced, the lower chamber volume variable mechanism 185 can absorb the volume of the inflow of the oil liquid L into the lower chamber communication chamber 149 by the deflection amount of the flexible disk 100, and thus, the boosting of the lower chamber communication chamber 149 is reduced. For this reason, upon rising of the ultra micro low speed damping force, as if there is no flexible disk 100, a state in which the lower chamber communication chamber 149 is in constant communication with the upper chamber communication chamber 147, i.e., the same state as the structure in which the second damping force generating mechanism 173 is not provided can be made.

Accordingly, in the compression stroke at the time of high frequency input, the rising of the ultra micro low speed damping force becomes gentle with respect to at the time of low frequency input or damping force characteristics in the related art. In other words, when the frequency of the piston 21 exceeds a predetermined frequency, a flow rate of the oil liquid L to the sub valve 107 of the second damping force generating mechanism 173 is restricted by the lower chamber volume variable mechanism 185 including the flexible disk 100. Further, a variation in damping force (an inclination of the damping force with respect to the piston speed) to the opening of the second damping force generating mechanism 173 can be adjusted according to a difference in rigidity (plate thickness or the like) of the flexible disk 100.

Here, in the compression stroke, the damping force characteristics by the damping force generating mechanism 255 are also combined.

The above-mentioned Patent Document 1 discloses a shock absorber having two valves that are opened at the same stroke. By employing the structure having two valves that are opened at the same stroke in this way, one valve is opened in the region in which the piston speed is lower than that of the other valve, and both valves can be opened in the region in which the piston speed is higher than that of the other valve. In the shock absorber having the above-mentioned structure, in particular, in order to improve responsiveness of micro steering input and improve flatness of the ride on smooth roads, when the damping force is set at the time of low frequency input in the ultra micro low speed region, abnormal noise may occur at the time of high frequency input. In addition, in the shock absorber, improvement of assemblability of the biasing member is desired.

In the shock absorber 1 of the first embodiment, the communication passages 148 and 425 configured to allow communication between the inside and the outside of the cap member 95 is formed in the bottom section 122 and the plate spring 116 on one end side of the cap member 95 in the axial direction. The plate spring 116 is provided such that one end surface side in the axial direction abuts outer circumferential side rather than the communication passage 148 of the cap member 95. The flexible disk 100 that is bendable is provided to abut the other end surface side of the plate spring 116 in the axial direction. Accordingly, the lower chamber communication chamber 149 in communication with the lower chamber 23 via the communication passages 148 and 425 can be formed between the cap member 95, the flexible disk 100 and the plate spring 116. Then, the flexible disk 100 constitutes the lower chamber volume variable mechanism 185 configured to change a volume of the lower chamber communication chamber 149 due to the deformation.

Accordingly, in the above-mentioned compression stroke, even when the damping force is set at the time of low frequency input in the ultra micro low speed region, the volume of the lower chamber communication chamber 149 provided parallel to the second passage 172 can be changed by the lower chamber volume variable mechanism 185 at the time of high frequency input. Accordingly, a flow rate of the oil liquid L flowing through the second passage 172 can be changed at the time of high frequency input. Accordingly, in the compression stroke, even when the damping force is set at the time of low frequency input in the ultra micro low speed region, occurrence of abnormal noise in the compression stroke at the time of high frequency input can be suppressed.

In addition, in the shock absorber 1 of the first embodiment, the upper chamber communication chamber 147 in communication with the upper chamber 22 can be formed by the flexible disk 100. Then, the flexible disk 100 constitutes the upper chamber volume variable mechanism 186 configured to change a volume of the upper chamber communication chamber 147 due to the deformation.

Accordingly, in the above-mentioned extension stroke, even when the damping force is set at the time of low frequency input in the ultra micro low speed region, the volume of the upper chamber communication chamber 147 in communication with the second passage 182 can be changed by the upper chamber volume variable mechanism 186 at the time of high frequency input. Accordingly, a flow rate of the oil liquid L flowing through the second passage 182 can be changed at the time of high frequency input. Accordingly, in the extension stroke, even when the damping force is set at the time of low frequency input in the ultra micro low speed region, occurrence of abnormal noise at the time of high frequency input can be suppressed.

In addition, the shock absorber 1 of first embodiment includes the relief mechanism 522 that is opened after the second damping force generating mechanism 183 on the extension side is opened. For this reason, when the pressure of the upper chamber communication chamber 147 is increased, the relief mechanism 522 opens the fourth passage 521, and the oil liquid L in the upper chamber 22 and the upper chamber communication chamber 147 flows into the lower chamber communication chamber 149 and the lower chamber 23. Accordingly, deformation of the flexible disk 100 and the sub valve 110 can be suppressed. Accordingly, durability of the flexible disk 100 and the sub valve 110 can be improved.

In addition, the shock absorber 1 of the first embodiment includes the relief mechanism 532 that is opened after the second damping force generating mechanism 173 on the contraction side is opened. For this reason, when the pressure of the lower chamber communication chamber 149 is increased, the relief mechanism 532 opens the fourth passage 531, and the oil liquid L in the lower chamber 23 and the lower chamber communication chamber 149 flows into the upper chamber communication chamber 147 and the upper chamber 22. Accordingly, deformation of the flexible disk 100 and the sub valve 107 can be suppressed. Accordingly, durability of the flexible disk 100 and the sub valve 107 can be improved.

The plate spring 116 has the hole portions 415 from the inner circumferential end portion to the outer circumferential end portion, and is formed such that the inner circumferential end portion abuts the piston rod 25. In this way, since the plate spring 116 has the hole portions 415 from the inner circumferential end portion to the outer circumferential end portion, communication of the lower chamber communication chamber 149 to the lower chamber 23 can be secured. In addition, since the plate spring 116 is formed such that the inner circumferential end portion abuts the piston rod 25, assemblability of the plate spring 116 to the piston rod 25 can be improved. Accordingly, since the plate spring 116 can be assembled to the piston rod 25 by an automatic machine, no manpower is required and the assembly time can be shortened, the assembly cost can be reduced.

In the plate spring 116, the outer diameter side is the outer conical portion 403 configured to generate spring power, and the inner diameter side is the inner planar portion 414 which is closer to a plane than the outer conical portion 403. For this reason, suction and conveyance by vacuum in the inner planar portion 414 becomes easy, and an assembly time can be further reduced. Accordingly, assembly cost can be further reduced.

The plate spring 116 has the hole portions 415 formed in the inner planar portion 414. For this reason, definition of the upper chamber communication chamber 147 and the lower chamber communication chamber 149 is facilitated.

Figure 9:
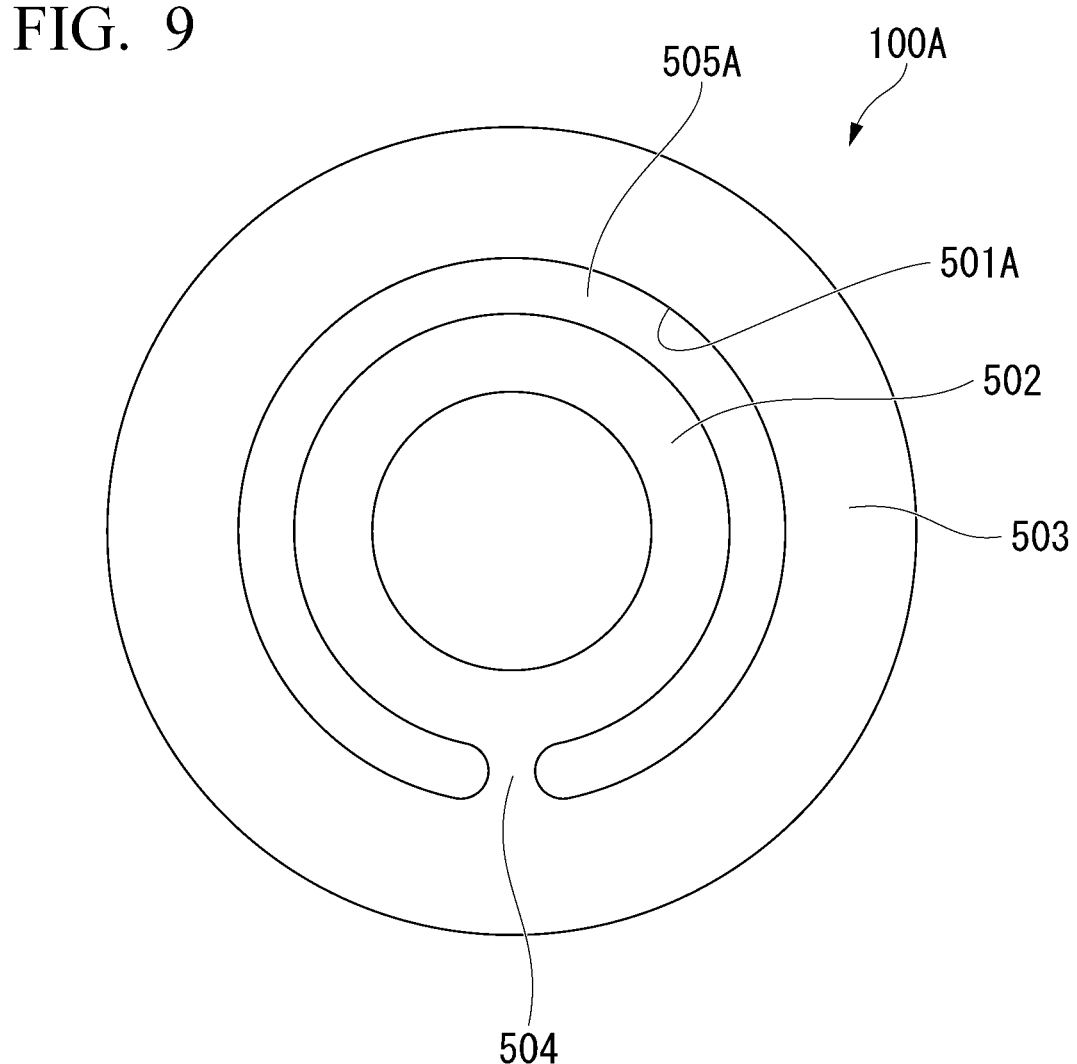
FIG. 9 is a plan view showing a variant of a flexible disk of the shock absorber according to the first embodiment of the present invention.

Further, in addition to the flexible disk 100, a flexible disk 100A of the variant as shown in FIG. 9 may be provided. The flexible disk 100A has the inner annular portion 502 and the outer conical portion 503, like the flexible disk 100, and the same connecting portion 504 as that of the flexible disk 100 is provided at only one place. An arc-shaped communication hole 501A surrounded by the inner annular portion 502, the outer conical portion 503 and the connecting portion 504 is formed in the flexible disk 100A. A width of the communication hole 501A in the radial direction is equal to an inner diameter of the communication hole 501. The communication hole 501A has an arc shape in concentric with the inner annular portion 502 and the outer conical portion 503. The communication hole 501A passes through the flexible disk 100A in the thickness direction, and the inside thereof becomes a communication passage 505A. The communication passage 505A is also opened and closed by the valve seat disk 101, like the communication passage 505, and forms the fourth passage 521 together with the passage between the communication passage 505A and the valve seat disk 101 upon opening.

Second Embodiment

Next, a second embodiment will be described with reference to FIG. 10 and FIG. 11 mainly focusing on differences from the first embodiment. Further, the same components as in the first embodiment are designated by the same names and the same reference signs.

Figure 10:
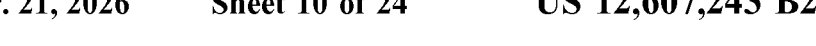
FIG. 10 is a partial cross-sectional view showing a major part of a shock absorber according to the second embodiment of the present invention.
Figure 11:
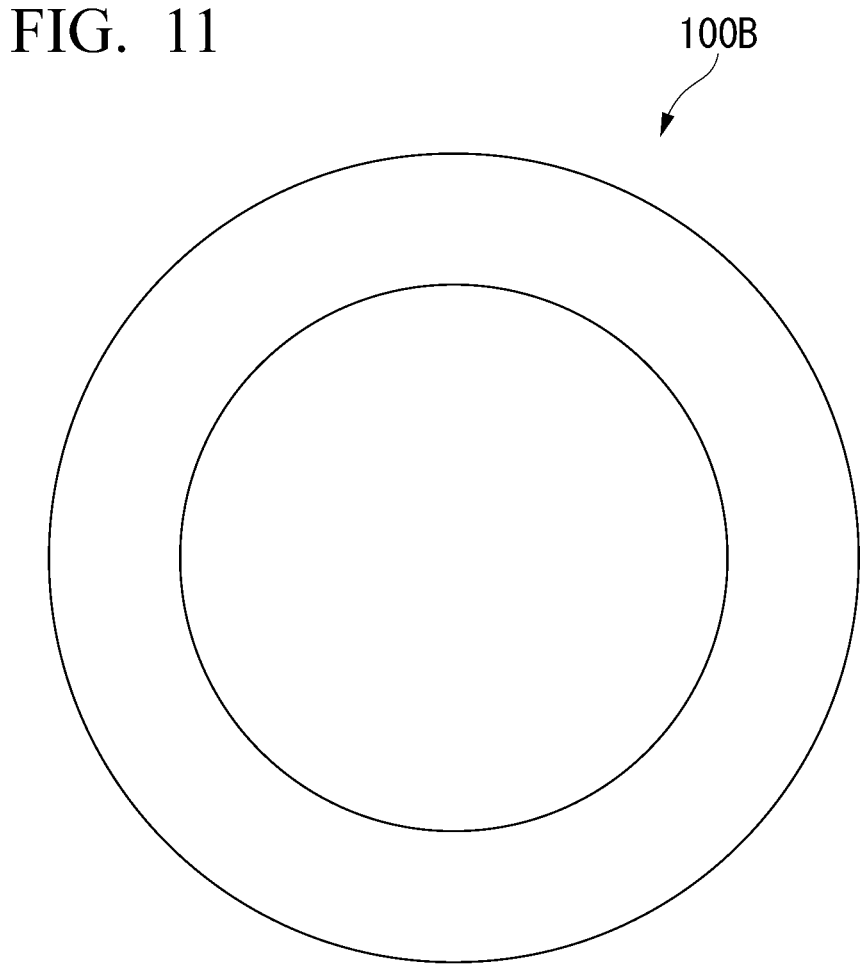
FIG. 11 is a plan view showing a flexible disk of the shock absorber according to the second embodiment of the present invention.

In a shock absorber 1B of the second embodiment, as shown in FIG. 10, instead of the accumulator 190 of the first embodiment, an accumulator 190B is provided.

The accumulator 190B has a flexible disk 100B instead of the flexible disk 100 of the first embodiment. As shown in FIG. 11, the flexible disk 100B has a shape only having the outer conical portion 503 of the flexible disk 100. Accordingly, the flexible disk 100B has a fixed width in the radial direction over the entire circumference. The flexible disk 100B is a simple support free valve. The flexible disk 100B abuts the valve seat disk 101 and the plate spring 116 as shown in FIG. 10, like the outer conical portion 503 of the flexible disk 100. The flexible disk 100B is movable with respect to the piston rod 25 in the radial direction. The flexible disk 100B abuts the tubular portion 124 of the cap member 95, and thus, movement in the radial direction is restricted within a predetermined range. Even when the flexible disk 100B moves maximally in the radial direction, a state in which positions in the radial direction overlap the valve seat disk 101 and the plate spring 116 over the entire circumference is maintained.

In the accumulator 190B, instead of the disk 97 of the first embodiment, a disk 97B, a disk 98B and a disk 99B are provided in sequence from the side of the bottom section 122 in the axial direction. All the disk 97B, the disk 98B and the disk 99B are formed of a metal, and have a porous circular flat plate shape with a fixed width in the radial direction over the entire circumference. All the disk 97B, the disk 98B and the disk 99B are positioned with respect to the piston rod 25 in the radial direction by fitting the attachment shaft portion 28 thereinto.

The disk 97B abuts the inner annular portion 401 of the plate spring 116. The disk 97B has an outer diameter that is slightly greater than the outer diameter of the inner annular portion 401 of the plate spring 116, and an inner diameter that is smaller than the inner diameter of the connecting arm portions 413. Both the disk 98B and the disk 99B have an outer diameter that is equal to the outer diameter of the disk 102. The disk 99B abuts the valve seat disk 101. A gap is formed between the flexible disk 100B and the disk 97B to 99B in the radial direction. The portion becomes the communication passage 505B corresponding to the communication passage 505 of the first embodiment. In other words, the flexible disk 100B has a communication hole 506B configured to allow communication between the upstream side and the downstream side from the inner circumferential end portion to the outer diameter of the piston rod 25.

The flexible disk 100B, the valve seat disk 101, the plate spring 116, the bottom section 122 of the cap member 95, and the disks 97B to 99B form a lower chamber communication chamber 149B corresponding to the lower chamber communication chamber 149 of the first embodiment. The lower chamber communication chamber 149B also constitutes the third passage 511B corresponding to the third passage 511 of the first embodiment together with the communication passages 425 and 148. The flexible disk 100B, the valve seat disk 101, the plate spring 116, the disks 97B to 99B, the bottom section 122 of the cap member 95, and the lower chamber communication chamber 149B constitute a lower chamber volume variable mechanism 185B operated like the lower chamber volume variable mechanism 185 of the first embodiment provided in the third passage 511B.

The flexible disk 100B, the valve seat disk 101, the disks 102 to 104, the spring member 105, the disk 106, the sub valve 107, and the cap member 95 form an upper chamber communication chamber 147B corresponding to the upper chamber communication chamber 147 of first embodiment. The upper chamber communication chamber 147B also constitutes a third passage 512B corresponding to the third passage 512 of the first embodiment together with the passage between the sub valve 107 and the tubular portion 124. The flexible disk 100B, the valve seat disk 101, the plate spring 116, the disks 102 to 104, the spring member 105, the disk 106, the sub valve 107, the cap member 95, and the upper chamber communication chamber 147 constitute an upper chamber volume variable mechanism 186B operated like the upper chamber volume variable mechanism 186 of the first embodiment provided in the third passage 512B.

A space between the flexible disk 100B and the valve seat disk 101 constitutes a fourth passage 521B corresponding to the fourth passage 521 of the first embodiment. When the flexible disk 100B and the valve seat disk 101 are separated, the fourth passage 521B therebetween is opened to allow communication between the upper chamber communication chamber 147B and the lower chamber communication chamber 149B. The flexible disk 100B and the valve seat disk 101 is provided in the fourth passage 521B to constitute a relief mechanism 522B on the extension side operated like the relief mechanism 522 of the first embodiment.

A space between the flexible disk 100B and the plate spring 116 constitute a fourth passage 531B corresponding to the fourth passage 531 of the first embodiment. When the flexible disk 100B and the plate spring 116 are separated, the fourth passage 531B therebetween is opened to allow communication between the lower chamber communication chamber 149B and the upper chamber communication chamber 147B. The flexible disk 100B and the plate spring 116 are provided in the fourth passage 531B to constitute a relief mechanism 532B on the contraction side operated like the relief mechanism 532 of the first embodiment.

The shock absorber 1B is mainly distinguished from the shock absorber 1 of the first embodiment in that the flexible disk 100B is not fixed to the piston rod 25 and movement thereof is restricted by the tubular portion 124 of and the cap member 95, and is the same hydraulic circuit as the shock absorber 1 of the first embodiment. The shock absorber 1B is operated in the same manner as the shock absorber 1 of the first embodiment in both the extension stroke and the compression stroke.

Third Embodiment

Next, a third embodiment will be described with reference to FIG. 12 focusing on differences from the first embodiment. Further, the same components as the first embodiment are designated by the same names and the same reference signs.

Figure 12:
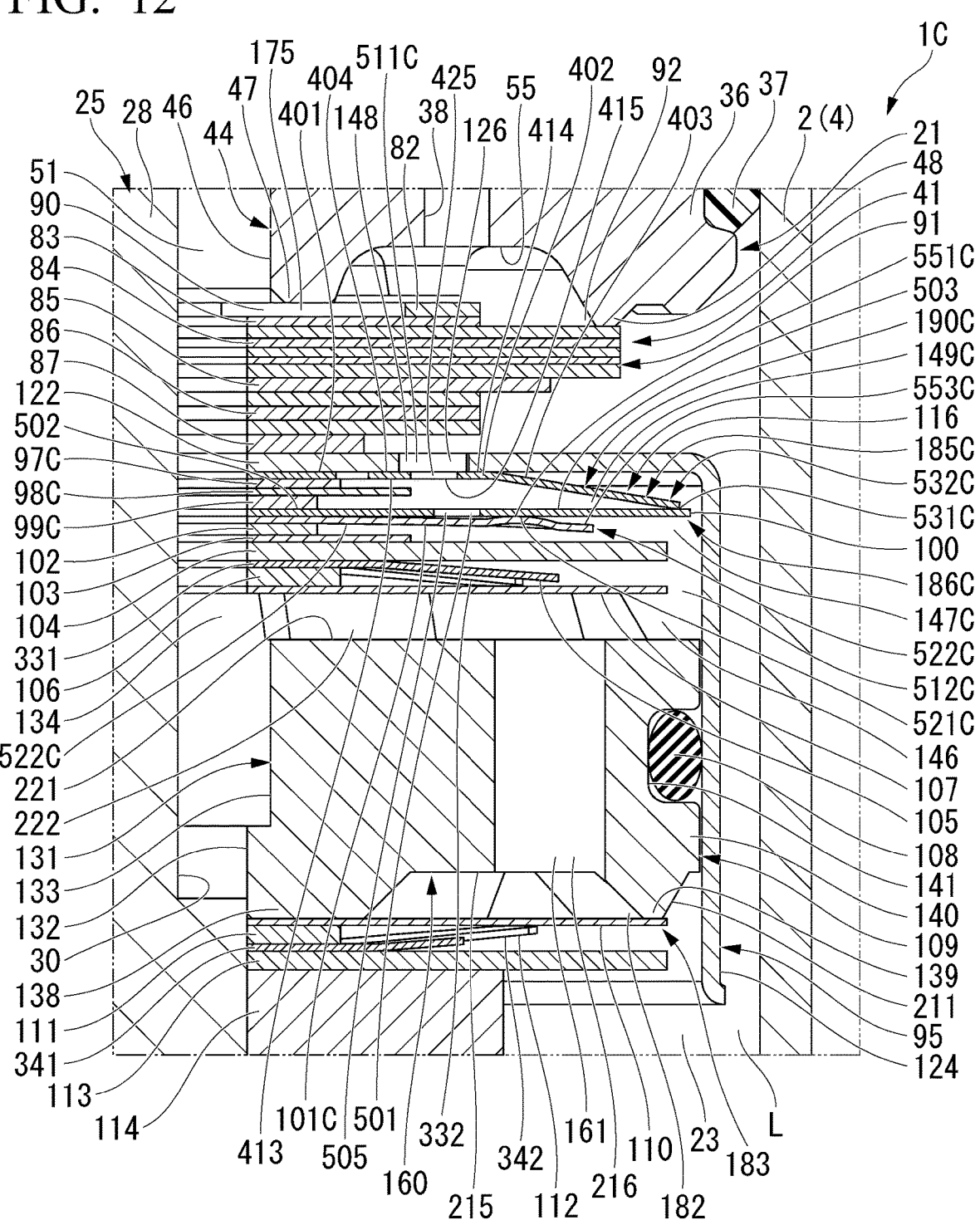
FIG. 12 is a partial cross-sectional view showing a major part of a shock absorber according to a third embodiment of the present invention.

In a shock absorber 1C of the third embodiment, as shown in FIG. 12, an accumulator 190C is provided instead of the accumulator 190 of the first embodiment.

In the accumulator 190C, instead of the disk 97 of the first embodiment, a disk 97C, a disk 98C and a disk 99C are provided in sequence from the side of the bottom section 122 in the axial direction.

All the disk 97C, the disk 98C and the disk 99C are formed of a metal, and have a porous circular flat plate shape with a fixed width in the radial direction over the entire circumference. All disk 97C, the disk 98C and the disk 99C are positioned with respect to the piston rod 25 in the radial direction by fitting the attachment shaft portion 28 thereinto.

The disk 97C abuts the inner annular portion 401 of the plate spring 116. The disk 97C has an outer diameter that is slightly greater than that of the inner annular portion 401 of the plate spring 116, and an inner diameter that is smaller than that of the connecting arm portions 413. An outer diameter of the disk 98C is greater than that of the disk 97C, and the same as that of the connecting arm portions 413 of the plate spring 116. The disk 99C has an outer diameter equal to that of the disk 102.

In the accumulator 190C, the valve seat disk 101C is provided instead of the valve seat disk 101 of the first embodiment. The valve seat disk 101C is distinguished from the valve seat disk 101 in that a protrusion portion 551C protrudes in the axial direction from an intermediate section in the radial direction. The protrusion portion 551C has an annular shape about a center axis of the valve seat disk 101C. The protrusion portion 551C has an arc-shaped cross section along a surface including the center axis of the valve seat disk 101C.

An inner side of the protrusion portion 551C of the valve seat disk 101C in the radial direction is an inner annular portion 552C with a fixed width in the radial direction over the entire circumference. An outer side of the protrusion portion 551C of the valve seat disk 101C in the radial direction is an outer conical portion 553C with a fixed width in the radial direction over the entire circumference. When the valve seat disk 101C is in a natural state before being assembled to the piston rod 25, both the inner annular portion 552C and the outer conical portion 553C are flat and arranged on the same plane.

When the valve seat disk 101C is assembled to the piston rod 25, the inner annular portion 552C is clamped between the disk 99C and the disk 102 in the axial direction together with the inner annular portion 502 of the flexible disk 100. In this state, the protrusion portion 551C abuts the outer conical portion 503 on an outer side of the plurality of communication holes 501 of the flexible disk 100 in the radial direction over the entire circumference. Accordingly, the valve seat disk 101C closes the plurality of communication passages 505 of the flexible disk 100.

The flexible disk 100, the valve seat disk 101C, the plate spring 116, the bottom section 122 of the cap member 95, and the disks 97C to 99C form a lower chamber communication chamber 149C corresponding to the lower chamber communication chamber 149 of the first embodiment. The lower chamber communication chamber 149C also constitutes a third passage 511C corresponding to the third passage 511 of the first embodiment together with the communication passages 425 and 148. The flexible disk 100, the valve seat disk 101C, the plate spring 116, the bottom section 122 of the cap member 95, the disks 97C to 99C, and the lower chamber communication chamber 149C are provided in the third passage 511C to constitute a lower chamber volume variable mechanism 185C operated substantially like the lower chamber volume variable mechanism 185 of the first embodiment.

The flexible disk 100, the valve seat disk 101C, the plate spring 116, the disk 102 to 104, the spring member 105, the disk 106, the sub valve 107, and the cap member 95 form an upper chamber communication chamber 147C corresponding to the upper chamber communication chamber 147 of the first embodiment. The upper chamber communication chamber 147C also constitutes a third passage 512C corresponding to the third passage 512 of the first embodiment together with the passage between the sub valve 107 and the tubular portion 124. The flexible disk 100, the valve seat disk 101C, the plate spring 116, the disk 102 to 104, the spring member 105, the disk 106, the sub valve 107, the cap member 95, and the upper chamber communication chamber 147C are provided in the third passage 512C to constitute an upper chamber volume variable mechanism 186C operated substantially like the upper chamber volume variable mechanism 186 of the first embodiment.

A space between the flexible disk 100 and the valve seat disk 101C becomes a fourth passage 521C corresponding to the fourth passage 521 of the first embodiment. When the flexible disk 100 and the valve seat disk 101C are separated, the fourth passage 521C therebetween is opened to allow communication between the upper chamber communication chamber 147C and the lower chamber communication chamber 149C. The flexible disk 100 and the valve seat disk 101C are provided in the fourth passage 521C to constitute a relief mechanism 522C on the extension side operated substantially like the relief mechanism 522 of the first embodiment.

A space between the flexible disk 100 and the plate spring 116 becomes a fourth passage 531C corresponding to the fourth passage 531 of the first embodiment. When the flexible disk 100 and the plate spring 116 are separated, the fourth passage 531C therebetween is opened to allow communication between the lower chamber communication chamber 149C and the upper chamber communication chamber 147C. The flexible disk 100 and the plate spring 116 are provided in the fourth passage 531C to constitute a relief mechanism 532C on the extension side operated substantially like the relief mechanism 532 of the first embodiment.

In the accumulator 190C, the valve seat disk 101C has an annular protrusion portion 551C. The protrusion portion 551C of the accumulator 190C abuts the flexible disk 100. The shock absorber 1C has the same hydraulic circuit as the shock absorber 1 of the first embodiment, and an operation of the accumulator 190C is slightly different from the operation of the accumulator 190 of the first embodiment.

The accumulator 190C is elastically deformed to increase the volume of the upper chamber communication chamber 147C such that the flexible disk 100 and the valve seat disk 101C cause the portion inside the abutting position with the plate spring 116 in the radial direction to approach the bottom section 122 in the extension stroke. Here, the valve seat disk 101C is also deformed integrally with the flexible disk 100 to cause the protrusion portion 551C to abut the flexible disk 100, thereby maintaining the fourth passage 521C in the closed state.

In the accumulator 190C, in a state in which the second damping force generating mechanism 183 is opened in the extension stroke, when the pressure difference between the upper chamber communication chamber 147C and the lower chamber communication chamber 149C exceeds a predetermined value, like the first embodiment, the flexible disk 100 is elastically deformed to approach the bottom section 122 while elastically deforming the outer conical portion 403 of the plate spring 116 and separated from the protrusion portion 551C of the valve seat disk 101C, and the fourth passage 521C is opened to bring the upper chamber communication chamber 147C in communication with the lower chamber communication chamber 149C. That is, the relief mechanism 522C is opened after the second damping force generating mechanism 183 is opened in the extension stroke, and the upper chamber communication chamber 147C is in communication with the lower chamber communication chamber 149C via the fourth passage 521C.

In the accumulator 190C, in the compression stroke, the flexible disk 100 and the valve seat disk 101C elastically deform the inner portion of the abutting position with the protrusion portion 551C in the radial direction toward the disk 104 to increase the volume of the lower chamber communication chamber 149C. Here, the valve seat disk 101C maintains the protrusion portion 551C in a state abutting the flexible disk 100 and maintains the fourth passage 521C in a closed state.

In the accumulator 190C, in the compression stroke, in a state in which the second damping force generating mechanism 173 is opened, the pressure difference between the lower chamber communication chamber 149C and the upper chamber communication chamber 147C exceeds a predetermined value, the flexible disk 100 is deformed to approach the disk 104 together with the valve seat disk 101C and separated from the outer conical portion 403 of the plate spring 116, and the fourth passage 531C is opened to bring the lower chamber communication chamber 149C in communication with the upper chamber communication chamber 147C. That is, the relief mechanism 532C is opened after the second damping force generating mechanism 173 is opened in the compression stroke, and the lower chamber communication chamber 149C is in communication with the upper chamber communication chamber 147C via the fourth passage 531C.

The shock absorber 1C is operated like the shock absorber 1 of the first embodiment in both the extension stroke and the compression stroke except the above-mentioned operation of the accumulator 190C.

Fourth Embodiment

Next, a fourth embodiment will be described mainly with reference to FIG. 13 focusing on differences from the first embodiment. Further, the same components as the first embodiment are designated by the same names and the same reference signs.

Figure 13:
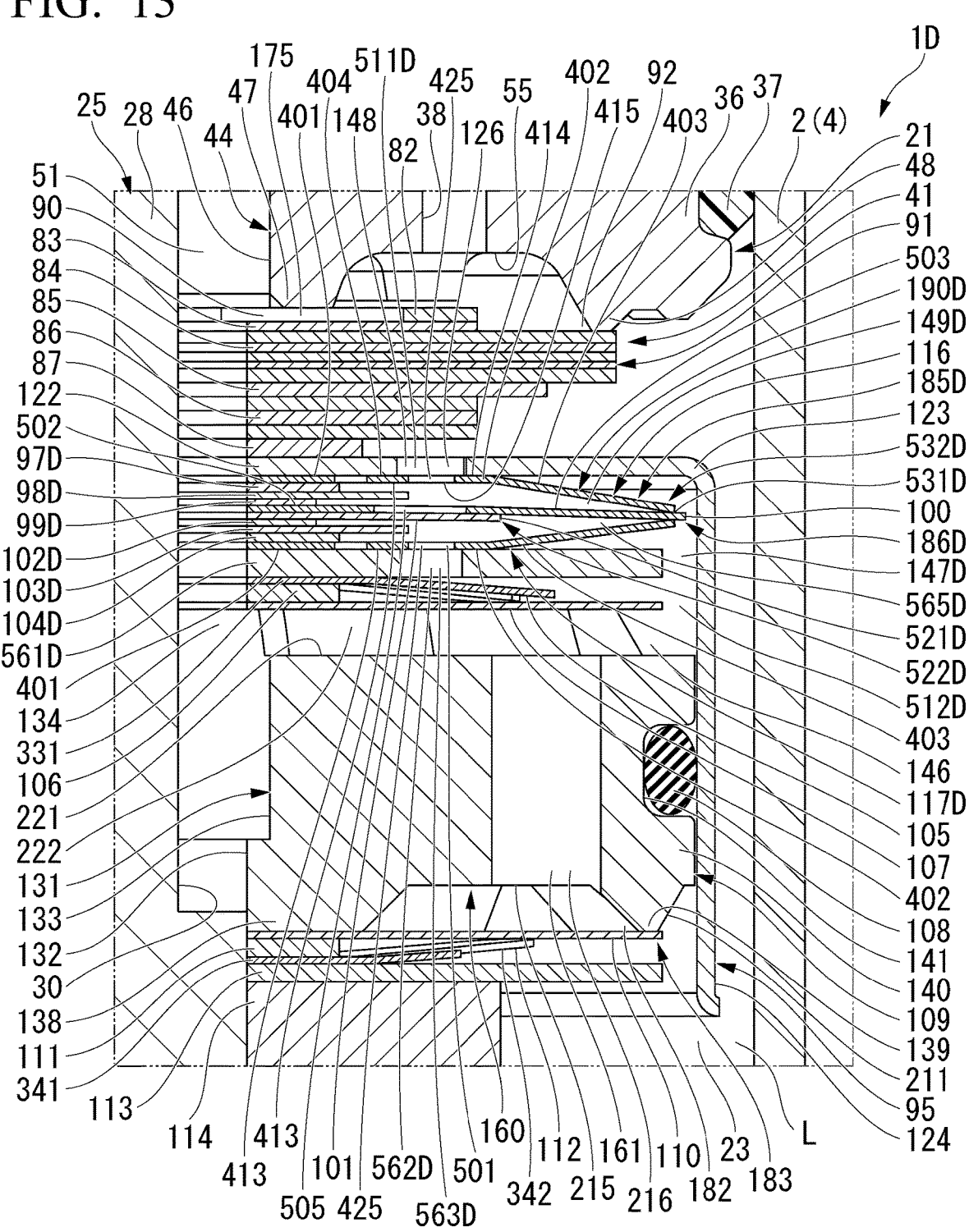
FIG. 13 is a partial cross-sectional view showing a major part of a shock absorber according to a fourth embodiment of the present invention.

In a shock absorber 1D of the fourth embodiment, as shown in FIG. 13, an accumulator 190D is provided instead of the accumulator 190 of the first embodiment.

In the accumulator 190D, instead of the disk 97 of the first embodiment, a disk 97D, a disk 98D and a disk 99D are provided in sequence from the side of the bottom section 122 in the axial direction.

In the accumulator 190D, instead of the disks 102 to 104 of the first embodiment, a disk 102D, a disk 103D, a disk 104D, a plate spring 117D and a spring abutting disk 561D are provided in sequence from the side of the bottom section 122 in the axial direction.

All the disks 97D to 99D, and 102D to 104D and the spring abutting disk 561D are formed of a metal and have a porous circular flat plate shape with a fixed width in the radial direction over the entire circumference. The plate spring 117D has the same shape as the plate spring 116 and compatibility. All the disks 97D to 99D, and 102D to 104D, the plate spring 117D and the spring abutting disk 561D are positioned with respect to the piston rod 25 in the radial direction by fitting the attachment shaft portion 28 thereinto.

The disk 97D abuts the inner annular portion 401 of the plate spring 116. The disk 97D has an outer diameter that is slightly greater than that of the inner annular portion 401 of the plate spring 116, and an inner diameter smaller than that of the connecting arm portions 413. An outer diameter of the disk 98D is greater than that of the disk 97D, and equal to that of the connecting arm portions 413 of the plate spring 116. An outer diameter of the disk 99D is smaller than that of the disk 97D. The disk 99D abuts the flexible disk 100. The disk 102D has the same shape as the disk 99D and compatibility. The disk 102D abuts the valve seat disk 101. The disk 103D has the same shape as the disk 98D and compatibility. The disk 104D has the same shape as the disk 97D and compatibility.

The inner annular portion 401 of the plate spring 117D abuts the disk 104D. In the plate spring 117D, an edge portion of the outer conical portion 403 opposite to the intermediate annular portion 402 abuts the outer circumferential side of the flexible disk 100. That is, the plate spring 117D sandwiches the flexible disk 100 from both sides in the axial direction together with the plate spring 116.

A plurality of passage holes 562D passing in the thickness direction (axial direction) through the intermediate position in the radial direction are formed in the spring abutting disk 561D at intervals in the circumferential direction. The inside of the passage holes 562D becomes a communication passage 563D. A distance of the passage holes 562D from a center of the spring abutting disk 561D is equal to a distance of the passage holes 126 from a center of the bottom section 122. The communication passage 563D is in constant communication with the communication passage 425 of the plate spring 117D. The spring abutting disk 561D has a larger thickness and higher rigidity than the plate spring 117D and the flexible disk 100.

In the shock absorber 1D, the flexible disk 100, the valve seat disk 101, the plate spring 116, the bottom section 122 of the cap member 95, and the disks 97D to 99D form a lower chamber communication chamber 149D corresponding to the lower chamber communication chamber 149 of the first embodiment. The lower chamber communication chamber 149D also constitutes a third passage 511D corresponding to the third passage 511 of the first embodiment together with the communication passages 425 and 148. In the accumulator 190D, the flexible disk 100, the valve seat disk 101, the plate springs 116 and 117D, the bottom section 122 of the cap member 95, the disks 97D to 99D, and the lower chamber communication chamber 149D constitute a lower chamber volume variable mechanism 185D operated substantially like the lower chamber volume variable mechanism 185 of the first embodiment provided in the third passage 511D.

In the shock absorber 1D, the flexible disk 100, the valve seat disk 101, the disks 102D to 104D, the plate springs 116 and 117D, the spring abutting disk 561D, the spring member 105, the disk 106, the sub valve 107, and the cap member 95 form an upper chamber communication chamber 147D corresponding to the upper chamber communication chamber 147 of the first embodiment. The upper chamber communication chamber 147D also constitutes a third passage 512D corresponding to the third passage 512 of the first embodiment together with the passage between the sub valve 107 and the tubular portion 124. The upper chamber communication chamber 147D includes a chamber 565D surrounded by the flexible disk 100, the valve seat disk 101, the disks 102D to 104D, the plate spring 117D, and the spring abutting disk 561D. In the accumulator 190D, the flexible disk 100, the valve seat disk 101, the disks 102D to 104D, the plate springs 116 and 117D, the spring abutting disk 561D, the spring member 105, the disk 106, the sub valve 107, the cap member 95, and the upper chamber communication chamber 147D constitute an upper chamber volume variable mechanism 186D operated substantially like the upper chamber volume variable mechanism 186 of the first embodiment provided in the third passage 512D.

A space between the flexible disk 100 and the valve seat disk 101 becomes a fourth passage 521D corresponding to the fourth passage 521 of the first embodiment. When the flexible disk 100 and the valve seat disk 101 are separated, the fourth passage 521D therebetween is opened to allow communication between the upper chamber communication chamber 147D and the lower chamber communication chamber 149D. The flexible disk 100 and the valve seat disk 101 are provided in the fourth passage 521D to constitute a relief mechanism 522D on the extension side operated substantially like the relief mechanism 522 of the first embodiment.

A space between the flexible disk 100 and the plate spring 116 becomes a fourth passage 531D corresponding to the fourth passage 531 of the first embodiment. When the flexible disk 100 and the plate spring 116 are separated, the fourth passage 531D therebetween is opened to allow communication between the lower chamber communication chamber 149D and the upper chamber communication chamber 147D. The flexible disk 100 and the plate spring 116 are provided in the fourth passage 531D constitute a relief mechanism 532D on the contraction side operated substantially like the relief mechanism 532 of the first embodiment.

The shock absorber 1D has the same hydraulic circuit as the shock absorber 1 of the first embodiment, and an operation of the accumulator 190D is slightly different from the operation of the accumulator 190 of the first embodiment.

In the accumulator 190D, in the extension stroke, the flexible disk 100 and the valve seat disk 101 are elastically deformed to increase a volume of the chamber 565D such that an inner portion of the abutting position with the plate spring 116 of the flexible disk 100 in the radial direction approaches the bottom section 122, and a volume of the upper chamber communication chamber 147D including the chamber 565D is increased. Here, in a state in which the valve seat disk 101 is deformed integrally with the flexible disk 100, the fourth passage 521D is maintained in a closed state.

In the accumulator 190D, in the extension stroke, in a state in which the second damping force generating mechanism 183 is opened, when the pressure difference between the upper chamber communication chamber 147D and the lower chamber communication chamber 149D exceeds a predetermined value, like the first embodiment, the flexible disk 100 is elastically deformed to approach the bottom section 122 while elastically deforming the outer conical portion 403 of the plate spring 116 and separated from the valve seat disk 101, and the fourth passage 521D is opened to bring the upper chamber communication chamber 147D in communication with the lower chamber communication chamber 149D. That is, the relief mechanism 522D is opened after the second damping force generating mechanism 183 is opened in the extension stroke, and the upper chamber communication chamber 147D is in communication with the lower chamber communication chamber 149D via the fourth passage 521D.

In the accumulator 190D, in the compression stroke, the flexible disk 100 and the valve seat disk 101 cause the radial inner portion of the abutting position with the plate spring 117D of the flexible disk 100 to be elastically deformed integrally toward the spring abutting disk 561D to increase a volume of the lower chamber communication chamber 149D. Here, the valve seat disk 101 maintains a state abutting the flexible disk 100 and maintains the fourth passage 521D in a closed state.

In the accumulator 190D, in the compression stroke, in a state in which the second damping force generating mechanism 173 is opened, when the pressure difference between the lower chamber communication chamber 149D and the upper chamber communication chamber 147D exceeds a predetermined value, the flexible disk 100 is deformed to approach the spring abutting disk 561D together with the valve seat disk 101 while elastically deforming the outer conical portion 403 of the plate spring 117D and separated from the outer conical portion 403 of the plate spring 116, and the fourth passage 531D is opened to bring the lower chamber communication chamber 149D in communication with the upper chamber communication chamber 147D. That is, the relief mechanism 532D is opened after the second damping force generating mechanism 173 is opened in the compression stroke, the lower chamber communication chamber 149D is in communication with the upper chamber communication chamber 147D via the fourth passage 531D.

The shock absorber 1D is operated like the shock absorber 1 of the first embodiment in both the extension stroke and the compression stroke except the above-mentioned operation of the accumulator 190D.

Fifth Embodiment

Next, a fifth embodiment will be described mainly with reference to FIG. 14 focusing on differences from the first embodiment. Further, the same components as the first embodiment are designated by the same names and the same reference signs.

Figure 14:
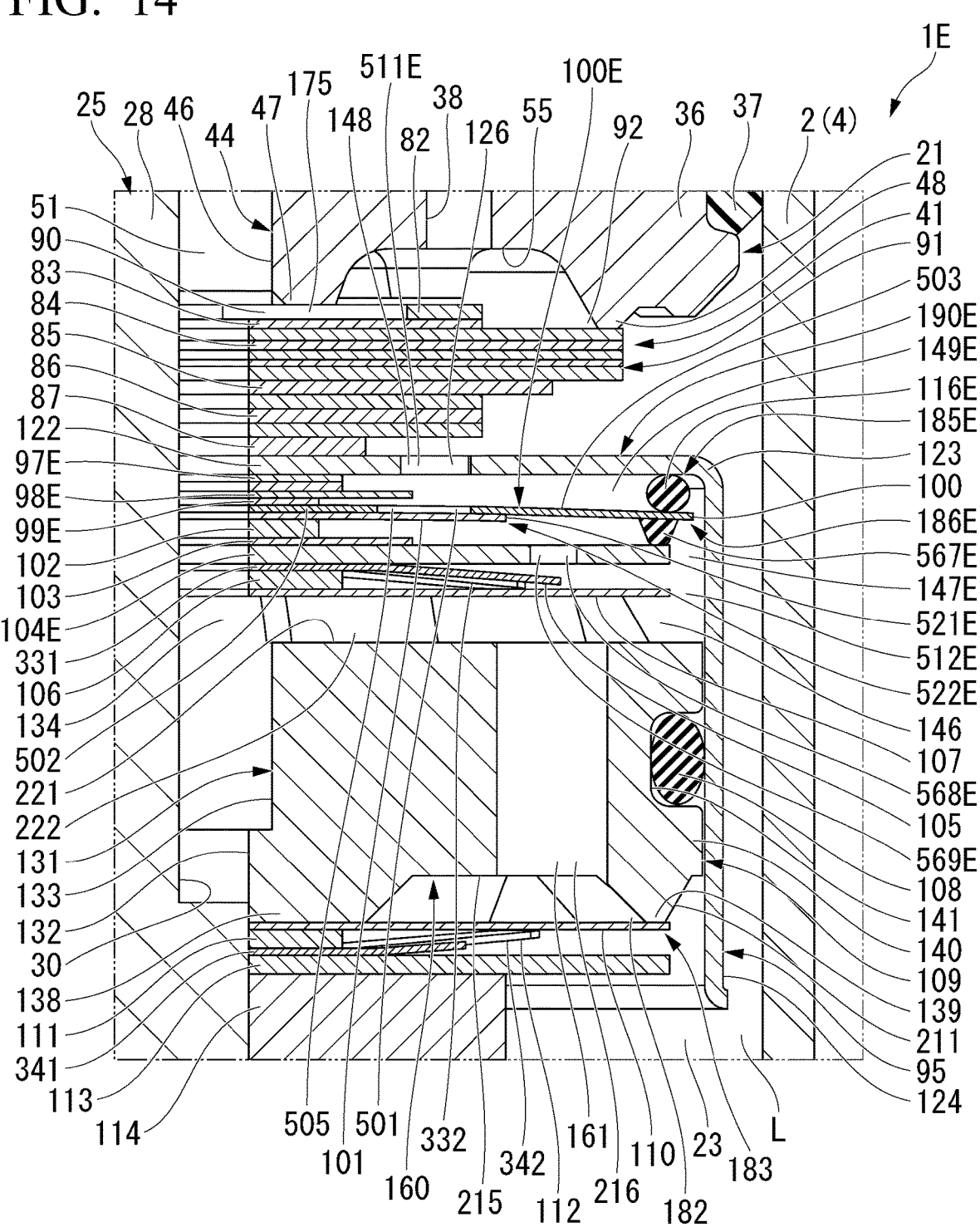
FIG. 14 is a partial cross-sectional view showing a major part of a shock absorber according to a fifth embodiment of the present invention.

In a shock absorber 1E of the fifth embodiment, as shown in FIG. 14, an accumulator 190E is provided instead of the accumulator 190 of the first embodiment.

An O-ring 116E (biasing member) constituted by an elastic seal member such as rubber or the like is provided in the accumulator 190E instead of the plate spring 116 of the first embodiment. In the accumulator 190E, instead of the disk 97 of the first embodiment, a plurality of sheets of (specifically, two sheets of) a disk 97E, a disk 98E and a disk 99E with the same inner diameter and the same outer diameter are provided in sequence from the side of the bottom section 122 in the axial direction. In the accumulator 190E, instead of the flexible disk 100 of the first embodiment, a flexible disk 100E to which an annular elastic member 567E formed of rubber or the like is adhered is provided on one side of the outer circumferential portion of the flexible disk 100 in the axial direction.

In the accumulator 190E, a disk 104E is provided instead of the disk 104 of the first embodiment. The disk 104E has a through-hole 568E passing through the disk 104 in the axial direction, and the inside of the through-hole 568E becomes a communication passage 569E.

All the disks 97E to 99E are formed of a metal and have a porous circular flat plate shape with a fixed width in the radial direction over the entire circumference. All the disks 97E to 99E are positioned with respect to the piston rod 25 in the radial direction by fitting the attachment shaft portion 28 thereinto.

The disk 97E abuts the bottom section 122 of the cap member 95. The disk 97E has an outer diameter that is smaller than two times a minimum distance from a center of the cap member 95 in the radial direction to the passage holes 126. An outer diameter of the disk 98E is greater than that of the disk 97E. An outer diameter of the disk 99E is smaller than that of the disk 97E. The disk 99E abuts the inner annular portion 502 of the flexible disk 100E. The disks 97E to 99E are disposed inside the O-ring 116E in the radial direction to be separated from the O-ring 116E in the radial direction.

An outer diameter of the O-ring 116E is smaller than an inner diameter of the tubular portion 124. An inner diameter of the O-ring 116E is greater than two times a maximum distance from a center of the cap member 95 in the radial direction to the passage holes 126. The O-ring 116E is provided to surround the entire communication passage 148 of the bottom section 122 of the cap member 95 outside the bottom section 122 in the radial direction such that one end side in the axial direction abuts the bottom section 122 over the entire circumference. The other end side of the O-ring 116E in the axial direction abuts the outer circumferential side of the outer conical portion 503 of the flexible disk 100E over the entire circumference. In the flexible disk 100E, the elastic member 567E abuts the outer side of the communication passage 569E of the disk 104E in the radial direction over the entire circumference.

In the shock absorber 1E, the flexible disk 100E, the valve seat disk 101, the O-ring 116E, the bottom section 122 of the cap member 95, and the disks 97E to 99E form a lower chamber communication chamber 149E corresponding to the lower chamber communication chamber 149 of the first embodiment. The lower chamber communication chamber 149E also constitutes a third passage 511E corresponding to the third passage 511 of the first embodiment together with the communication passages 425 and 148. In the accumulator 190E, the flexible disk 100E, the valve seat disk 101, the O-ring 116E, the bottom section 122 of the cap member 95, the disks 97E to 99E, and the lower chamber communication chamber 149E are provided in the third passage 511E to constitute a lower chamber volume variable mechanism 185E operated substantially like the lower chamber volume variable mechanism 185 of the first embodiment.

In the shock absorber 1E, the flexible disk 100E, the valve seat disk 101, the O-ring 116E, the disks 102 and 103, the disk 104E, the spring member 105, the disk 106, the sub valve 107, and the cap member 95 form an upper chamber communication chamber 147E corresponding to the upper chamber communication chamber 147 of the first embodiment. The communication passage 569E of the disk 104E is formed to make the entire upper chamber communication chamber 147E the same pressure. The upper chamber communication chamber 147E also constitutes a third passage 512E corresponding to the third passage 512 of the first embodiment together with the passage between the sub valve 107 and the tubular portion 124. In the accumulator 190E, the flexible disk 100E, the valve seat disk 101, the O-ring 116E, the disks 102 and 103, the disk 104E, the spring member 105, the disk 106, the sub valve 107, the cap member 95, and the upper chamber communication chamber 147E are provided in the third passage 512E to constitute an upper chamber volume variable mechanism 186E operated substantially like the upper chamber volume variable mechanism 186 of the first embodiment.

A space between the flexible disk 100E and the valve seat disk 101 becomes a fourth passage 521E corresponding to the fourth passages 521 and 531 of the first embodiment. When the flexible disk 100E and the valve seat disk 101 are separated, the fourth passage 521E therebetween is opened to allow communication between the upper chamber communication chamber 147E and the lower chamber communication chamber 149E. The flexible disk 100E and the valve seat disk 101 are provided in the fourth passage 521E to constitute a relief mechanism 522E on the extension side and the contraction side operated substantially like the relief mechanisms 522 and 532 of the first embodiment.

The shock absorber 1E has the same hydraulic circuit as the shock absorber 1 of the first embodiment, and an operation of the accumulator 190E is slightly different from the operation of the accumulator 190 of the first embodiment.

In the accumulator 190E, in the extension stroke, the flexible disk 100E and the valve seat disk 101 are elastically deformed integrally such that the radial inner portion of the abutting position with the O-ring 116E of the flexible disk 100E approaches the bottom section 122 to increase a volume of the upper chamber communication chamber 147E. Here, the O-ring 116E is elastically deformed. Here, the valve seat disk 101 maintains the fourth passage 521E in a closed state while being deformed integrally with the flexible disk 100E.

In the accumulator 190E, in the extension stroke, in a state in which the second damping force generating mechanism 183 is opened, when the pressure difference between the upper chamber communication chamber 147E and the lower chamber communication chamber 149E exceeds a predetermined value, the flexible disk 100E is elastically deformed to approach the bottom section 122 while further elastically deforming the O-ring 116E and separated from the valve seat disk 101, and the fourth passage 521E is opened to bring the upper chamber communication chamber 147E in communication with the lower chamber communication chamber 149E. That is, the relief mechanism 522E is opened after the second damping force generating mechanism 183 is opened in the extension stroke, and the upper chamber communication chamber 147E is in communication with the lower chamber communication chamber 149E via the fourth passage 521E.

In the accumulator 190E, in the compression stroke, the flexible disk 100E and the valve seat disk 101 are elastically deformed integrally toward the disk 104E to increase a volume of the lower chamber communication chamber 149E. Here, the valve seat disk 101 maintains the fourth passage 521E in a closed state while abutting the flexible disk 100E.

In the accumulator 190E, in the compression stroke, in a state in which the second damping force generating mechanism 173 is opened, when the pressure difference between the lower chamber communication chamber 149E and the upper chamber communication chamber 147E exceeds a predetermined value, the flexible disk 100E is elastically deformed while elastically deforming the elastic member 567E toward the disk 104E together with the valve seat disk 101, the valve seat disk 101 is separated from the flexible disk 100E, and the fourth passage 521E including the communication passage 505 is opened to bring the lower chamber communication chamber 149E in communication with the upper chamber communication chamber 147E. Here, the O-ring 116E maintains a seal function.

The shock absorber 1E is operated like the shock absorber 1 of the first embodiment in both the extension stroke and the compression stroke except the above-mentioned operation of the accumulator 190E.

Sixth Embodiment

Next, a sixth embodiment will be described mainly with reference to FIG. 15 focusing on differences from the first embodiment. Further, the same components as the first embodiment are designated by the same names and the same reference signs.

Figure 15:
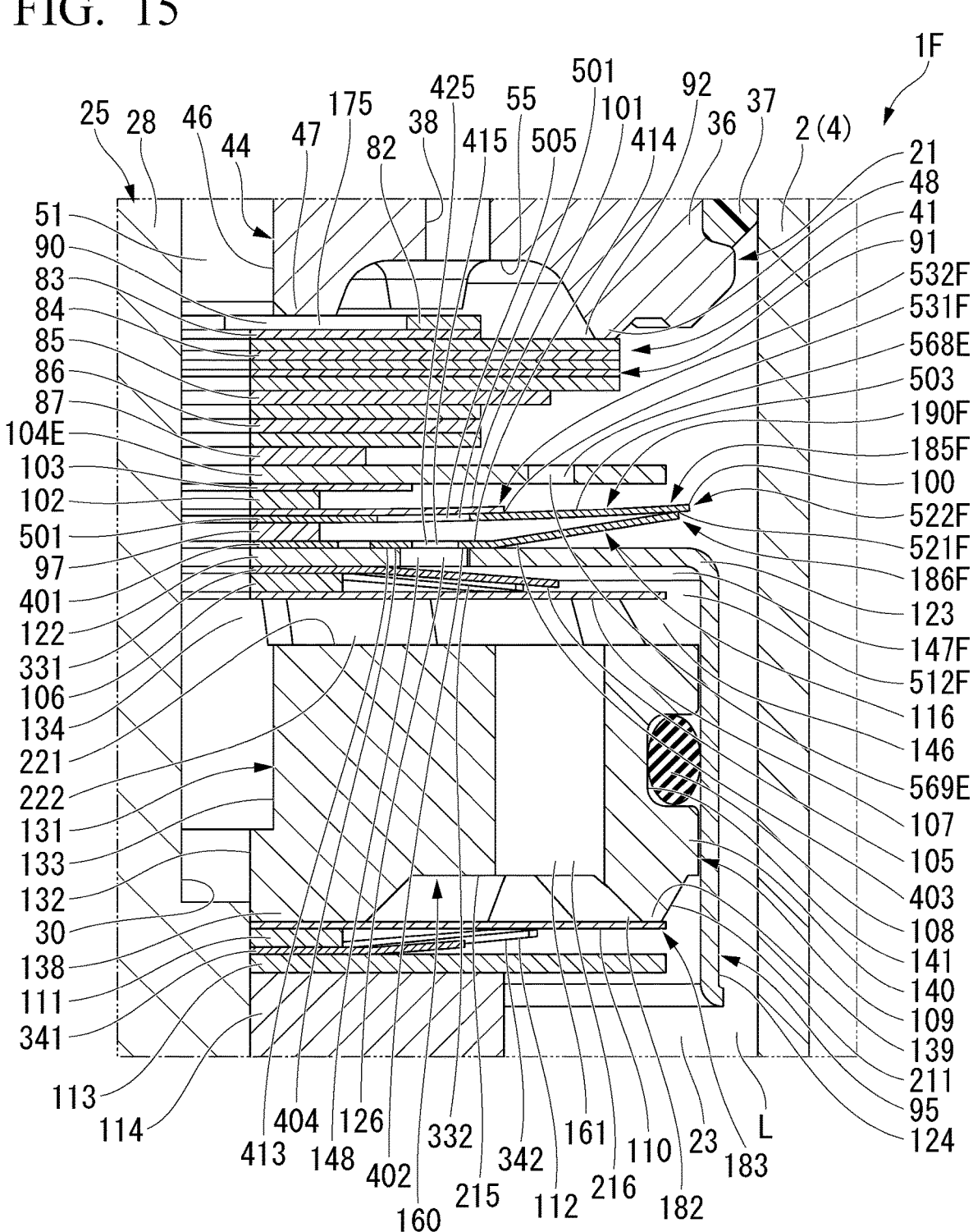
FIG. 15 is a partial cross-sectional view showing a major part of a shock absorber according to a sixth embodiment of the present invention.

In the shock absorber 1F of the sixth embodiment, as shown in FIG. 15, the same flexible disk 100 as the first embodiment, the valve seat disk 101, the plate spring 116, the disk 97, the disks 102 and 103, the same disk 104E as the fifth embodiment are inverted and provided in the axial direction outside the cap member 95 rather than inside the cap member 95. In the shock absorber 1F, the disk 104E, the disk 103, the disk 102, the valve seat disk 101, the flexible disk 100, the disk 97 and the plate spring 116 are provided between the bottom section 122 of the cap member 95 and the disk 87 in sequence from the side of the disk 87 in the axial direction.

The inner annular portion 401, the intermediate annular portion 402 and the two support portions 404 of the plate spring 116 abut the bottom section 122 of the cap member 95. An edge portion of the plate spring 116 opposite to the intermediate annular portion 402 of the outer conical portion 403 abuts the outer conical portion 503 of the flexible disk 100 over the entire circumference. The communication passage 425 of the plate spring 116 is in constant communication with the communication passage 148 of the bottom section 122 of the cap member 95. The spring member 105 abuts the bottom section 122 of the cap member 95 in the base plate section 331.

In the shock absorber 1F, the valve seat disk 101, the flexible disk 100, the disk 97, the plate spring 116, the cap member 95, the spring member 105, the disk 106, and the sub valve 107 form an upper chamber communication chamber 147F corresponding to the upper chamber communication chamber 147 of the first embodiment. The upper chamber communication chamber 147F also constitutes a third passage 512F corresponding to the third passage 512 of the first embodiment together with the passage between the sub valve 107 and the tubular portion 124. In the accumulator 190F, the valve seat disk 101, the flexible disk 100, the disk 97, the plate spring 116, the cap member 95, the spring member 105, the disk 106, the sub valve 107, and the upper chamber communication chamber 147F are provided in the third passage 512F to constitute an upper chamber volume variable mechanism 186F operated substantially like the upper chamber volume variable mechanism 186 of the first embodiment.

In the accumulator 190F, the flexible disk 100, the valve seat disk 101, the plate spring 116, and the disk 97 constitute a lower chamber volume variable mechanism 185F operated substantially like the lower chamber volume variable mechanism 185 of the first embodiment.

A space between the flexible disk 100 and the valve seat disk 101 becomes a fourth passage 531F configured to allow communication between the lower chamber 23 and the upper chamber communication chamber 147F. When the flexible disk 100 and the valve seat disk 101 are separated, the fourth passage 531F therebetween is opened to allow communication between the lower chamber 23 and the upper chamber communication chamber 147F. The flexible disk 100 and the valve seat disk 101 are provided in the fourth passage 531F to constitute a relief mechanism 532F on the contraction side operated substantially like the relief mechanism 532 of the first embodiment.

A space between the flexible disk 100 and the plate spring 116 becomes a fourth passage 521F configured to allow communication between the upper chamber communication chamber 147F and the lower chamber 23. When the flexible disk 100 and the plate spring 116 are separated, the fourth passage 521F therebetween is opened to allow communication between the upper chamber communication chamber 147F and the lower chamber 23. The flexible disk 100 and the plate spring 116 are provided in the fourth passage 521F to constitute a relief mechanism 522F on the extension side operated substantially like the relief mechanism 522 of the first embodiment.

The shock absorber 1F has the same hydraulic circuit as the shock absorber 1 of the first embodiment, and an operation of the accumulator 190F is slightly different from the operation of the accumulator 190 of the first embodiment.

In the accumulator 190F, in the extension stroke, the flexible disk 100 and the valve seat disk 101 are elastically deformed integrally toward the disk 104E to increase a volume of the upper chamber communication chamber 147F. Here, the valve seat disk 101 maintains the fourth passage 531F in a closed state while abutting the flexible disk 100.

In the accumulator 190F, in the extension stroke, in a state in which the second damping force generating mechanism 183 is opened, when the pressure difference between the upper chamber communication chamber 147F and the lower chamber 23 exceeds a predetermined value, the flexible disk 100 is elastically deformed toward the disk 104E together with the valve seat disk 101, and the fourth passage 521F between the flexible disk 100 and the plate spring 116 is opened to bring the upper chamber communication chamber 147F in communication with the lower chamber 23. That is, the relief mechanism 522F is opened after the second damping force generating mechanism 183 is opened in the extension stroke, and the upper chamber communication chamber 147F is in communication with the lower chamber 23 via the fourth passage 521F. Further, the communication passage 569E of the disk 104E prevents the pressure difference from occurring even when the flexible disk 100 approaches the disk 104E.

In the accumulator 190F, in the compression stroke, the flexible disk 100 and the valve seat disk 101 elastically deform the radial inner portion of the abutting position with the plate spring 116 of the flexible disk 100 toward the bottom section 122 of the cap member 95 to increase a volume of the lower chamber 23. Here, the valve seat disk 101 maintains the fourth passage 531F in a closed state while being deformed integrally with the flexible disk 100.

In the accumulator 190E, in the compression stroke, in a state in which the second damping force generating mechanism 173 is opened, when the pressure difference between the lower chamber 23 and the upper chamber communication chamber 147F exceeds a predetermined value, the flexible disk 100 is elastically deformed to approach the bottom section 122 while elastically deforming the outer conical portion 403 of the plate spring 116 and separated from the valve seat disk 101, and the fourth passage 531F is opened to bring the lower chamber 23 in communication with the upper chamber communication chamber 147F. That is, the relief mechanism 532F is opened after the second damping force generating mechanism 173 is opened in the compression stroke, and the lower chamber 23 is in communication with the upper chamber communication chamber 147F via the fourth passage 531F.

The shock absorber 1F is operated like the shock absorber 1 of the first embodiment in both the extension stroke and the compression stroke except the above-mentioned operation of the accumulator 190F.

Seventh Embodiment

Next, a seventh embodiment will be described mainly with reference to FIG. 16 focusing on differences from the sixth embodiment. Further, the same components as the sixth embodiment are designated by the same names and the same reference signs.

Figure 16:
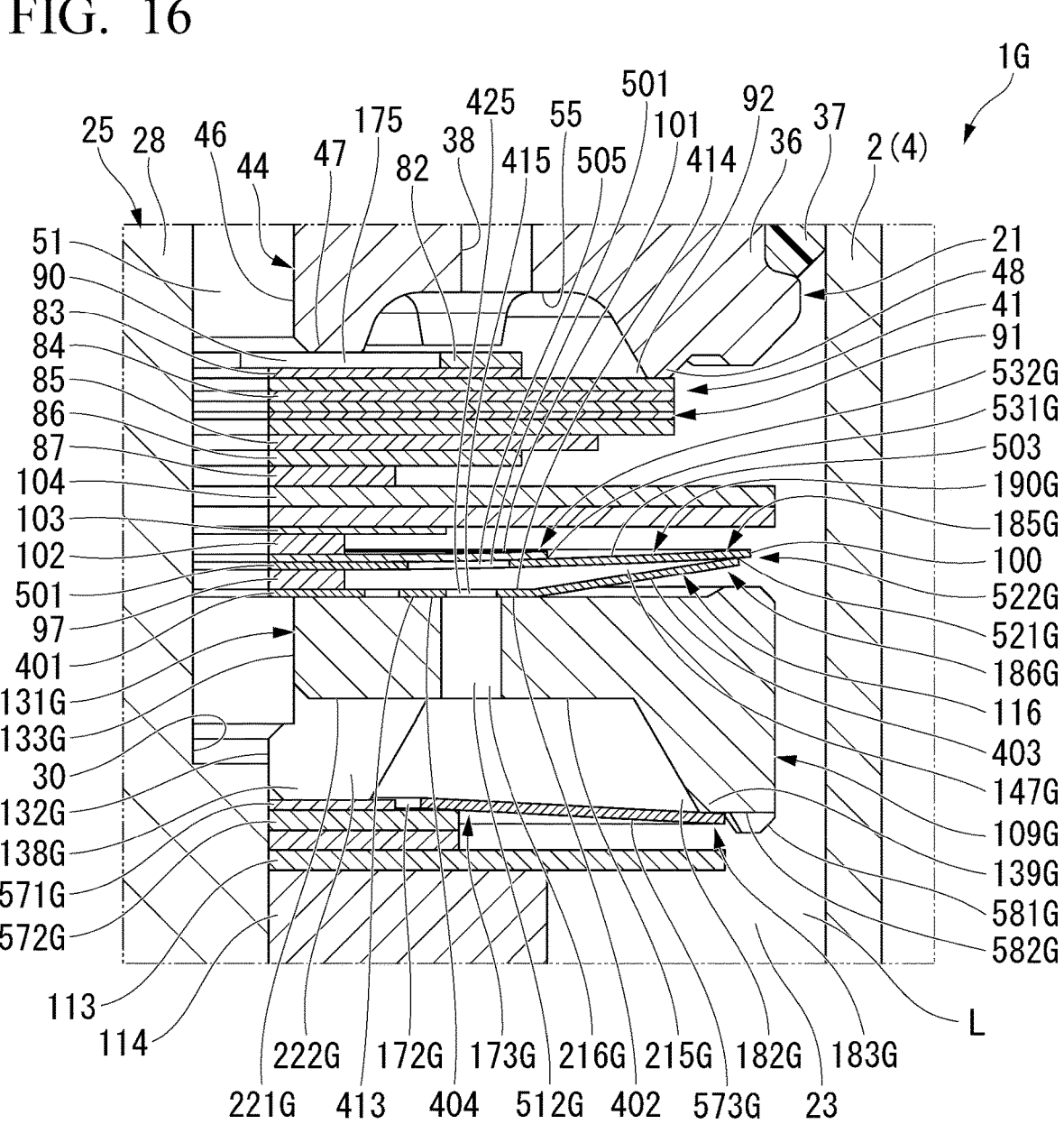
FIG. 16 is a partial cross-sectional view showing a major part of a shock absorber according to a seventh embodiment of the present invention.

In the shock absorber 1G of the seventh embodiment, as shown in FIG. 16, only one sheet of disk 86 of the sixth embodiment is provided, and the same plurality of sheets of (specifically, two sheets of) disks 104 as the first embodiment are provided. In the shock absorber 1G, instead of the cap member 95, the spring member 105, the disk 106, the sub valve 107, the valve seat member 109, the sub valve 110, the disk 111 and the spring member 112, a valve seat member 109G, a disk 571G, and a plurality of sheets of (specifically, two sheets of) disks 572G with the same inner diameter and the same outer diameter are provided in sequence from the side of the plate spring 116 in the axial direction. A sub valve 573G that is a simple support free valve is provided in the shock absorber 1G.

All the valve seat member 109G, the disk 571G, the disks 572G and the sub valve 573G are formed of a metal. The disk 571G, the disks 572G and the sub valve 573G have a porous circular flat plate shape with a fixed width in the radial direction. The valve seat member 109G, the disk 571G and the disks 572G are positioned with respect to the piston rod 25 in the radial direction by fitting the attachment shaft portion 28 thereinto.

The valve seat member 109G has a through-hole 131G passing in the axial direction through a center in the radial direction. The through-hole 131G has a small diameter hole portion 132G into which the attachment shaft portion 28 is fitted, and a large diameter hole portion 133G having a diameter greater than that of the small diameter hole portion 132G. The valve seat member 109G has an annular inner seat portion 138G on the side of the small diameter hole portion 132G in the axial direction, an annular outer seat portion 139G having a diameter greater than the inner seat portion 138G, and an annular locking protrusion portion 581G having a diameter greater than the outer seat portion 139G. A space between the inner seat portion 138G and the outer seat portion 139G becomes an annular passage concave portion 215G recessed in the axial direction more than them.

A passage groove 221G is formed in the inner seat portion 138G to pass therethrough in the radial direction. The inside of the passage groove 221G becomes a radial passages 222G in constant communication with the piston rod passage portion 51. A plurality of passage holes 216G passing through the valve seat member 109G in the axial direction are formed in the passage concave portion 215G. The passage concave portion 215G and the passage portion in the plurality of passage holes 216G are in constant communication with the radial passages 222G and the communication passage 425 of the plate spring 116. A passage groove 582G is formed in the locking protrusion portion 581G to pass therethrough in the radial direction.

The disk 571G has an outer diameter greater than an outer diameter of a tip surface of the inner seat portion 138G. The disk 572G has an outer diameter greater than that of the disk 571G.

An outer diameter of the sub valve 573G is greater than an inner diameter of a tip surface of the outer seat portion 139G and smaller than an inner diameter of the locking protrusion portion 581G. The movement of the sub valve 573G in the radial direction is restricted by the locking protrusion portion 581G. An inner diameter of the sub valve 573G is greater than the outer diameter of the disk 571G and smaller than the outer diameter of the disks 572G. In the sub valve 573G, an outer diameter side abuts the outer seat portion 139G from one side in the axial direction, and an inner diameter side abuts the disks 572G from the other side in the axial direction. In this state, the sub valve 573G is deformed in a tapered shape to approach the disk 113 in the axial direction as it goes outward in the radial direction.

The sub valve 573G is separated from the outer seat portion 139G while abutting the disks 572G in the extension stroke. The passage between the sub valve 573G and the outer seat portion 139G, the passage in the passage concave portion 215G, and the radial passages 222G are in constant communication with the piston rod passage portion 51 to constitute a second passage 182G on the extension side corresponding to the second passage 182 on the extension side of the first embodiment. The sub valve 573G and the outer seat portion 139G constitute a second damping force generating mechanism 183G corresponding to the second damping force generating mechanism 183 on the extension side of the first embodiment.

The sub valve 573G is separated from the disks 572G while abutting the outer seat portion 139G in the compression stroke. The passage between the sub valve 573G and the disks 572G, the passage in the passage concave portion 215G, and the radial passages 222G are in constant communication with the piston rod passage portion 51 to thereby constitute a second passage 172G on the contraction side corresponding to the second passage 172 on the contraction side of the first embodiment. The sub valve 573G and the disks 572G constitute a second damping force generating mechanism 173G corresponding to the second damping force generating mechanism 173 on the contraction side of the first embodiment.

In the shock absorber 1G, the valve seat disk 101, the flexible disk 100, the disk 97, the plate spring 116, the valve seat member 109G, the disks 571G and 572G, and the sub valve 573G form an upper chamber communication chamber 147G corresponding to the upper chamber communication chamber 147F of the sixth embodiment. The upper chamber communication chamber 147G constitutes a third passage 512G corresponding to the third passage 512F of the sixth embodiment. In the accumulator 190G, the valve seat disk 101, the flexible disk 100, the disk 97, the plate spring 116, the valve seat member 109G, the disks 571G and 572G, the sub valve 573G, and the upper chamber communication chamber 147G are provided in the third passage 512G to constitute an upper chamber volume variable mechanism 186G operated substantially like the upper chamber volume variable mechanism 186F of the sixth embodiment.

In the accumulator 190G, the flexible disk 100, the valve seat disk 101, the plate spring 116, and the disk 97 constitute a lower chamber volume variable mechanism 185G operated substantially like the lower chamber volume variable mechanism 185F of the sixth embodiment.

A space between the flexible disk 100 and the valve seat disk 101 becomes a fourth passage 531G configured to allow communication between the lower chamber 23 and the upper chamber communication chamber 147G. When the flexible disk 100 and the valve seat disk 101 are separated, the fourth passage 531G therebetween is opened to allow communication between the lower chamber 23 and the upper chamber communication chamber 147G. The flexible disk 100 and the valve seat disk 101 are provided in the fourth passage 531G to constitute a relief mechanism 532G on the contraction side operated substantially like the relief mechanism 532F of the sixth embodiment.

A space between the flexible disk 100 and the plate spring 116 becomes a fourth passage 521G configured to allow communication between the upper chamber communication chamber 147G and the lower chamber 23. When the flexible disk 100 and the plate spring 116 are separated, the fourth passage 521G therebetween is opened to allow communication between the upper chamber communication chamber 147G and the lower chamber 23. The flexible disk 100 and the plate spring 116 are provided in the fourth passage 521G to constitute a relief mechanism 522G on the extension side operated substantially like the relief mechanism 522F of the sixth embodiment.

The shock absorber 1G has the same hydraulic circuit as the shock absorber 1F of the sixth embodiment. An operation of the accumulator 190G is the same as that of the accumulator 190F of the sixth embodiment.

In the accumulator 190G, the flexible disk 100 and the valve seat disk 101 are elastically deformed integrally toward the disk 104 in the extension stroke to increase a volume of the upper chamber communication chamber 147G.

In addition, in the accumulator 190G, in the extension stroke, in a state in which the second damping force generating mechanism 183G is opened, when the pressure difference between the upper chamber communication chamber 147G and the lower chamber 23 exceeds a predetermined value, the flexible disk 100 is elastically deformed toward the disk 104 together with the valve seat disk 101, and the fourth passage 521G between the flexible disk 100 and the plate spring 116 is opened to bring the upper chamber communication chamber 147G in communication with the lower chamber 23. That is, the relief mechanism 522G is opened after the second damping force generating mechanism 183G is opened in the extension stroke to bring the upper chamber communication chamber 147G in communication with the lower chamber 23 via the fourth passage 521G.

In the accumulator 190G, in the compression stroke, the flexible disk 100 and the valve seat disk 101 elastically deform the inner portion of the abutting position with the plate spring 116 of the flexible disk 100 in the radial direction toward the bottom section 122 of the cap member 95 to increase a volume of the lower chamber 23.

In the accumulator 190G, in the compression stroke, in a state in which the second damping force generating mechanism 173G is opened, when the pressure difference between the lower chamber 23 and the upper chamber communication chamber 147G exceeds a predetermined value, the flexible disk 100 is elastically deformed to approach the valve seat member 10G while elastically deforming the outer conical portion 403 of the plate spring 116 and separated from the valve seat disk 101, and the fourth passage 531G is opened to bring the lower chamber 23 in communication with the upper chamber communication chamber 147G. That is, the relief mechanism 532G is opened after the second damping force generating mechanism 173G is opened in the compression stroke, and the lower chamber 23 is in communication with the upper chamber communication chamber 147G via the fourth passage 531G.

Eighth Embodiment

Next, an eighth embodiment will be described mainly with reference to FIG. 17 to FIG. 19 focusing on differences from the first embodiment. Further, the same components as the first embodiment are designated by the same names and the same reference signs.

Figure 17:
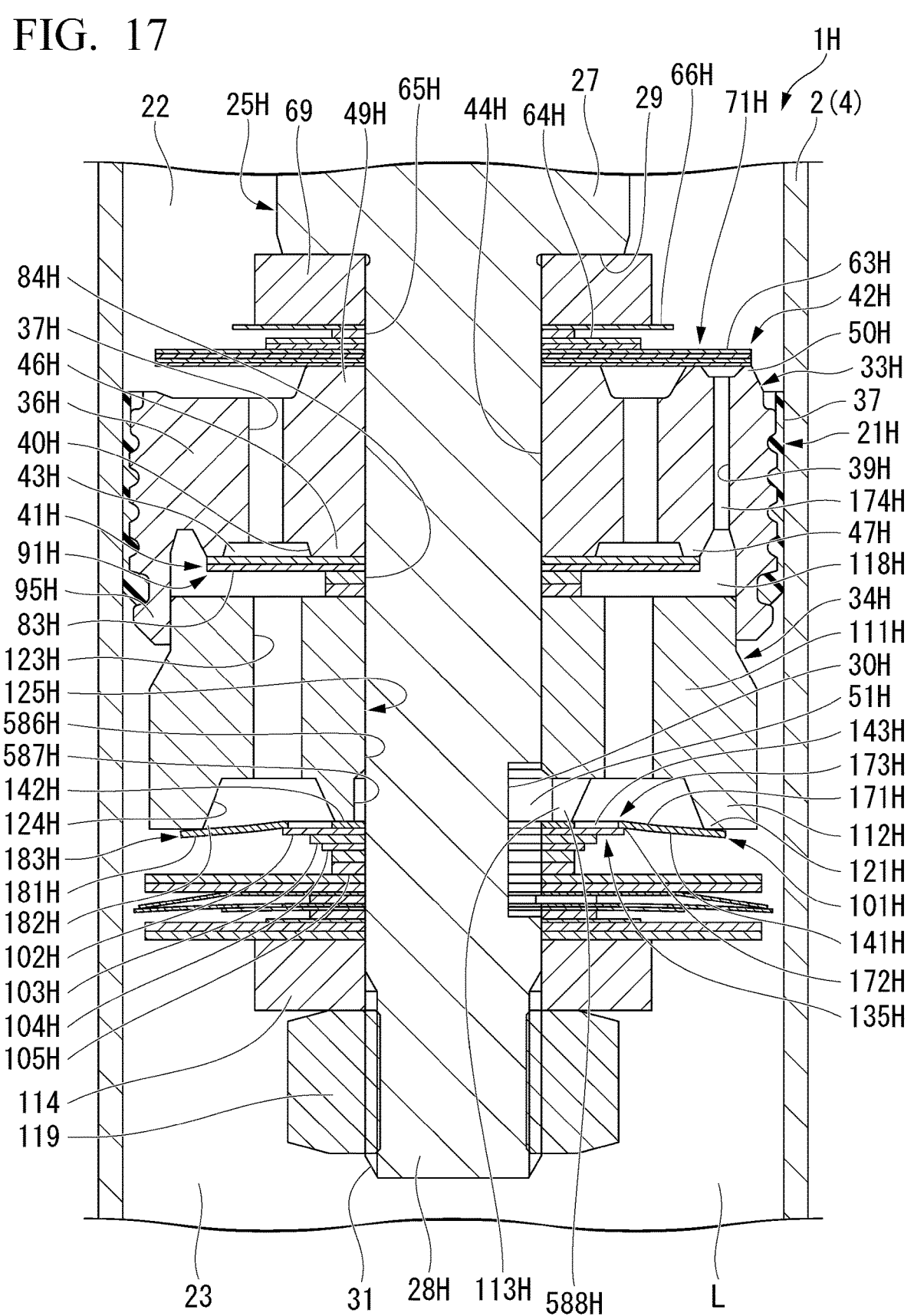
FIG. 17 is a partial cross-sectional view showing a periphery of a piston of a shock absorber according to an eighth embodiment of the present invention.

In a shock absorber 1H of the eighth embodiment, as shown in FIG. 17, a piston rod 25H is provided instead of the piston rod 25. The piston rod 25H has an attachment shaft portion 28H. The attachment shaft portion 28H has a passage notch portion 30H and a piston rod passage portion 51H located at positions different from the passage notch portion 30 and the piston rod passage portion 51.

In the shock absorber 1H, a piston 21H is provided instead of the piston 21. The piston 21H has a first piston body 33H formed of a metal and connected to the piston rod 25H, and a second piston body 34H formed of a metal and connected to the piston rod 25H. In the piston 21H, the sliding member 37 is mounted on an outer circumferential surface of the first piston body 33H.

In a main body portion 36H of the first piston body 33H, a plurality of passage holes 37H passing in the axial direction and a plurality of passage holes 39H passing in the axial direction are formed.

The plurality of passage holes 37H have a shape extending linearly in the axial direction of the first piston body 33H. The plurality of passage holes 37H are formed at equal pitches in the circumferential direction of the first piston body 33H. An annular ring groove 40H configured to allow communication between the plurality of passage holes 37H is formed in the first piston body 33H at a side opposite to the upper chamber 22 in the axial direction. A first damping force generating mechanism 41H configured to open and close a first passage 43H in the ring groove 40H and in the plurality of passage holes 37H to generate a damping force is provided at the side of the ring groove 40H opposite to the upper chamber 22.

The first passage 43H in the plurality of passage holes 37H and in the ring groove 40H becomes a passage on the extension side through which the oil liquid L flows out from the upper chamber 22 that is an upstream side to the lower chamber 23 that is a downstream side in the extension stroke. The first damping force generating mechanism 41H provided with respect to the first passage 43H becomes a damping force generating mechanism on the extension side configured to suppress flowing of the oil liquid L from the first passage 43H on the extension side to the lower chamber 23 to generate a damping force.

The plurality of passage holes 39H have a shape extending linearly in the axial direction of the first piston body 33H. The plurality of passage holes 39H are formed at predetermined pitches in the circumferential direction of the first piston body 33H. All the passage holes 39H are formed outside all the passage holes 37H in the radial direction of the first piston body 33H. A first damping force generating mechanism 42H configured to open and close a first passage 174H in the plurality of passage holes 39H to generate a damping force is provided on the side of the upper chamber 22 of the plurality of passage holes 39H.

The first passage 174H in the plurality of passage holes 39H becomes a passage on the contraction side through which an oil liquid flows out from the lower chamber 23 that is an upstream side toward the upper chamber 22 that is a downstream side in the compression stroke. The first damping force generating mechanism 42H provided with respect to the first passage 174H is a damping force generating mechanism on the contraction side configured to suppress flowing of the oil liquid from the first passage 174H on the contraction side to the upper chamber 22 to generate a damping force.

The first piston body 33H is formed in a substantially circular plate shape. An insertion hole 44H into which the attachment shaft portion 28H of the piston rod 25H is formed in a center of the first piston body 33H in the radial direction to pass therethrough in the axial direction. The first piston body 33H is positioned with respect to the piston rod 25H in the radial direction by fitting the attachment shaft portion 28H of the piston rod 25H into the insertion hole 44H.

An annular inner seat portion 46H is formed at a side of the first piston body 33H opposite to the upper chamber 22 in the axial direction inside the opening of the ring groove 40H opposite to the upper chamber 22 in the radial direction of the first piston body 33H. An annular valve seat portion 47H that configures a part of the first damping force generating mechanism 41H is formed in a portion of the first piston body 33H opposite to the upper chamber 22 in the axial direction outside the opening of the ring groove 40H opposite to the upper chamber 22 in the radial direction of the first piston body 33H. The inner seat portion 46H and the valve seat portion 47H protrude from the main body portion 36H toward a side opposite to the upper chamber 22 in the axial direction.

An annular inner seat portion 49H is formed at an end portion of the first piston body 33H on the side of the upper chamber 22 in the axial direction inside the opening of the plurality of passage holes 37H on the side of the upper chamber 22 in the radial direction of the first piston body 33H. A valve seat portion 50H that is annular and deformed is formed at an end portion of the first piston body 33H on the side of the upper chamber 22 in the axial direction to surround one of the plurality of passage holes 39H or the opening on the side of the plurality of upper chambers 22. The inner seat portion 49H and the valve seat portion 50H protrude from the main body portion 36H toward the upper chamber 22 in the axial direction. The plurality of valve seat portions 50H are formed at intervals in the circumferential direction of the first piston body 33H. The plurality of passage holes 37H are in constant communication with the upper chamber 22 via a gap between the valve seat portions 50H.

The first damping force generating mechanism 42H on the contraction side includes the valve seat portion 50H of the first piston body 33H. The first damping force generating mechanism 42H has a plurality of sheets of (specifically, four sheets of) disks 63H with the same inner diameter and the same outer diameter, and a plurality of sheets of (specifically, two sheets of) disks 64H with the same inner diameter and the same outer diameter, in sequence from the side of the first piston body 33H in the axial direction. The sheet of disk 65H, the sheet of disk 66H, and the same annular member 69 as the first embodiment are provided at a side of the disk 64H opposite to the disk 63H in sequence from the side of the disk 64H. All the disks 63H to 66H are formed of a metal and the attachment shaft portion 28H of the piston rod 25H can be fitted thereinto. All the disks 63H to 66H have a porous circular flat plate shape with a fixed width in the radial direction over the entire circumference.

An outer diameter of the disk 63H is substantially the same as a diameter of a circumscribed circle of the plurality of valve seat portions 50H. The disk 64H has an outer diameter smaller than that of the disk 63H and greater than that of the inner seat portion 49H of the first piston body 33H. The disk 65H has an outer diameter smaller than that of the inner seat portion 49H of the first piston body 33H. The disk 66H has an outer diameter greater than that of the disk 64H and the annular member 69 and smaller than that of the disk 63H. The annular member 69 has a greater thickness and higher rigidity than the disks 63H to 66H.

The plurality of sheets of disks 63H are in constant communication with the inner seat portion 49H. The plurality of sheets of disks 63H are separated from or seated on the valve seat portion 50H to close the valve seat portion 50H. The plurality of sheets of disks 63H and the plurality of sheets of disks 64H constitute a main valve 71H on the contraction side that is bendable and able to be seated on the valve seat portion 50H. The main valve 71H brings the first passage 174H in the plurality of passage holes 39H in communication with the upper chamber 22 by being separated from the valve seat portion 50H, and suppresses flowing of the oil liquid between the main valve 71H and the valve seat portion 50H to generate a damping force. The annular member 69 restricts deformation in the opening direction of the main valve 71H by a prescribed level or more together with the disk 66H.

Figure 19:
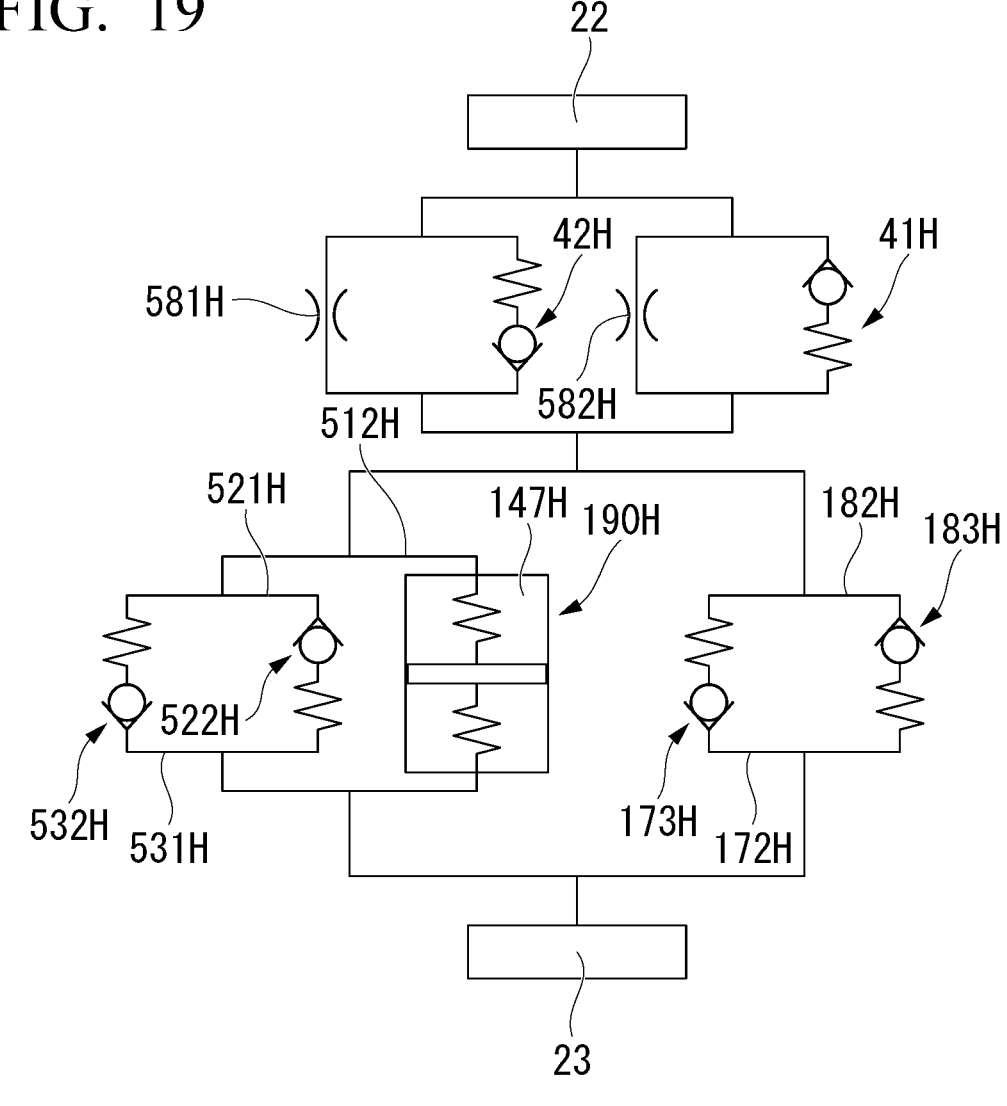
FIG. 19 is a hydraulic circuit diagram of the shock absorber according to the eighth embodiment of the present invention.

A fixed orifice 581H shown in FIG. 19 and configured to bring the first passage 174H in communication with the upper chamber 22 is formed in at least one of the valve seat portion 50H and the main valve 71H abutting it even when they abut each other. The fixed orifice 581H is provided parallel to the first damping force generating mechanism 42H.

As shown in FIG. 17, the first damping force generating mechanism 41H on the extension side includes the valve seat portion 47H of the first piston body 33H. The first damping force generating mechanism 41H has a plurality of sheets of (specifically, two sheets of) disks 83H with the same inner diameter and the same outer diameter. A plurality of sheets of (specifically, two sheets of) disks 84H with the same inner diameter and the same outer diameter are provided at a side of the disk 83H opposite to the valve seat portion 47H. Both the disks 83H and 84H are formed of a metal. Both the disks 83H and 84H have a porous circular flat plate shape with a fixed thickness into which the attachment shaft portion 28H of the piston rod 25H can be fitted.

The plurality of sheets of disks 83H have substantially the same outer diameter as that of the valve seat portion 47H of the first piston body 33H. The plurality of sheets of disks 83H can be seated on the valve seat portion 47H. The disk 84H has an outer diameter smaller than that of the disk 83H and smaller than that of the inner seat portion 46H of the first piston body 33H.

The plurality of sheets of disks 83H are in constant communication with of the inner seat portion 46H. The plurality of sheets of disks 83H can be seated on the valve seat portion 47H to close the valve seat portion 47H. The plurality of sheets of disks 83H constitute a main valve 91H on the extension side that is bendable and able to be separated from or seated on the valve seat portion 47H. The main valve 91H can bring the first passage 43H in communication with the lower chamber 23 and suppress flowing of the oil liquid between the main valve 91H and the valve seat portion 47H to generate a damping force by being separated from the valve seat portion 47H.

A fixed orifice 582H shown in FIG. 19 configured to bring the first passage 43H in communication with an intermediate chamber 118H between the main valve 91H and the second piston body 34H is provided in at least one of the valve seat portion 47H and the main valve 91H abutting it even in a state in which they abut each other. The fixed orifice 582H is provided parallel to the first damping force generating mechanism 41H. The fixed orifices 581H and 582H and the first damping force generating mechanisms 41H and 42H are provided in parallel.

As shown in FIG. 17, an annular fitting tube portion 95H protruding from the main body portion 36H toward a side of the valve seat portion 47H opposite to the upper chamber 22 is formed on the first piston body 33H outside the valve seat portion 47H in the radial direction of the first piston body 33H.

A second piston body 34H, a sheet of disk valve 101H, a sheet of disk 102H, a sheet of disk 103H, a sheet of disk 104H, and a plurality of sheets of (specifically, two sheets of) disks 105H with the same inner diameter and the same outer diameter are provided by fitting the attachment shaft portion 28H of the piston rod 25H thereinto on a side of the plurality of sheets of disks 84H opposite to the upper chamber 22 in the axial direction from the side of the plurality of sheets of disks 84H. All the disk valve 101H and the disks 102H to 105H are formed of a metal and the attachment shaft portion 28H of the piston rod 25H can be fitted thereinto. All the disk valve 101H and the disks 102H to 105H have a porous circular flat plate shape with a fixed width in the radial direction over the entire circumference.

The second piston body 34H is an integrally molded part having a bottomed cylindrical shape. The second piston body 34H has a bottom section 111H with a porous circular plate shape, an annular outer tube portion 112H protruding from an outer circumferential edge portion of the bottom section 111H toward one side of the bottom section 111H in the axial direction, and an annular inner tube portion 113H protruding from an inner circumferential edge portion of the bottom section 111H toward the same side of the outer tube portion 112H in the axial direction. The outer tube portion 112H and the inner tube portion 113H are disposed coaxially. The outer tube portion 112H has an axial length from the bottom section 111H longer than that from the inner tube portion 113H.

The outer circumferential portion of the second piston body 34H has a stepped shape. The second piston body 34H is disposed in the axial direction such that the bottom section 111H is located closer to the first piston body 33H than the outer tube portion 112H and the inner tube portion 113H and fitted onto the attachment shaft portion 28H. The second piston body 34H has an outer circumferential portion with a small diameter portion fitted into the fitting tube portion 95H of the first piston body 33H. The second piston body 34H abuts the disks 84H in the bottom section 111H.

The first piston body 33H and the second piston body 34H form an intermediate chamber 118H therebetween. The main valve 91H and the plurality of sheets of disks 84H are disposed in the intermediate chamber 118H. The intermediate chamber 118H is in constant communication with the upper chamber 22 via the first passages 43H and 174H and the fixed orifices 581H and 582H shown in FIG. 19.

The outer tube portion 112H is formed in an annular shape continuous over the entire circumference. An inner circumferential surface of the outer tube portion 112H has a tapered surface with a diameter increased as it is separated from the bottom section 111H in the axial direction. A tip surface of the outer tube portion 112H opposite to the bottom section 111H in the axial direction is a plane perpendicular to a center axis of the second piston body 34H. A corner edge portion between the tip surface and the inner circumferential surface of the outer tube portion 112H on a boundary side has an annular shape, and becomes a first valve seat 121H on/from which the disk valve 101H is seated or separated.

The outer circumferential surface of the inner tube portion 113H has a tapered surface with a diameter that is reduced as it is separated from the bottom section 111H in the axial direction. A tip surface of the inner tube portion 113H opposite to the bottom section 111H in the axial direction is a plane perpendicular to a center axis of the second piston body 34H.

A through-hole 123H passing through the bottom section 111H in the axial direction is formed in the bottom section 111H at a position between the outer tube portion 112H and the inner tube portion 113H in the radial direction. A plurality of through-holes 123H are formed at intervals in the circumferential direction of the bottom section 111H. An annular ring groove 124H configured to allow communication between the plurality of through-holes 123H is formed in the second piston body 34H between the outer tube portion 112H and the inner tube portion 113H.

An insertion hole 125H passing through the bottom section 111H and the inner tube portion 113H in the axial direction is formed in the second piston body 34H at a center thereof in the radial direction. The attachment shaft portion 28H of the piston rod 25H is inserted through the insertion hole 125H. The insertion hole 125H has a small diameter hole portion 586H provided inside the bottom section 111H, and a large diameter hole portion 587H with a diameter greater than that of the small diameter hole portion 586H and provided inside the inner tube portion 113H. The second piston body 34H is positioned with respect to the piston rod 25H in the radial direction by fitting the attachment shaft portion 28H into the small diameter hole portion 586H. A passage in the large diameter hole portion 587H of the insertion hole 125H is in constant communication with the piston rod passage portion 51H in the passage notch portion 30H of the piston rod 25H. A passage groove 588H passing in the radial direction is formed in the inner tube portion 113H. The passage in the passage groove 588H is in constant communication with the passage in the large diameter hole portion 587H and in constant communication with the passage in the ring groove 124H.

An outer diameter of the disk 105H is greater than that of the tip surface of the inner tube portion 113H of the second piston body 34H opposite to the bottom section 111H. The disk 104H has an outer diameter greater than that of the disk 105H. The disk 103H has an outer diameter greater than that of the disk 104H. The disk 102H has an outer diameter greater than that of the disk 103H.

An outer diameter of the disk 102H is smaller than the inner diameter of the tip surface of the outer tube portion 112H of the second piston body 34H, in other words, the inner diameter of the first valve seat 121H. An end surface of the disk 102H on the side of the inner tube portion 113H in the axial direction is disposed at the same position as the tip surface of the second piston body 34H opposite to the bottom section 111H of the first valve seat 121H in the axial direction.

The disk valve 101H is separated from or seated of the annular outer circumferential portion of the disk 102H on the side of the inner tube portion 113H in the axial direction. The disk 102H constitutes a second valve seat 135H from/on which the disk valve 101H is separated or seated together with the disks 103H and 104H stacked thereon. The second valve seat 135H is positioned with respect to the piston rod 25H in the radial direction by fitting the attachment shaft portion 28H thereinto in the radial direction. The second valve seat 135H is disposed to be separated inward from the first valve seat 121H of the second piston body 34H in the radial direction.

The second valve seat 135H constituted by the disks 102H to 104H is bendable. On the other hand, the first valve seat 121H of the second piston body 34H has higher rigidity than that of the second valve seat 135H, and is basically not bendable. The second valve seat 135H can adjust support rigidity of the disk valve 101H by changing a thickness or an outer diameter of each of the disks 102H to 104H, the number of disks, or the like.

The disk valve 101H is bendable. The disk valve 101H has a flat plate shape as a whole in a natural state before being assembled to the piston rod 25H. The disk valve 101H in the natural state has an outer conical portion 141H with a porous circular flat plate shape, an inner annular portion 142H having a porous circular flat plate shape with an outer diameter smaller than that of the outer conical portion 141H and disposed inside the outer conical portion 141H in the radial direction, and a support portion 143H connected to the outer conical portion 141H and the inner annular portion 142H. A space between the outer conical portion 141H and the inner annular portion 142H becomes a passage passing through the disk valve 101H in a thickness direction except the support portion 143H.

Both the outer conical portion 141H and the inner annular portion 142H have an annular shape with a fixed width in the radial direction over the entire circumference. The support portion 143H is disposed between the inner annular portion 142H and the outer conical portion 141H. The support portion 143H concentrically supports the outer conical portion 141H on the inner annular portion 142H. The support portion 143H has rigidity lower than that of the inner annular portion 142H and the outer conical portion 141H.

The attachment shaft portion 28H is fitted into the inner annular portion 142H of the disk valve 101H. Accordingly, the disk valve 101H is located with respect to the piston rod 25H in the radial direction. The inner annular portion 142H has an outer diameter smaller than the outer diameter of the disk 102H, i.e., the outer diameter of the second valve seat 135H. The outer diameter of the inner annular portion 142H is greater than that of the tip surface of the inner tube portion 113H of the second piston body 34H and equal to that of the disk 105H. Accordingly, the disk valve 101H has the inner annular portion 142H that is clamped between the inner tube portion 113H of the second piston body 34H and the disks 105H in the axial direction together with the disks 102H to 104H.

An inner diameter of the outer conical portion 141H is smaller than the outer diameter of the disk 102H, i.e., the outer diameter of the second valve seat 135H. An outer diameter of the outer conical portion 141H is greater than the inner diameter of the tip surface of the outer tube portion 112H of the second piston body 34H, i.e., the diameter of the first valve seat 121H.

The outer conical portion 141H has an outer circumferential portion that is able to be separated from or contact with the first valve seat 121H of the second piston body 34H. The outer conical portion 141H closes a gap between the outer conical portion 141H and the first valve seat 121H when seated on the first valve seat 121H over the entire circumference, and opens the gap between the outer conical portion 141H and the first valve seat 121H when separated from the first valve seat 121H.

In addition, the outer conical portion 141H has an inner circumferential portion that is able to be separated from or contact with the disk 102H of the second valve seat 135H. The outer conical portion 141H closes a gap between the outer conical portion 141H and the second valve seat 135H when seated on the second valve seat 135H over the entire circumference, and opens the gap between the outer conical portion 141H and the second valve seat 135H when separated from the second valve seat 135H. When the outer conical portion 141H is seated on the second valve seat 135H over the entire circumference, the disk 102H closes the passage between the outer conical portion 141H and the inner annular portion 142H of the disk valve 101H. The outer conical portion 141H has rigidity substantially higher than that of the support portion 143H. The outer conical portion 141H is operated with the same behavior as that of the simple support free valve with no support portion 143H upon opening of the valve, and deformed in the same manner as the simple support free valve.

The inner circumferential portion of the outer conical portion 141H of the disk valve 101H constitutes a sub valve 171H that is able to be separated from or seated on the second valve seat 135H. The sub valve 171H is separated from the second valve seat 135H to bring the lower chamber 23 in communication with the upper chamber 22 via the gap between the sub valve 171H and the second valve seat 135H, the passage between the outer conical portion 141H and the inner annular portion 142H of the disk valve 101H, the passages in the ring groove 124H of the second piston body 34H and in the plurality of through-holes 123H, the intermediate chamber 118H, the first passage 43H, the fixed orifice 582H shown in FIG. 19, the first passage 174H, and the fixed orifice 581H shown in FIG. 19. Here, the sub valve 171H suppresses flowing of the oil liquid between the sub valve 171H and the second valve seat 135H to generate a damping force.

The passage between the sub valve 171H and the second valve seat 135H that appears upon opening of the valve, the passage between the outer conical portion 141H and the inner annular portion 142H of the disk valve 101H, the passages in the ring groove 124H and in the plurality of through-holes 123H of the second piston body 34H, and the intermediate chamber 118H constitute a second passage 172H. The oil liquid flows out from the lower chamber 23 that is an upstream side in the inner tube 2 to the upper chamber 22 that is a downstream side due to movement of the piston 21H toward the lower chamber 23 by the second passage 172H, the fixed orifice 582H and the first passage 43H shown in FIG. 19, the first passage 174H, and the fixed orifice 581H shown in FIG. 19.

The second passage 172H becomes a passage on the contraction side through which the oil liquid flows out from the lower chamber 23 that is an upstream side toward the upper chamber 22 that is a downstream side during movement of the piston 21H toward the lower chamber 23, i.e., in the compression stroke. The sub valve 171H and the second valve seat 135H constitute a second damping force generating mechanism 173H on the contraction side configured to open and close the second passage 172H by being provided in the second passage 172H on the contraction side and suppress flowing of the oil liquid from the second passage 172H into the upper chamber 22 to generate a damping force.

The passage between the main valve 71H and the valve seat portion 50H that appears upon opening of the valve, and the passage in the plurality of passage holes 39H of the first piston body 33H constitute a first passage 174H configured to allow communication between the intermediate chamber 118H and the upper chamber 22. The oil liquid flows out from the lower chamber 23 that is a upstream side in the inner tube 2 to the upper chamber 22 that is a downstream side due to movement of the piston 21H toward the lower chamber 23 by the second passage 172H and the first passage 174H. The first damping force generating mechanism 42H on the contraction side opens and closes the first passage 174H and suppresses flowing of the oil liquid from the first passage 174H to the upper chamber 22 to generate a damping force. The second damping force generating mechanism 173H on the contraction side opens and closes the second passage 172H and suppresses flowing of the oil liquid from the second passage 172H to the upper chamber 22 to generate a damping force. The first damping force generating mechanism 42H and the second damping force generating mechanism 173H on the contraction side are disposed in the first passage 174H and the second passage 172H in series. The second damping force generating mechanism 173H is opened to generate a damping force when the piston speed is lower than that of the first damping force generating mechanism 42H. The second damping force generating mechanism 173H is opened even when the first damping force generating mechanism 42H is opened to generate a damping force.

An outer circumferential portion of the outer conical portion 141H of the disk valve 101H constitutes a sub valve 181H that is able to be separated from or seated on the first valve seat 121H. The sub valve 181H brings the upper chamber 22 in communication with the lower chamber 23 via the first passage 43H of the first piston body 33H, the fixed orifice 582H, the fixed orifice 581H, the first passage 174H of the first piston body 33H, the intermediate chamber 118H, the passages in the plurality of through-holes 123H and in the ring groove 124H of the second piston body 34H, and the gap between the sub valve 181H and the first valve seat 121H by being separated from the first valve seat 121H. Here, the sub valve 181H suppresses flowing of the oil liquid between the sub valve 181H and the first valve seat 121H to generate a damping force.

The intermediate chamber 118H, the passages in the plurality of through-holes 123H and in the ring groove 124H of the second piston body 34H, and the passages between the sub valve 181H and the first valve seat 121H that appears upon opening of the valve constitute a second passage 182H. The oil liquid from the upper chamber 22 that is an upstream side in the inner tube 2 to the lower chamber 23 that is a downstream side due to movement of the piston 21H toward the upper chamber 22 by the second passage 182H, the first passage 43H, the fixed orifice 582H shown in FIG. 19, and the fixed orifice 581H and the first passage 174H shown in FIG. 19.

The second passage 182H becomes a passage on the extension side through which the oil liquid flows out from the upper chamber 22 that is an upstream side to the lower chamber 23 that is a downstream side during movement of the piston 21H toward the upper chamber 22, i.e., in the extension stroke. The sub valve 181H and the first valve seat 121H constitute a second damping force generating mechanism 183H on the extension side provided in the second passage 182H on the extension side to open and close the second passage 182H and suppress flowing of the oil liquid from the second passage 182H to the lower chamber 23 to generate a damping force.

The first damping force generating mechanism 41H opens and closes the first passage 43H and suppresses flowing of the oil liquid from the upper chamber 22 to the lower chamber 23 via the first passage 43H to generate a damping force. The first damping force generating mechanism 41H and the second damping force generating mechanism 183H on the extension side are disposed in the first passage 43H and the second passage 182H in series. The second damping force generating mechanism 183H is opened to generate a damping force when the piston speed is lower than that of the first damping force generating mechanism 41H. The second damping force generating mechanism 183H is opened to generate a damping force even when the first damping force generating mechanism 41H is opened to generate a damping force.

Figure 18:
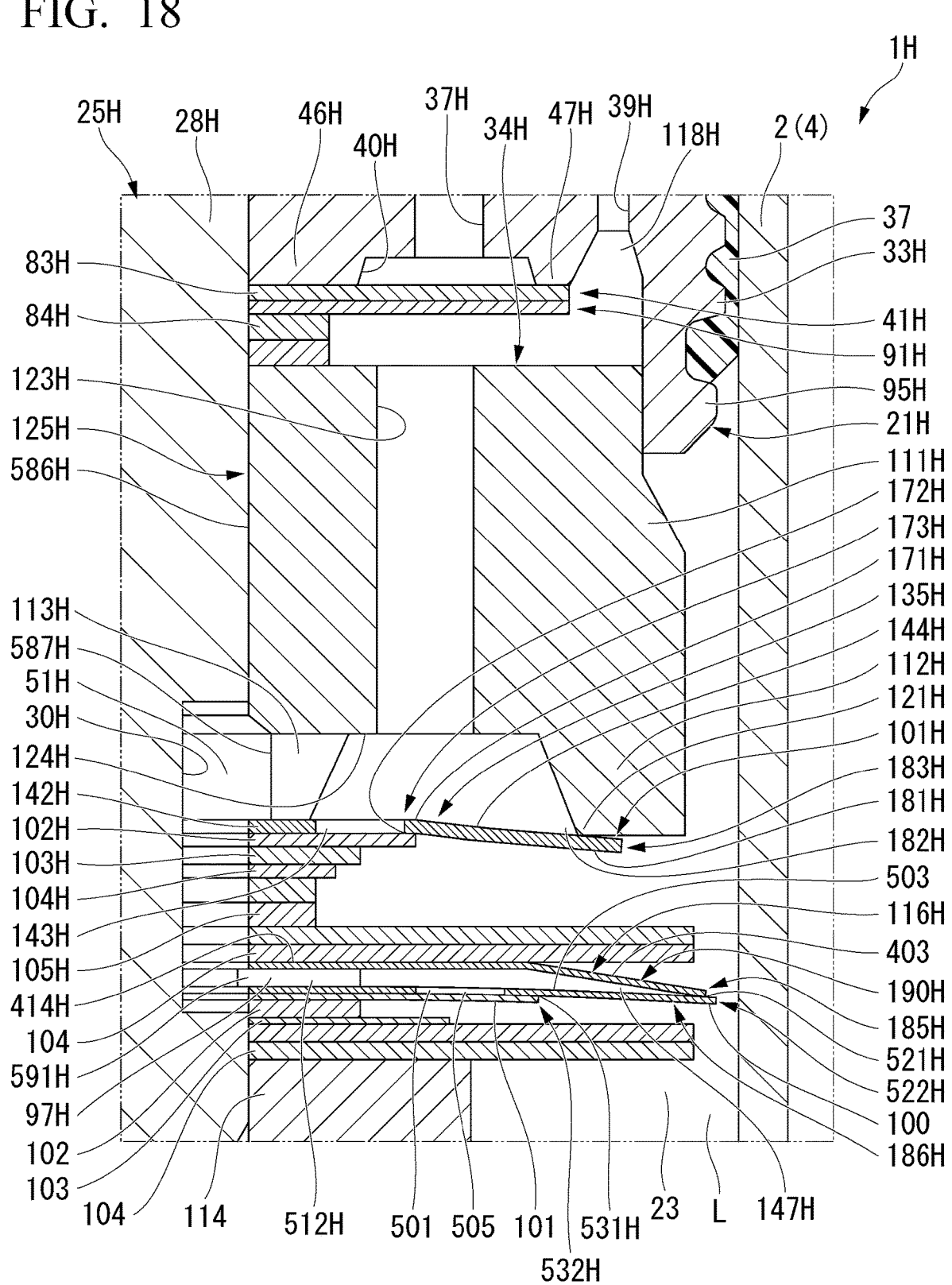
FIG. 18 is a partial cross-sectional view showing a major part of a shock absorber according to the eighth embodiment of the present invention.

As shown in FIG. 18, in the shock absorber 1H, the flexible disk 100, the valve seat disk 101 and the disks 102 to 104, the plate spring 116H, and the disk 97H are provided between the disks 105H and the annular member 114 like the first embodiment. The plurality of sheets of (specifically, two sheets of) disks 104, the plate spring 116H, the disk 97H, the flexible disk 100, the valve seat disk 101, the disk 102, the disk 103, and the plurality of sheets of (specifically, two sheets of) disk 104 are provided in sequence from the side of the disks 105H in the axial direction.

The plate spring 116H has an inner planar portion 414H having an annular shape with a fixed width in the radial direction over the entire circumference, and the same outer conical portion 403 as the first embodiment expanding outward from the outer circumferential edge portion of the inner planar portion 414H in the radial direction and toward one side in the axial direction. The inner planar portion 414H is distinguished from the inner planar portion 414 of the first embodiment only in that the hole portion 415 is not formed. In the plate spring 116H, the inner planar portion 414H abuts the disk 104, the edge portion of the outer conical portion 403 opposite to the inner planar portion 414H abuts the outer conical portion 503 of the flexible disk 100 over the entire circumference. The disk 97H is configured by forming a notch portion 591H passing through the disk 97 in the radial direction. The passage in the notch portion 591H is in constant communication with the piston rod passage portion 51H in the passage notch portion 30H of the piston rod 25H.

In the shock absorber 1H, the valve seat disk 101, the flexible disk 100, the disk 97H, and the plate spring 116H form an upper chamber communication chamber 147H corresponding to the upper chamber communication chamber 147 of the first embodiment. The upper chamber communication chamber 147H constitutes a third passage 512H corresponding to the third passage 512 of the first embodiment together with the passage in the notch portion 591H of the disk 97H. In the accumulator 190H, the flexible disk 100, the valve seat disk 101, the disk 97H, the plate spring 116H, and the upper chamber communication chamber 147H are provided in the third passage 512H to constitute an upper chamber volume variable mechanism 186H substantially like the upper chamber volume variable mechanism 186 of the first embodiment.

In the accumulator 190H, the flexible disk 100, the valve seat disk 101, the plate spring 116H, and the disk 97H constitute a lower chamber volume variable mechanism 185H operated substantially like the lower chamber volume variable mechanism 185 of the first embodiment.

A space between the flexible disk 100 and the valve seat disk 101 becomes a fourth passage 531H configured to allow communication between the lower chamber 23 and the upper chamber communication chamber 147H. When the flexible disk 100 and the valve seat disk 101 are separated, the fourth passage 531H therebetween is opened to allow communication between the lower chamber 23 and the upper chamber communication chamber 147H. The flexible disk 100 and the valve seat disk 101 are provided in the fourth passage 531H to constitute a relief mechanism 532H on the contraction side operated substantially like the relief mechanism 532 of the first embodiment.

A space between the flexible disk 100 and the plate spring 116H becomes a fourth passage 521H configured to allow communication between the upper chamber communication chamber 147H and the lower chamber 23. When the flexible disk 100 and the plate spring 116 are separated, the fourth passage 521H therebetween is opened to allow communication between the upper chamber communication chamber 147H and the lower chamber 23. The flexible disk 100 and the plate spring 116 are provided in the fourth passage 521H to constitute a relief mechanism 522H on the extension side operated substantially like the relief mechanism 522 of the first embodiment.

FIG. 19 shows a hydraulic circuit diagram by parts provided on the piston rod 25H such as the piston 21H or the like of the shock absorber 1H. The first damping force generating mechanisms 41H and 42H and the fixed orifices 581H and 582H are provided in parallel between the upper chamber 22 and the lower chamber 23. The second damping force generating mechanisms 173H and 183H, the accumulator 190H, and the relief mechanisms 522H and 532H are provided closer to the lower chamber 23 than them in parallel. The first damping force generating mechanisms 41H and 42H, the fixed orifices 581H and 582H, the second damping force generating mechanisms 173H and 183H, the accumulator 190H and the relief mechanisms 522H and 532H are provided in parallel.

In the accumulator 190H, in the extension stroke, the flexible disk 100 and the valve seat disk 101 are elastically deformed integrally toward the disk 103 to increase a volume of the upper chamber communication chamber 147H by the pressure of the oil liquid L introduced into the upper chamber communication chamber 147H branched off from the second passage 182H and provided in the third passage 512H.

In the accumulator 190H, in the extension stroke, in a state in which the second damping force generating mechanism 183H is opened, when the pressure difference between the upper chamber communication chamber 147H and the lower chamber 23 exceeds a predetermined value, the flexible disk 100 is elastically deformed toward the disk 103 together with the valve seat disk 101, the fourth passage 521H between the flexible disk 100 and the plate spring 116 is opened to bring the upper chamber communication chamber 147H in communication with the lower chamber 23. That is, the relief mechanism 522H is opened after the second damping force generating mechanism 183H is opened in the extension stroke, and the upper chamber communication chamber 147H is in communication with the lower chamber 23 via the fourth passage 521H.

In the accumulator 190H, in the compression stroke, the flexible disk 100 and the valve seat disk 101 elastically deform the inner portion of the abutting position of the flexible disk 100 with the plate spring 116H in the radial direction toward the plate spring 116H to increase a volume of the lower chamber 23.

In the accumulator 190H, in the compression stroke, in a state in which the second damping force generating mechanism 173H is opened, when the pressure difference between the lower chamber 23 and the upper chamber communication chamber 147H exceeds a predetermined value, the flexible disk 100 is elastically deformed to approach the disk 104 abutting the plate spring 116H while elastically deforming the outer conical portion 403 of the plate spring 116H and separated from the valve seat disk 101, and the fourth passage 531H is opened to bring the lower chamber 23 in communication with the upper chamber communication chamber 147H. That is, the relief mechanism 532H is opened after the second damping force generating mechanism 173H is opened in the compression stroke, and the lower chamber 23 is in communication with the upper chamber communication chamber 147H via the fourth passage 531H.

Ninth Embodiment

Next, a ninth embodiment will be described mainly with reference to FIGS. 20 to 23 focusing on differences from the first embodiment. Further, the same components as the first embodiment are designated by the same names and the same reference signs.

Figure 20:
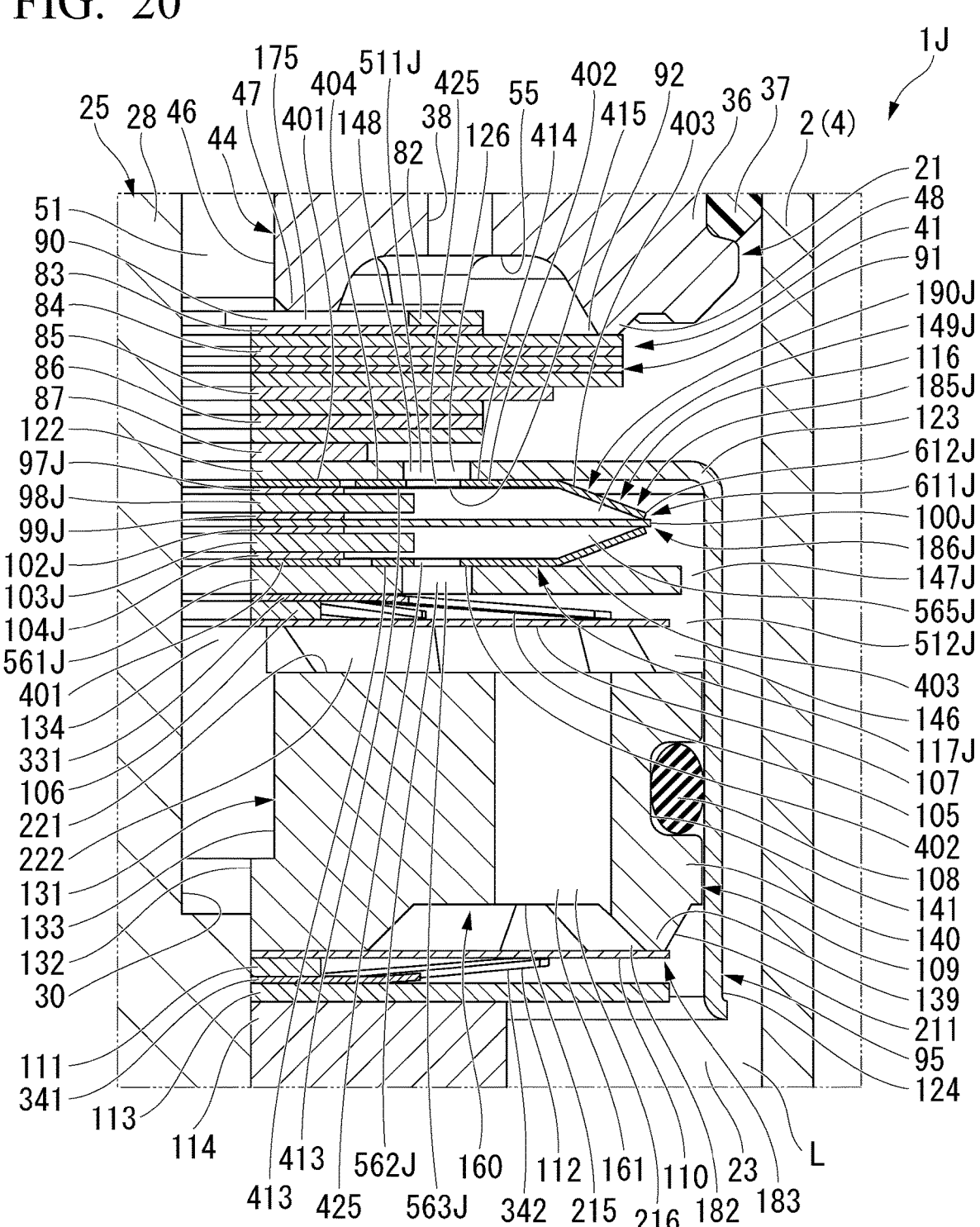
FIG. 20 is a partial cross-sectional view showing a major part of a shock absorber according to a ninth embodiment of the present invention.

In a shock absorber 1J of the ninth embodiment, as shown in FIG. 20, an accumulator 190J is provided instead of the accumulator 190 of the first embodiment.

In the accumulator 190J, instead of the disk 97 of the first embodiment, a disk 97J, a disk 98J and a disk 99J are provided in sequence from the side of the bottom section 122 in the axial direction.

A flexible disk 100J that is bendable is provided in the accumulator 190J, instead of the flexible disk 100 of the first embodiment. In the accumulator 190J, instead of the valve seat disk 101 and the disks 102 to 104 of the first embodiment, a disk 102J, a disk 103J, a disk 104J, a plate spring 117J (biasing member) and a spring abutting disk 561J are provided in sequence from the side of the bottom section 122 in the axial direction.

All the disks 97J to 99J, and 102J to 104J, the flexible disk 100J and the spring abutting disk 561J are formed of a metal, and have a porous circular flat plate shape. The disks 97J to 99J, and 102J to 104J and the spring abutting disk 561J have a fixed width in the radial direction over the entire circumference. The plate spring 117J has substantially the same shape as the plate spring 116. All the disks 97J to 99J, and 102J to 104J, the flexible disk 100J, the plate spring 117J and the spring abutting disk 561J are positioned with respect to the piston rod 25 in the radial direction by fitting the attachment shaft portion 28 thereinto.

The disk 97J abuts the inner annular portion 401 of the plate spring 116. An outer diameter of the disk 97J is slightly greater than that of the inner annular portion 401 of the plate spring 116. An inner diameter of the disk 97J is smaller than that of the connecting arm portions 413. An outer diameter of the disk 98J is slightly greater than the outer diameter of the connecting arm portions 413 of the plate spring 116 and smaller than the inner diameter of the intermediate annular portion 402 of the plate spring 116. The disk 98J has a greater thickness and higher rigidity than the flexible disk 100J. The disks 99J, 102J and 104J have the same shape as the disk 97J and compatibility. The disk 103J has the same shape as the disk 98J and compatibility.

Figure 21:
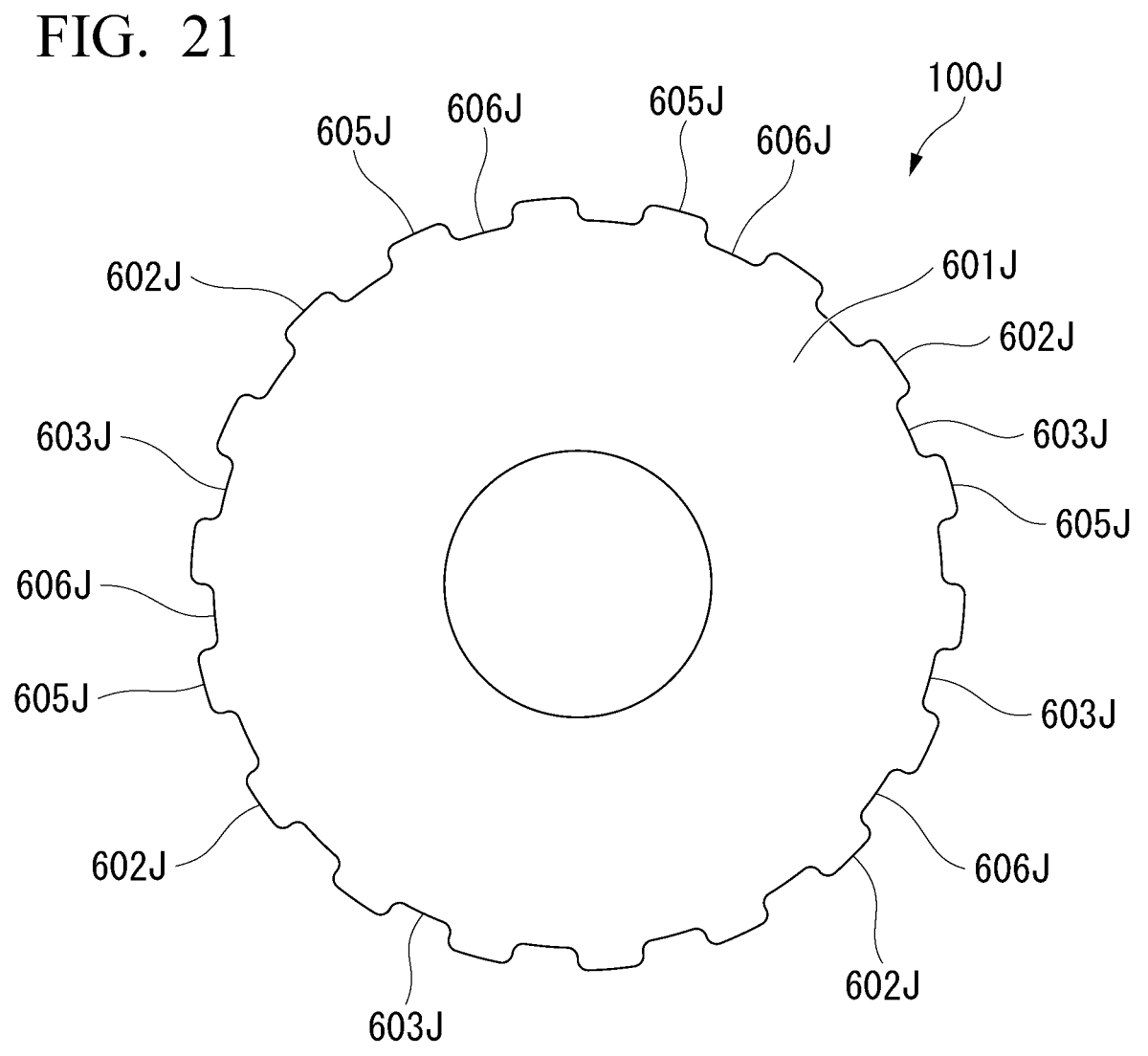

As shown in FIG. 21, the flexible disk 100J has a base plate section 601J with a fixed width in the radial direction over the entire circumference, and a plurality of (specifically, 18 places) protrusion portions 602J having the same shape and protruding outward from the outer circumferential edge portion of the base plate section 601J in the radial direction of the base plate section 601J. The protrusion portions 602J are disposed at equal intervals in the circumferential direction of the base plate section 601J. When the plurality of protrusion portions 602J are disposed continuously at equal intervals in the circumferential direction of the base plate section 601J, a space between the protrusion portion 602J and the protrusion portion 602J neighboring in the circumferential direction of the base plate section 601J becomes notch portions 603J recessed inward from the outer edge portion of the flexible disk 100J in the radial direction. The same number of (specifically, 18 places) notch portions 603J as the protrusion portions 602J are provided. The notch portions 603J have the same shape and are disposed at equal intervals in the circumferential direction of the base plate section 601J.

A tip portion of the protrusion portion 602J opposite to the base plate section 601J is a large diameter portion 605J on the outer circumferential side of the flexible disk 100J. An outer circumferential edge portion of the base plate section 601J that constitutes the notch portion 603J is a small diameter portion 606J on the outer circumferential side of the flexible disk 100J. The large diameter portion 605J has a length from a central axis on the inner circumferential side of the flexible disk 100J that is greater than the length of the small diameter portion 606J from the central axis on the inner circumferential side of the flexible disk 100J. Accordingly, the flexible disk 100J have the large diameter portion 605J and the small diameter portion 606J having different lengths on the inner circumferential side with respect to the central axis on the outer circumferential side.

The inner planar portion 414 of the plate spring 116 abuts the bottom section 122 of the cap member 95. An edge portion of the plate spring 116 opposite to the inner planar portion 414 of the outer conical portion 403 abuts the base plate section 601J of the flexible disk 100J on the side of the outer circumferential edge portion over the entire circumference. In other words, the plate spring 116 abuts an inner portion of the small diameter portion 606J on the end surface of the flexible disk 100J on one side in the axial direction to bias the flexible disk 100J while being disposed inside the small diameter portion 606J of the flexible disk 100J in the radial direction.

The inner planar portion 414 of the plate spring 117J abuts the spring abutting disk 561J. The edge portion of the plate spring 117J opposite to the inner planar portion 414 of the outer conical portion 403 abuts the base plate section 601J of the flexible disk 100J on the side of the outer circumferential edge portion over the entire circumference. In other words, the plate spring 117J also abuts the inner portion of the small diameter portion 606J on the end surface of the flexible disk 100J on the other side in the axial direction to bias the flexible disk 100J while being disposed inside the small diameter portion 606J of the flexible disk 100J in the radial direction. That is, the plate spring 117J sandwiches the flexible disk 100J from both sides in the axial direction together with the plate spring 116.

A plurality of passage holes 562J passing in the thickness direction (axial direction) at an intermediate position in the radial direction are formed in the spring abutting disk 561J at intervals in the circumferential direction. The inside of the passage holes 562J becomes a communication passage 563J. The communication passage 563J is in constant communication with the communication passage 425 of the plate spring 117J. The spring abutting disk 561J has a larger thickness and higher rigidity than the plate spring 117J and the flexible disk 100J.

In the shock absorber 1J, the flexible disk 100J, the plate spring 116, the bottom section 122 of the cap member 95, and the disks 97J to 99J form a lower chamber communication chamber 149J corresponding to the lower chamber communication chamber 149 of the first embodiment. The lower chamber communication chamber 149J also constitutes a third passage 511J corresponding to the third passage 511 of the first embodiment together with the communication passages 425 and 148. In the accumulator 190J, the flexible disk 100J, the plate springs 116 and 117J, the disks 97J to 99J, the bottom section 122 of the cap member 95, and the lower chamber communication chamber 149J are provided in the third passage 511J to constitute a lower chamber volume variable mechanism 185J operated substantially like the lower chamber volume variable mechanism 185 of the first embodiment.

In the shock absorber 1J, the flexible disk 100J, the disks 102J to 104J, the plate springs 116 and 117J, the spring abutting disk 561J, the spring member 105, the disk 106, the sub valve 107, and the cap member 95 form an upper chamber communication chamber 147J corresponding to the upper chamber communication chamber 147 of the first embodiment. The upper chamber communication chamber 147J also constitutes a third passage 512J corresponding to the third passage 512 of the first embodiment together with the passage between the sub valve 107 and the tubular portion 124. The upper chamber communication chamber 147J includes a chamber 565J surrounded by the flexible disk 100J, the disks 102J to 104J, the plate spring 117J, and the spring abutting disk 561J. In the accumulator 190J, the flexible disk 100J, the plate springs 116 and 117J, the disks 102J to 104J, the spring abutting disk 561J, the spring member 105, the disk 106, the sub valve 107, the cap member 95, and the upper chamber communication chamber 147J are provided in the third passage 512J to constitute an upper chamber volume variable mechanism 186J operated substantially like the upper chamber volume variable mechanism 186 of the first embodiment.

The flexible disk 100J is deformed on an inner side of the position abutting the plate springs 116 and 117J in the radial direction before the second damping force generating mechanisms 173 and 183 are opened due to the pressure difference between the upper chamber communication chamber 147J and the lower chamber communication chamber 149J. That is, the flexible disk 100J is deformed toward the bottom section 122 to expand the upper chamber communication chamber 147J when the pressure of the upper chamber communication chamber 147J is higher than that of the lower chamber communication chamber 149J, and deformed toward the spring abutting disk 561J to expand the lower chamber communication chamber 149J when the pressure of the lower chamber communication chamber 149J is higher than that of the upper chamber communication chamber 147J.

In the flexible disk 100J, when the pressure difference between the upper chamber communication chamber 147J and the lower chamber communication chamber 149J exceeds a predetermined value, a deflection amount thereof is greater than a predetermined value, and the abutting position with respect to the plate springs 116 and 117J is deviated from the base plate section 601J to the plurality of protrusion portions 602J. In other words, the abutting portion between the plate springs 116 and 117J and the flexible disk 100J by the deflection amount of the flexible disk 100J is located on an outer side of the small diameter portion 606J of the flexible disk 100J. Then, the passage in the plurality of notch portions 603J allows communication between the upper chamber communication chamber 147J and the lower chamber communication chamber 149J. However, even when the deflection amount of the flexible disk 100J is maximized, the abutting portion between the plate springs 116 and 117J and the flexible disk 100J is not located on an outer side of the large diameter portion 605J of the flexible disk 100J.

The passage in the plurality of notch portions 603J that appears to allow communication between the upper chamber communication chamber 147J and the lower chamber communication chamber 149J by the deflection amount of the flexible disk 100J becomes a fourth passage 611J. The flexible disk 100J and the plate springs 116 and 117J constitute a relief mechanism 612J. The relief mechanism 612J is provided in the fourth passage 611J. The relief mechanism 612J allows communication between the upper chamber communication chamber 147J and the lower chamber communication chamber 149J in both the expansion stroke and the contraction stroke.

The shock absorber 1J has the same hydraulic circuit as the shock absorber 1 of the first embodiment, but an operation of the accumulator 190J is slightly different from the operation of the accumulator 190 of the first embodiment.

In the accumulator 190J, in the extension stroke, the flexible disk 100J is elastically deformed such that the inner portion of the abutting position of the flexible disk 100J with the plate spring 116 in the radial direction approaches the bottom section 122 to increase a volume of the chamber 565J and increases a volume of the upper chamber communication chamber 147J including the chamber 565J.

In the accumulator 190J, in the extension stroke, in a state in which the second damping force generating mechanism 183 is opened, when the pressure difference between the upper chamber communication chamber 147J and the lower chamber communication chamber 149J exceeds a predetermined value, the flexible disk 100J is largely deformed to approach the bottom section 122, and the fourth passage 611J is opened to bring the upper chamber communication chamber 147J in communication with the lower chamber communication chamber 149J. That is, the relief mechanism 612J is opened after the second damping force generating mechanism 183 is opened in the extension stroke, the upper chamber communication chamber 147J is in communication with the lower chamber communication chamber 149J via the fourth passage 611J.

In the accumulator 190J, in the compression stroke, the flexible disk 100J elastically deforms the inner portion of the abutting position of the flexible disk 100J with the plate spring 117J in the radial direction toward the spring abutting disk 561J to increase a volume of the lower chamber communication chamber 149J.

In the accumulator 190J, in the compression stroke, in a state in which the second damping force generating mechanism 173 is opened, when the pressure difference between the lower chamber communication chamber 149J and the upper chamber communication chamber 147J exceeds a predetermined value, the flexible disk 100J is largely deformed to approach the spring abutting disk 561J, and the fourth passage 611J is opened to bring the lower chamber communication chamber 149J in communication with the upper chamber communication chamber 147J. That is, the relief mechanism 612J is opened after the second damping force generating mechanism 173 is opened in the compression stroke, and the lower chamber communication chamber 149J is in communication with the upper chamber communication chamber 147J via the fourth passage 611J.

The shock absorber 1J is operated in the same manner as the shock absorber 1 of the first embodiment in both the extension stroke and the compression stroke except the above-mentioned operation of the accumulator 190J.

According to the shock absorber 1J of the ninth embodiment, the relief mechanism 612J allows communication between the upper chamber communication chamber 147J and the lower chamber communication chamber 149J by locating the abutting portion between the plate springs 116 and 117J and the flexible disk 100J by the deflection amount of the flexible disk 100J on an outer side of the small diameter portion 606J. Accordingly, the number of parts that constitute the relief mechanism 612J can be reduced.

Figure 22:
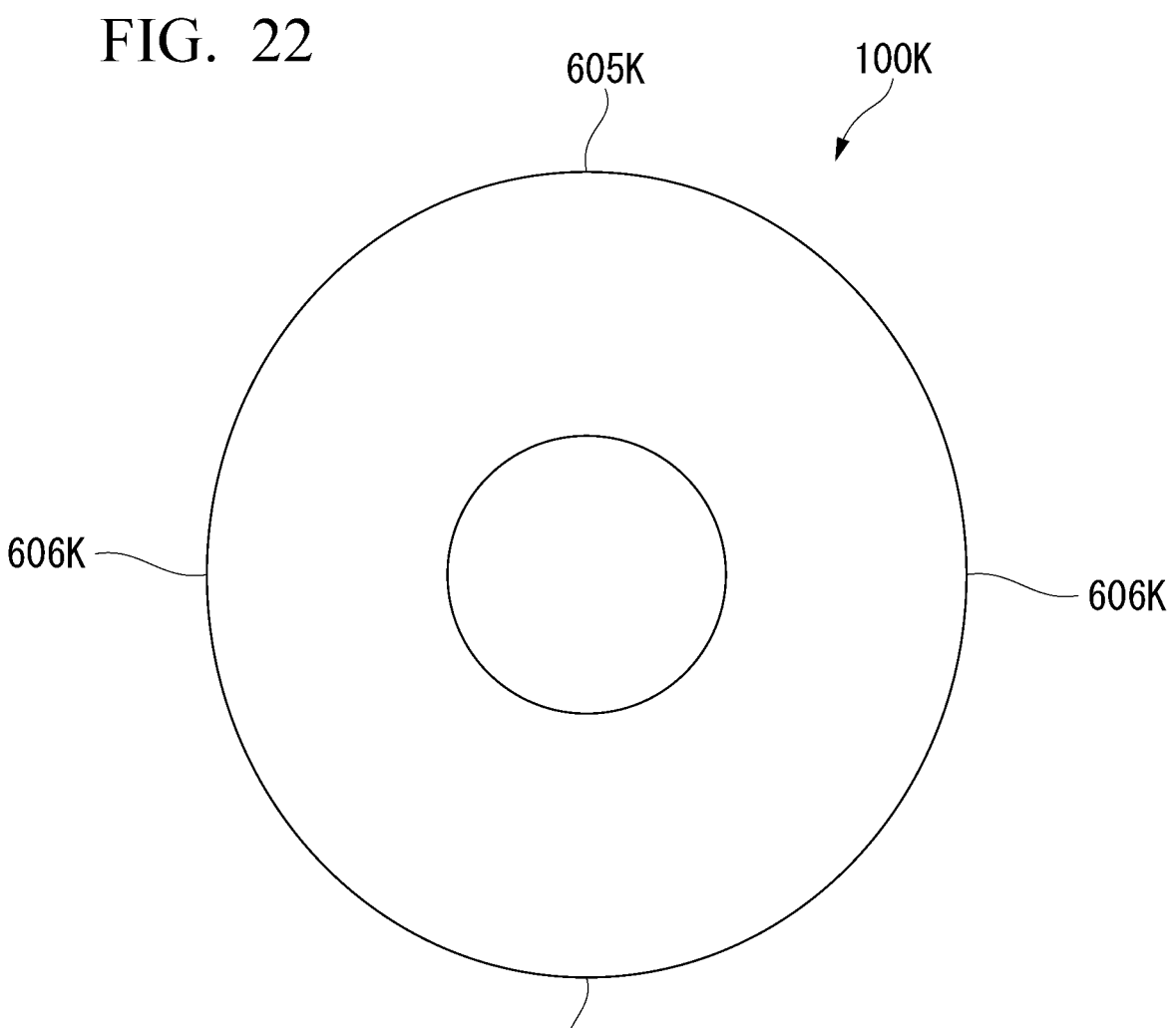
FIG. 22 is a plan view showing a variant of the flexible disk of the shock absorber according to the ninth embodiment of the present invention.

Further, instead of the flexible disk 100J, a flexible disk 100K of a variant as shown in FIG. 22 may be provided. The flexible disk 100K has an outer circumferential edge portion that is an elliptical shape. Accordingly, in the flexible disk 100K, both end portions of the outer circumferential edge portion in a major axis direction become a large diameter portion 605K, and both ends of the outer circumferential edge portion in a minor axis direction become a small diameter portion 606K. Even when the above-mentioned flexible disk 100K is used, the abutting portion between the plate springs 116 and 117J and the flexible disk 100K is located on an outer side of the small diameter portion 606K by the deflection amount of the flexible disk 100K to allow communication between the upper chamber communication chamber 147J and the lower chamber communication chamber 149J.

Figure 23:
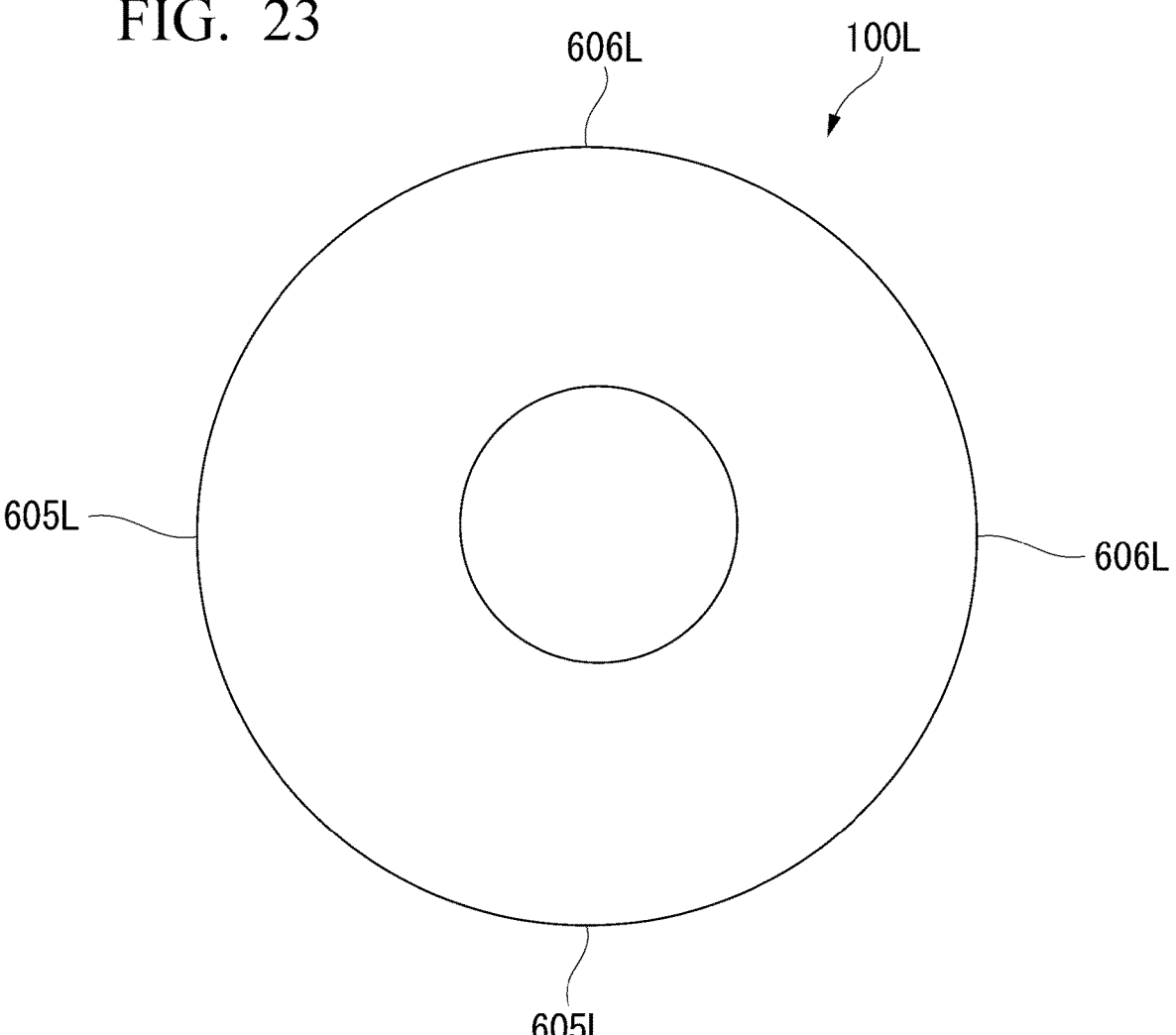
FIG. 23 is a plan view showing another variant of the flexible disk of the shock absorber according to the ninth embodiment of the present invention.

In addition, instead of the flexible disk 100J, a flexible disk 100L of a variant as shown in FIG. 23 may be provided. The flexible disk 100L has a circular outer circumferential edge portion and is eccentric with respect to the circular inner circumferential edge portion. Accordingly, large diameter portions 605L are formed at two places where a distance of the outer circumferential edge portion to the inner circumferential edge portion in the radial direction is longest. Small diameter portions 606L are formed at two places where a distance of the outer circumferential edge portion to the inner circumferential edge portion in the radial direction is shortest. Even when the above-mentioned flexible disk 100L is used, the abutting portion between the plate springs 116 and 117J and the flexible disk 100L is located on an outer side of the small diameter portions 606L by the deflection amount of the flexible disk 100L to allow communication between the upper chamber communication chamber 147J and the lower chamber communication chamber 149J.

Figure 24:
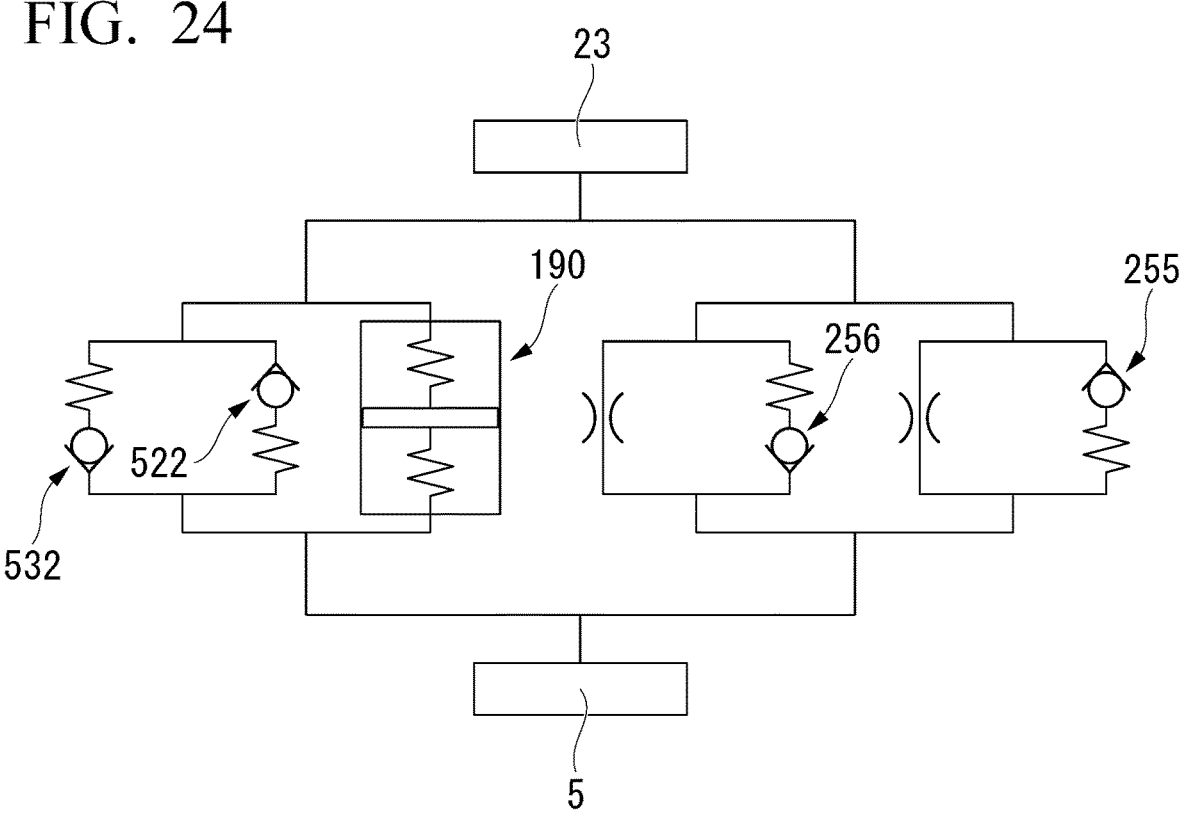
FIG. 24 is a hydraulic circuit diagram showing an application example to a base valve.

Further, in the first to ninth embodiments, for example, while the case in which the accumulator 190 and the relief mechanisms 522 and 532 are provided in the piston 21 has been exemplarily described as shown in the first embodiment, they may be provided in the base valve 15. In this case, for example, as shown in FIG. 24, in the hydraulic circuit diagram of the base valve 15, the damping force generating mechanisms 255 and 256, the accumulator 190, and the relief mechanisms 522 and 532 are provided in parallel between the lower chamber 23 and the reservoir chamber 5. In this case, the damping force generating mechanisms 255 and 256 become a second damping force generating mechanism for the first damping force generating mechanisms 41 and 42 provided on the piston 21.

While the first to ninth embodiments shows the example the example applying the present invention to the double cylinder type hydraulic shock absorber, there is no limitation thereto and it may be used for a mono-tube type hydraulic shock absorber that eliminates the outer tube and forms a gas chamber with a slidable partition on a side of the lower chamber in the cylinder opposite to the upper chamber. In addition, it can be used for any shock absorber including a pressure control valve that uses a packing valve in which a seal member is provided on a disk.

According to a first aspect of the above-mentioned embodiment, the shock absorber includes a cylinder in which a working fluid is sealed, a piston provided slidably in the cylinder and configured to divide the cylinder into two chambers, a piston rod connected to the piston and extending toward the outside of the cylinder, a first passage through which a working fluid flows out from the chamber that is an upstream side to the chamber that is a downstream side due to movement of the piston, a first damping force generating mechanism provided in the first passage and configured to generate a damping force, a second passage provided separately from the first passage, a second damping force generating mechanism provided in the second passage and opened to generate a damping force when a piston speed is lower than that of the first damping force generating mechanism, a third passage provided separately from the second passage, a volume variable mechanism provided in the third passage, a fourth passage provided separately from the third passage, and a relief mechanism provided in the fourth passage and opened after the second damping force generating mechanism is opened. Accordingly, improvement of durability can be achieved.

According to a second aspect of the embodiment, in the first aspect, the volume variable mechanism has a flexible disk, which is bendable, deformed before the second damping force generating mechanism is opened and having a communication hole configured to allow communication between the upstream side and the downstream side from an inner circumferential end portion to an outer circumferential end portion or from the inner circumferential end portion to an outer diameter of the piston rod, and a biasing member configured to abut an end surface of the flexible disk and bias the flexible disk, and the relief mechanism is disposed to open and close the communication hole of the flexible disk by a deflection amount of the flexible disk.

According to a third aspect of the embodiment, in the first aspect, the volume variable mechanism has a flexible disk, which is bendable, deformed before the second damping force generating mechanism is opened and having a large diameter portion and a small diameter portion with different lengths on an outer circumferential side with respect to a central axis on an inner circumferential side, and a biasing member disposed on an inner side of the small diameter portion of the flexible disk and abutting an end surface of the flexible disk to bias the flexible disk, and an abutting portion between the biasing member and the flexible disk is located on an outer side of the small diameter portion by a deflection amount of the flexible disk.

According to a fourth aspect of the embodiment, in the second or third aspect, a portion of the biasing member abutting an end surface of the flexible disk is at least partially separated from the end surface of the flexible disk by the deflection amount of the flexible disk.

INDUSTRIAL APPLICABILITY

According to the shock absorber, improvement of durability can be achieved.

REFERENCE SIGNS LIST

1, 1B to 1H, 1J Shock absorber
4, Cylinder
21, 21H Piston
22 Upper chamber (chamber)
23 Lower chamber (chamber)
25, 25H Piston rod
41, 41H, 42, 42H First damping force generating mechanism
43H, 72, 92, 174H First passage
100, 100A, 100B, 100J, 100K, 100L Flexible disk
116, 116B, 116H, 117D, 117J Plate spring (biasing member)
116E O-ring (biasing member)
172, 172G, 172H, 182, 182G, 182H Second passage

173, 173G, 173H, 183, 183G, 183H Second damping force generating mechanism
185, 185B to 185H, 185J Lower chamber volume variable mechanism
186, 186B to 186H, 186J Upper chamber volume variable mechanism
501, 501A, 506B Communication hole
511, 511B to 511E, 511J, 512, 512B to 512H, 512J Third passage
521, 521B to 521H, 531, 531B to 531D, 531F to 531H, 611J Fourth passage
522, 522B to 522H, 532, 532B to 532D, 532F to 532H, 612J Relief mechanism
605J Large diameter portion
606J Small diameter portion

The invention claimed is:

1. A shock absorber comprising:
a cylinder in which a working fluid is sealed;
a piston slidably provided in the cylinder and configured to divide a chamber in the cylinder into a first chamber and a second chamber;
a piston rod connected to the piston and extending toward an outside of the cylinder;
a first passage through which the working fluid flows out from the first chamber to the second chamber or from the second chamber to the first chamber, due to a movement of the piston;
a first damping force generating mechanism provided in the first passage and configured to generate a damping force;
a second passage provided separately from the first passage, and communicating with the second chamber;
a second damping force generating mechanism provided in the second passage and opened to generate a damping force when a piston speed is lower than a piston speed at a time when the first damping force generating mechanism generates the damping force;
a third passage provided separately from the second passage, and communicating with the second chamber;
a fourth passage provided in the third passage, and communicating with the third passage; and
a volume variable mechanism including
    a flexible disk which is operated by the working fluid flowing from the third passage, and
    a relief mechanism which opens after the flexible disk is operated and the second damping force generating mechanism is opened, and communicates between the third passage and the fourth passage, wherein:
the flexible disk
is bendable,
is deformed before the second damping force generating mechanism is opened, and
is formed with a communication hole configured to allow communication between the upstream side and the downstream side, at a position from an inner circumferential end portion to an outer circumferential end portion or at a position from the inner circumferential end portion to an outer diameter of the piston rod;
the volume variable mechanism includes a biasing member configured to abut an end surface of the flexible disk and bias the flexible disk; and
the relief mechanism is configured to open and close the communication hole of the flexible disk in accordance with a deflection amount of the flexible disk.

2. The shock absorber according to claim 1, wherein a portion of the biasing member abutting an end surface of the flexible disk is at least partially separated from the end surface of the flexible disk in accordance with the deflection of the flexible disk.

3. A shock absorber comprising:

a cylinder in which a working fluid is sealed;

a piston slidably provided in the cylinder and configured to divide a chamber in the cylinder into a first chamber and a second chamber;

a piston rod connected to the piston and extending toward an outside of the cylinder;

a first passage through which the working fluid flows out from the first chamber to the second chamber or from the second chamber to the first chamber, due to a movement of the piston;

a first damping force generating mechanism provided in the first passage and configured to generate a damping force;

a second passage provided separately from the first passage, and communicating with the second chamber;

a second damping force generating mechanism provided in the second passage and opened to generate a damping force when a piston speed is lower than a piston speed at a time when the first damping force generating mechanism generates the damping force;

a third passage provided separately from the second passage, and communicating with the second chamber;

a fourth passage provided in the third passage, and communicating with the third passage; and a volume variable mechanism including a flexible disk which is operated by the working fluid flowing from the third passage, and a relief mechanism which opens after the flexible disk is operated and the second damping force generating mechanism is opened, and communicates between the third passage and the fourth passage, wherein:

the flexible disk is bendable, is deformed before the second damping force generating mechanism is opened, and has a large diameter portion and a small diameter portion with different lengths on an outer circumferential side with respect to a central axis on an inner circumferential side;

the volume variable mechanism includes a biasing member which is disposed on an inner side of the small diameter portion of the flexible disk and abutting an end surface of the flexible disk to bias the flexible disk; and the relief mechanism is opened when an abutting portion between the biasing member and the flexible disk is located on an outer side of the small diameter portion by a deflection of the flexible disk.

4. The shock absorber according to claim 3, wherein a portion of the biasing member abutting an end surface of the flexible disk is at least partially separated from the end surface of the flexible disk in accordance with the deflection of the flexible disk.

* * * * *